(12) United States Patent
Cirelli et al.

(10) Patent No.: US 8,041,610 B1
(45) Date of Patent: Oct. 18, 2011

(54) DISTRIBUTING THINGS THROUGH PERSONALIZED NETWORKS

(75) Inventors: Franco Cirelli, San Francisco, CA (US); Ross Kennedy, Austin, TX (US); Scott Tachiki, San Anselmo, CA (US)

(73) Assignee: SeatSub, Inc., Fairfax, CA (US)

( * ) Notice: Subject to any disclaimer, the term of this patent is extended or adjusted under 35 U.S.C. 154(b) by 584 days.

(21) Appl. No.: 12/133,679

(22) Filed: Jun. 5, 2008

Related U.S. Application Data

(60) Provisional application No. 60/941,953, filed on Jun. 5, 2007.

(51) Int. Cl.
*G06Q 30/00* (2006.01)

(52) U.S. Cl. ............... 705/26.1; 705/14.49; 705/14.5; 705/27.1

(58) Field of Classification Search ........ 705/26.1–26.9, 705/27.1–27.2
See application file for complete search history.

(56) References Cited

U.S. PATENT DOCUMENTS

| | | | |
|---|---|---|---|
| 6,064,977 | A | 5/2000 | Haverstock et al. |
| 7,069,306 | B1 | 6/2006 | Adrams et al. |
| 7,165,098 | B1 | 1/2007 | Boyer et al. |
| 7,188,153 | B2 | 3/2007 | Lunt et al. |
| 7,593,871 | B1 * | 9/2009 | Mesaros ................. 705/26 |
| 7,890,501 | B2 * | 2/2011 | Lunt et al. ............... 707/722 |
| 2002/0049658 | A1 * | 4/2002 | Davidson et al. ........... 705/37 |
| 2002/0138325 | A1 * | 9/2002 | Mashimo et al. ........... 705/8 |
| 2005/0038690 | A1 | 2/2005 | Hayes-Roth |
| 2005/0228723 | A1 * | 10/2005 | Malik ..................... 705/26 |
| 2006/0004590 | A1 | 1/2006 | Khoo |
| 2006/0143214 | A1 | 6/2006 | Teicher |
| 2007/0233736 | A1 | 10/2007 | Xiong et al. |
| 2008/0103934 | A1 | 5/2008 | Gibson et al. |
| 2008/0189147 | A1 * | 8/2008 | Bartlett ................... 705/6 |

OTHER PUBLICATIONS

Madison Square Garden and Ticketmaster Sign Multi-Year Ticketing Agreement; Ticketmaster Chosen to Power Ticketing Solutions for New York's Premier Entertainment Destinations. PR Newswire , p. NA Oct. 25, 2004.*

* cited by examiner

*Primary Examiner* — Scott Zare
(74) *Attorney, Agent, or Firm* — Aka Chan LLP

(57) ABSTRACT

Things are distributed through a personalized network of trusted parties specified by a member. A specific implementation of the invention is for distributing unused tickets, but the principles of the invention are applicable to other things besides tickets. A system of the invention drives or increases attendance by enabling consumers to push their seats (i.e., unused tickets) to members of a trusted network (created by the consumer themselves) rather than making the seats available for sale to the public or manually locating an interested party and transferring them. Additionally, the system performs the time consuming work of contacting members of the trusted network to find out if they are interested in using the tickets for a particular event while receiving and recording their responses.

20 Claims, 50 Drawing Sheets

Games

ADD GAME

Team: Long Beach Armada

| Name 3713 | 3705 | 3710 Day | 3715 Starts | |
|---|---|---|---|---|
| Yuma Scorpions vs. Long Beach Armada | | Friday | 6/13/2008 7:05 PM | delete |
| Yuma Scorpions vs. Long Beach Armada | | Saturday | 6/14/2008 7:05 PM | delete |
| Yuma Scorpions vs. Long Beach Armada | | Sunday | 6/15/2008 7:05 PM | delete |
| Yuma Scorpions vs. Long Beach Armada | | Monday | 6/16/2008 7:05 PM | delete |
| St. George Roadrunners vs. Long Beach Armada (Game 1) | | Tuesday | 6/17/2008 1:05 PM | delete |
| St. George Roadrunners vs. Long Beach Armada (Game 2) | | Tuesday | 6/17/2008 7:05 PM | delete |
| St. George Roadrunners vs. Long Beach Armada | | Wednesday | 6/18/2008 7:05 PM | delete |
| Orange County Flyers vs. Long Beach Armada | | Friday | 6/20/2008 7:05 PM | delete |
| Orange County Flyers vs. Long Beach Armada | | Saturday | 6/21/2008 7:05 PM | delete |
| Orange County Flyers vs. Long Beach Armada | | Sunday | 6/22/2008 7:05 PM | delete |
| Calgary Vipers vs. Long Beach Armada | | Friday | 7/4/2008 7:05 PM | delete |
| Calgary Vipers vs. Long Beach Armada | | Saturday | 7/5/2008 7:05 PM | delete |
| Calgary Vipers vs. Long Beach Armada | | Sunday | 7/6/2008 7:05 PM | delete |
| Edmonton Cracker Cats vs. Long Beach Armada | | Monday | 7/7/2008 7:05 PM | delete |
| Edmonton Cracker Cats vs. Long Beach Armada | | Tuesday | 7/8/2008 7:05 PM | delete |

| Tickets | | | | | |
|---|---|---|---|---|---|
| Game | Start Date | Day | Section | Row | Seat |
| ROCHESTER RED WINGS vs. SYRACUSE CHEFS | 4/11/2008 7:05 PM | Friday | 208 | D | 8 |
| ROCHESTER RED WINGS vs. SYRACUSE CHEFS | 4/11/2008 7:05 PM | Friday | 208 | D | 7 |
| ROCHESTER RED WINGS vs. SYRACUSE CHEFS | 4/11/2008 7:05 PM | Friday | 208 | D | 8 |
| ROCHESTER RED WINGS vs. SYRACUSE CHEFS | 4/11/2008 7:05 PM | Friday | 208 | D | 9 |
| ROCHESTER RED WINGS vs. SYRACUSE CHEFS | 4/12/2008 1:35 PM | Saturday | 208 | D | 6 |
| ROCHESTER RED WINGS vs. SYRACUSE CHEFS | 4/12/2008 1:35 PM | Saturday | 208 | D | 7 |
| ROCHESTER RED WINGS vs. SYRACUSE CHEFS | 4/12/2008 1:35 PM | Saturday | 208 | D | 8 |
| ROCHESTER RED WINGS vs. SYRACUSE CHEFS | 4/12/2008 1:35 PM | Saturday | 208 | D | 9 |
| ROCHESTER RED WINGS vs. SYRACUSE CHEFS | 4/13/2008 1:35 PM | Sunday | 208 | D | 6 |
| ROCHESTER RED WINGS vs. SYRACUSE CHEFS | 4/13/2008 1:35 PM | Sunday | 208 | D | 7 |
| ROCHESTER RED WINGS vs. SYRACUSE CHEFS | 4/13/2008 1:35 PM | Sunday | 208 | D | 8 |
| ROCHESTER RED WINGS vs. SYRACUSE CHEFS | 4/13/2008 1:35 PM | Sunday | 208 | D | 9 |
| ROCHESTER RED WINGS vs. SYRACUSE CHEFS | 4/14/2008 6:35 PM | Monday | 208 | D | 6 |
| ROCHESTER RED WINGS vs. SYRACUSE CHEFS | 4/14/2008 6:35 PM | Monday | 208 | D | 7 |
| ROCHESTER RED WINGS vs. SYRACUSE CHEFS | 4/14/2008 6:35 PM | Monday | 208 | D | 8 |
| ROCHESTER RED WINGS vs. SYRACUSE CHEFS | 4/14/2008 6:35 PM | Monday | 208 | D | 9 |
| ROCHESTER RED WINGS vs. RICHMOND BRAVES | 4/15/2008 6:35 PM | Tuesday | 208 | D | 6 |
| ROCHESTER RED WINGS vs. RICHMOND BRAVES | 4/15/2008 6:35 PM | Tuesday | 208 | D | 7 |
| ROCHESTER RED WINGS vs. RICHMOND BRAVES | 4/15/2008 6:35 PM | Tuesday | 208 | D | 8 |

Season Ticket Holder Summary

| Season Ticket Holder | Status | Active Network Members | Total Network Members |
|---|---|---|---|
| Allison, Deb | | | 0 |
| Antila, Adrian | Active | 0 | 1 |
| Bryant, Danny | | 0 | 0 |
| Carogata, Darren | | 0 | 0 |
| Cirelli, Franco | Active | 0 | 2 |
| Claudia, Sam or | | 0 | 0 |
| Cline, Dave | | 0 | 0 |
| Cofske, Mike | | 0 | 0 |
| Crossland, Craig | | 0 | 0 |
| Frazier, Karla | | 0 | 0 |
| Gabbard, Jamie | | 0 | 0 |
| Gardiner, Shaun | Active | 0 | 0 |
| Gebhart, Farrah | | 0 | 0 |
| Housner, Debbie | | 0 | 0 |
| Jacey, Curt | | 0 | 0 |
| Kennedy, Ross | Active | 1 | 2 |

Fig. 43

Season Ticket Holders By Team

| Team | Active | Total |
|---|---|---|
| Austin Toros | 3 | 14 |
| Birmingham Barons | 0 | 0 |
| Blythe Heat | 0 | 0 |
| Cal Men's Basketball Team | 0 | 0 |
| Canada Minero | 0 | 0 |
| Montgomery Biscuits | 0 | 0 |
| Palm Springs Chill | 0 | 1 |
| Prince Edward Senators | 0 | 0 |
| Sacramento River Cats | 4 | 4 |
| San Diego Surf Dawgs | 0 | 0 |
| Sonora Pilots | 0 | 0 |
| Teams To Be Determined | 4 | 22 |
| Yuma Scorpions | 7 | 7 |
| Total | 18 | 48 |

Fig. 44

Tickets By Game

Between: 2/24/2008 and 3/23/2008

[VIEW]

| Game | Start Date | Shared | Accepted | Total |
|---|---|---|---|---|
| San Diego Surf Dawgs vs. Canada Miners | 2/26/2008 12:00:00 PM | 0 | 0 | 0 |
| Palm Springs Chill vs. Blythe Heat | 2/26/2008 6:00:00 PM | 0 | 0 | 0 |
| Canada Miners vs. Sonora Pilots | 2/27/2008 12:00:00 PM | 0 | 0 | 0 |
| Blythe Heat vs. Yuma Scorpions | 2/27/2008 6:00:00 PM | 0 | 0 | 0 |
| Sonora Pilots vs. Canada Miners | 2/28/2008 12:00:00 PM | 0 | 0 | 0 |
| Surf Dawgs vs. Yuma Scorpions | 2/28/2008 6:00:00 PM | 0 | 0 | 0 |
| WSU @ Cal | 2/28/2008 8:00:00 PM | 0 | 0 | 0 |
| AWL Playoff Game | 2/29/2008 6:00:00 PM | 0 | 0 | 0 |
| Fort Wayne Mad Ants vs. Austin Toros | 2/29/2008 7:00:00 PM | 0 | 0 | 54 |
| UW @ Cal | 3/1/2008 3:00:00 PM | 0 | 0 | 0 |
| AWL Championship Game | 3/1/2008 6:00:00 PM | 0 | 0 | 3 |
| Anaheim Arsenal vs. Austin Toros | 3/1/2008 7:00:00 PM | 0 | 0 | 53 |
| Test 1 | 3/2/2008 7:00:00 PM | 0 | 0 | 2 |
| Colorado Stormers vs. Austin Toros | 3/4/2008 1:00:00 PM | 0 | 0 | 4 |

DISTRIBUTING THINGS THROUGH PERSONALIZED NETWORKS

CROSS-REFERENCE TO RELATED APPLICATION

This patent application claims the benefit of U.S. provisional application 60/941,953, filed Jun. 5, 2007, which is incorporated by reference.

BACKGROUND OF THE INVENTION

This invention relates to the field of information networks, and more specifically to finding and distributing things to interested parties through a personalized network of trusted parties defined by a member.

Existing methods of finding interested parties for things are inadequate. Most methods of finding interested parties are sent to loosely defined groups and do not allow the differentiation of parties things are available to. Selling things using such services as want ad Web sites and auction Web sites make things available to the entire general public that uses such services. Methods of targeting only certain parties require a great deal of manual labor to complete. To ensure selectivity in which person the thing is made available to, a person must personally ask close friends and family. This would be both time consuming and may not produce fruitful results because the limited size of the pool asked.

Existing methods also do not allow their members to establish a priority between people or different groups of people. Finally, even if an interested party is found, there is difficulty in transferring the thing to the interested party because of varying methods of doing so (e.g., courier services, or mail).

Therefore, what is needed is an electronic or other automated method of creating and storing personalized networks of trusted members on computerized networks.

BRIEF SUMMARY OF THE INVENTION

Things are distributed through a personalized network of trusted parties specified by a member. A specific implementation of the invention is for distributing unused tickets, but the principles of the invention are applicable to other things besides tickets. A system of the invention drives or increases attendance by enabling consumers to push their seats (i.e., unused tickets) to members of a trusted network (created by the consumer themselves) rather than making the seats available for sale to the public or manually locating an interested party and transferring them. Additionally, the system performs the time consuming work of contacting members of the trusted network to find out if they are interested in using the tickets for a particular event while receiving and recording their responses.

The system reduces the probability of a season ticket holder wasting part of their investment by having unused tickets. The invention provides members the opportunity to select various features that will remind them of upcoming events, permit them to contact potential ticket members from a trusted network, and distribute the tickets in an orderly fashion, all with relatively little investment of time and money on the part of the season ticket holder.

In specific implementations, the invention allows establishment of levels of trusted networks to make things available to so that, within the trusted members, further differentiation can be made. Also the invention allows a member to be able to pick and choose members to place in each level. Additionally, the invention provides streamline methods of transferring the things to the interested party.

The technique of the invention will allow building of a relationship path to its members by degrees of separation from a ticket holder (such as a season ticket holder (STH)). For example, a ticket holder invites someone to participate (first degree) who accepts and then invites others to join their trusted network (second degree) and so on. Unlike some on-line social networks, however, a system of the invention does not cap the number of degrees of separation from the point of origin. This will provide tickets to a given event maximum exposure and potential to be used.

Members of the system are assigned a relational position to the position above itself. For example, the ticket holder is one degree below, or the child of, the event organizer. The ticket holder's network would in turn be a child of theirs, or one degree below them. And so on.

Some advantages of a system of the invention include:
1. Increase overall event attendance (actual and paid).
2. Increase number of ticket holders.
3. Increase percentage of ticket holders that renew their seats each year.
4. Reduce marketing expenses by targeting spending.
5. Increase advertising revenues through new and existing channels.
6. Make ticket holder and fan experience more interactive and engaging.
7. Provide access to the ticket holder outside of the event.

The system:
1. Performs the time consuming work of contacting potentially interested parties, receiving responses, and analyzing responses.
2. Provides reminders to the ticket holder of upcoming events.
3. Provides metrics on demand for otherwise unused seats for event organizer.
4. Provides a qualified list of potential season ticket holders for the event organizer.
5. Provides additional revenue streams (e.g., advertising) for the event organizer.
6. Utilizes the existing ticket management system distribution capabilities (e.g., e-ticketing) if one currently exists.
7. Creating a list of trusted network members is required only once (edits are available), thereby making the system recurring in nature.
8. Provides additional means of initiating contact with trusted network participants besides manually calling, e-mailing, or text messaging them.

Some further features are:
1. Integrated with event organizer ticket management system database.
2. Allows ticket holders to create a list of trusted network members.
3. Options for event organizer to customize message to participants.
4. Ability for ticket holder to dictate priority of message distribution.
5. Communication tool that sends, receives, and analyses messages received.
6. Ability for event organizer to manage and assign advertising space and time to specific events.
7. Provides reports to event organizer specifying information regarding usage of the system (e.g., total participants, number of solicitations, number of seats distributed, ratio of outgoing messages to seats used, percentage increase in seat usage based on historical data).

In a specific implementation, the invention is a method including: allowing a first user to become a member of a system accessible through the Internet; receiving an ordered list of network contacts from the first user; receiving from the first user an item for distribution to the first users' network contacts; sending a first message to a first contact in the ordered list of network contacts inquiring whether the first contact is interested in the item; and if the first contact rejects the item, sending a second message to a second contact in the ordered list of network contacts inquiring whether the second contact is interested in the item.

The item can be a ticket to a sporting event; there can be multiple items, where each item is one ticket of a set of season tickets. Messages can be sent via e-mail. In various implementations, the method includes: if the first contact does not respond within a first time period, sending a second message to a second contact in the ordered list of network contacts inquiring whether the second contact is interested in the item. The method includes: if the second contact rejects the item, sending a third message to a third contact in the ordered list of network contacts inquiring whether the third contact is interested in the item.

The method further includes: if the first contact does not respond within a first time period, the second contact accepts the item, and the first contact attempts to accept the item after the second contact has accepted, sending a third message to the first contact indicating that the item is no longer available. The third message can also include some text indicating how to purchase a related item at a discount price.

Features of the system include: permitting the first user to alter an order of the ordered list of network contacts; providing a screen listing sporting events associated with a sporting team; providing a screen listing the first user's network contacts and for each network contact, listing a number of tickets offered to each network contact; providing a screen listing the first user's network contacts and for each network contact, listing a number of tickets accepted by each network contact; and providing an option for the first user to specify which day of the week to share the item.

The system may further include: providing an option for the first user to specify how many days in advance of a date associated with the item to ask whether the first user wants to share the item. A second user can also become a member of a system, where before becoming a member, the second user was on the ordered list of network contacts of the first user.

In a specific implementation, the invention is a method including: allowing a first user to become a member of a system accessible through the Internet; receiving an ordered list of network contacts from the first user; allowing the first user to specify a first item and second item to share with the first users' network contacts using the system; allowing the first user to specify conditions under which the first item or second item is to be shared; determining whether the first item or the second item satisfy the conditions; when the first item satisfies the conditions, sending a first message to a first contact in the ordered list of network contacts inquiring whether the first contact is interested in the item; and if the first contact rejects the item, sending a second message to a second contact in the ordered list of network contacts inquiring whether the second contact is interested in the item. The item can be a ticket and messages may be sent using e-mail.

Features of the system can include: the conditions include a range of dates during which the first user wants to share the first item or second item; allowing a second user to become a member of a system, where before becoming a member, the second user was on the ordered list of network contacts of the first user; and providing a screen listing of the first user's network contacts and for each network contact, listing a number of tickets accepted by each network contact and a number of tickets offered to each network contact.

Other objects, features, and advantages of the present invention will become apparent upon consideration of the following detailed description and the accompanying drawings, in which like reference designations represent like features throughout the figures.

BRIEF DESCRIPTION OF THE DRAWINGS

FIG. 37 shows another screen which allows network members to see game listings organized by teams included in their preferences.

FIG. 40 shows information (e.g., name, e-mail, status, team, and account number) and contacts related to a specific seat holder after clicking on their name in the previous screen.

FIG. 41 shows a listing of tickets belonging to the season ticket holder, including the game date, day, section, seat, and row number.

FIG. 42 shows a season ticket holder's summary report of the number of messages received from each season ticket holder to that member.

FIG. 43 shows a season ticket holder summary screen displaying the status of season ticket holders, including their number of active network members and total number of members.

FIG. 44 shows a screen listing the season ticket holders within a member's network categorized by team.

FIG. 45 shows a tickets-by-game screen shot of a list of a network member's shared and accepted tickets organized by game.

FIG. 47 shows a transfers-by-game screen where members may view tickets they have shared and transferred by entering the team name or game.

DETAILED DESCRIPTION OF THE INVENTION

Figure 1:
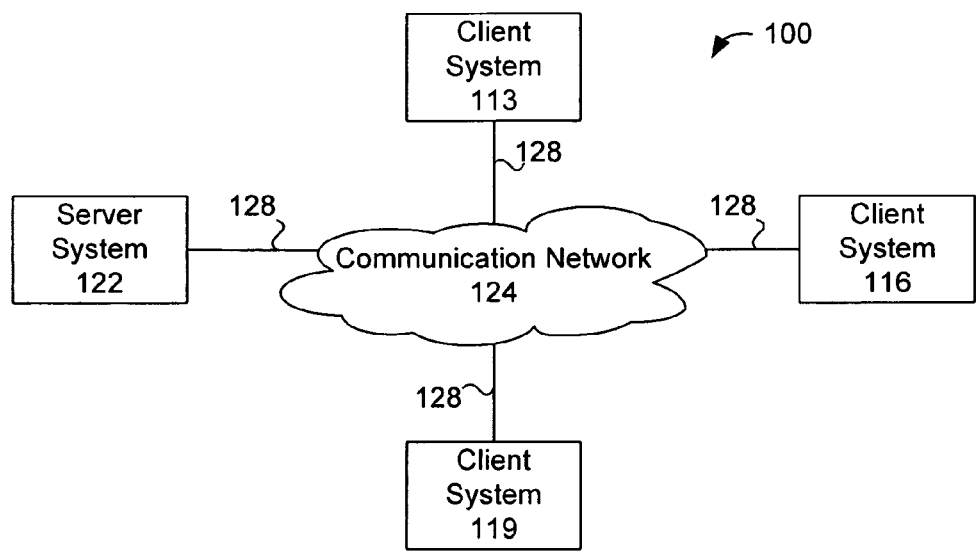
FIG. 1 shows a simplified block diagram of a client-server system and network in which an embodiment of the invention may be implemented.

FIG. 1 is a simplified block diagram of a distributed computer network 100 incorporating an embodiment of the present invention. Computer network 100 includes a number of client systems 113, 116, and 119, and a server system 122 coupled to a communication network 124 via a number of communication links 128. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, a intranet, a private network, a public network, a switched network, and combinations of these, and the like.

Distributed computer network 100 in FIG. 1 is merely illustrative of an embodiment incorporating the present invention and does not limit the scope of the invention as recited in the claims. The scope of this invention would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server system which provides the information. For this reason, server systems typically have more computing and storage capacity than client systems. However, a particular computer system may act as both a client or a server depending on whether the computer system is requesting or providing information. Additionally, although aspects of the invention has been described using a client-server environment, it should be apparent that the invention may also be embodied in a stand-alone computer system.

Server 122 is responsible for receiving information requests from client systems 113, 116, and 119, performing processing required to satisfy the requests, and for forwarding the results corresponding to the requests back to the requesting client system. The processing required to satisfy the request may be performed by server system 122 or may alternatively be delegated to other servers connected to communication network 124.

According to the teachings of the present invention, client systems 113, 116, and 119 enable members to access and query information stored by server system 122. In a specific embodiment, a "web browser" application executing on a client system enables members to select, access, retrieve, or query information stored by server system 122. Examples of web browsers include the Internet Explorer browser program provided by Microsoft Corporation, and the Firefox browser provided by Mozilla, and others.

Figure 2:
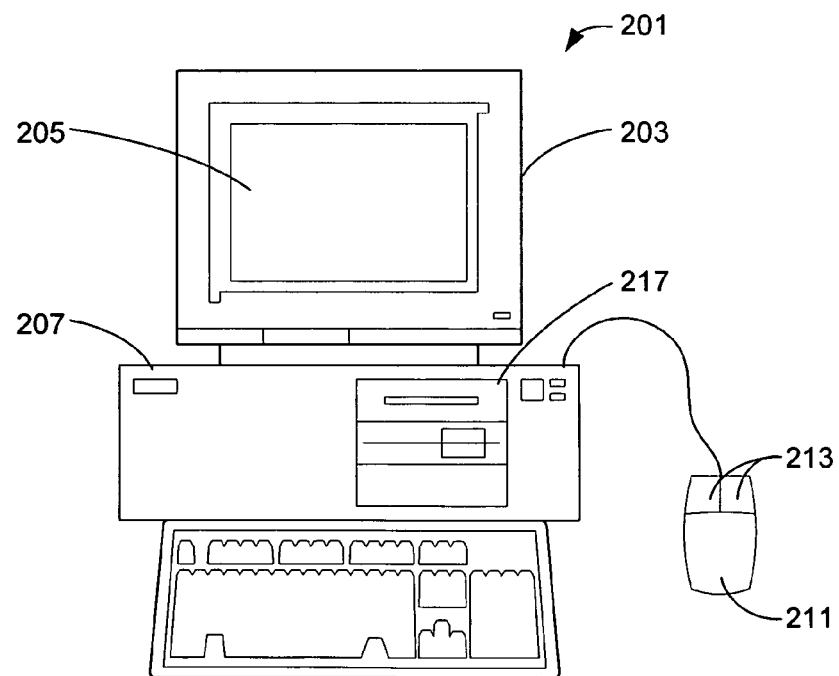
FIG. 2 shows a more detailed diagram of an exemplary client or computer which may be used in an implementation of the invention.

FIG. 2 shows an exemplary client system (or server system) of the present invention. In an embodiment, a member interfaces with the system through a computer workstation system, such as shown in FIG. 2. FIG. 2 shows a computer system 201 that includes a monitor 203, screen 205, cabinet 207, keyboard 209, and mouse 211. Mouse 211 may have one or more buttons such as mouse buttons 213. Cabinet 207 houses familiar computer components, some of which are not shown, such as a processor, memory, mass storage devices 217, and the like.

Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive), battery-backed-up volatile memory, tape storage, reader, and other similar media, and combinations of these.

A computer-implemented or computer-executable version of the invention may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 217. The source code of the software of the present invention may also be stored or reside on mass storage device 217 (e.g., hard disk, magnetic disk, tape, or CD-ROM). As a further example, code of the invention may be transmitted via wires, radio waves, or through a network such as the Internet.

Figure 3:
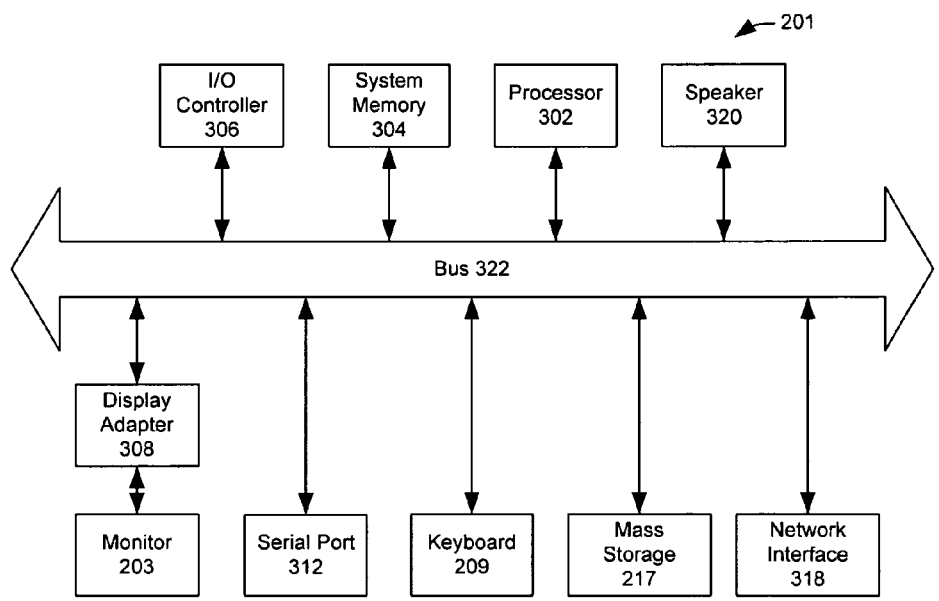
FIG. 3 shows a system block diagram of a client computer system used to execute application programs such as a web browser or tools for distributing the tickets according to the invention.

FIG. 3 shows a system block diagram of computer system 201 used to execute the software of the present invention. As in FIG. 2, computer system 201 includes monitor 203, keyboard 209, and mass storage devices 217. Computer system 501 further includes subsystems such as central processor 302, system memory 304, input/output (I/O) controller 306, display adapter 308, serial or universal serial bus (USB) port 312, network interface 318, and speaker 320. The invention may also be used with computer systems with additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a computer system suitable for use with the present invention. Other configurations of subsystems suitable for use with the present invention will be readily apparent to members of the invention. Computer software products may be written in any of various suitable programming languages, such as C, C++, C#, Pascal, Fortran, Perl, Matlab (from MathWorks, www.mathworks.com), SAS, SPSS, JavaScript, AJAX, and Java. The computer software product may be an independent application with data input and data display modules. Alternatively, the computer software products may be classes that may be instantiated as distributed objects. The computer software products may also be component software such as Java Beans (from Sun Microsystems) or Enterprise Java Beans (EJB from Sun Microsystems).

An operating system for the system may be one of the Microsoft Windows® family of operating systems (e.g., Windows 95, 98, Me, Windows NT, Windows 2000, Windows XP, Windows XP x64 Edition, Windows Vista, Windows CE, Windows Mobile), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11 g, 802.11i, and 802.11n, just to name a few examples). For example, signals from a computer may be transferred, at least in part, wirelessly to components or other computers.

In an embodiment, with a web browser executing on a computer workstation system, a member accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

The invention provides a system and technique of distributing things through personalized networks. The system can handle any number of members or individuals. Each member can specify and set up a personal network or personalized network. A collection of personalized networks may be part of a computer-implemented social network. This network may be implemented using a computer server (or a number of servers depending on the number of members) and social networking software. Each member connects to the system through a client device such as a desktop computer, notebook computer, or mobile phone. The invention manages the personalized networks of the members.

With the system, a member can distribute or pass things such as personal property, real property, legal rights, licenses, items, rights, tickets, or other items through the member's personalized network that has been set up on the system. A member may have different personalized networks set up for distributing different items or different types of items. For example, if the member went to UC Berkeley as an undergraduate student and Stanford as a graduate student, the member probably would like to set up one personalized network to distribute any unused Cal Bears football tickets and another personalized network to distribute any unused Stanford Cardinals football tickets.

A specific implementation of this invention is for distributing unused tickets to others in a personalized network specified by a member. A ticket is any item that confers a right or license to attend an event. Other implementations of the invention apply to the distribution of other things, not just tickets, such as personal and real property, vehicles, mobile phones, and furniture.

Most organizations holding or sponsoring events encourage the distribution of unused tickets to others who will use them. Organizations lose revenue from low attendance even when all the tickets to their events are sold (i.e., ticket holder does not or cannot attend a particular event). Some examples of events include sporting events, football games (e.g., San Francisco 49ers, Oakland Raiders), soccer games, basketball games (e.g., Golden State Warriors), ice hockey games (e.g., San Jose Sharks), college football games (e.g, San Jose State Spartans), college basketball games, baseball games (e.g., San Francisco Giants, Oakland A's), water polo matches, tennis matches, concerts, movies, DVD rentals, video-on-demand rentals, film festivals, plays (e.g., on and off Broadway), and other social gatherings.

Lack of attendance reduces the money-making potential of the other services provided by event organizers such as concessions (e.g., sale of souvenirs, sweatshirts, caps, hats, jerseys, blankets, towels, program guide, food, beer, corn dogs, hot dogs, peanuts, garlic fries, ice cream, nachos, and other items) and advertising (e.g., sponsorships, billboards, signs, TV and radio broadcast commercials). Additionally, empty seats diminish an organization's brand value by creating a negative perception of an event's popularity—in turn creating an increased need to sell more tickets to fill an event venue and increased marketing costs to sell more tickets to future events.

A common scenario is that a member, a season ticket holder (STH), purchases tickets for regular events and inevitably finds himself or herself unable to attend some of these events for a variety of reasons (e.g., work conflicts, family commitments, funerals, birth of a new child, more interesting competing events, logistics). Regular events are not limited to season tickets, but also include tickets to any recurring events (e.g., social gatherings). The invention also applies to nonrecurring events (i.e., a one-time ticket purchase) where the ticket holder can not attend.

When a ticket holder knows that he or she is unable to make a certain event, the ticket holder generally does not want to waste part of their investment by allowing the tickets to go unused. They would prefer someone else use the tickets.

An alternative attendee for an event is someone who tickets are made available to and wishes to attend in place of the original ticket holder. The process to find and distribute tickets to an alternative attendee for an event is often time-consuming (e.g., e-mailing or calling to find interested individuals), costly (e.g., to deliver the tickets by courier or messenger services) and complicated (e.g., what happens when multiple people respond at the same time).

The system of the invention provides value for event organizers, ticket holders, and alternative attendees for an event. For a system of the invention, there are multiple sources of revenue. For example, in addition to charging fees to the ticket holders or alternative attendees for an event, or both, event organizers can be charged with a software license fee for usage of the product or service, or both. This cost to an event organizer would be returned in increased attendance. Additionally, the system can help event organizers sell targeted advertising based on the stored preferences of members (e.g., advertisement based on which events a ticket holder or an alternative attendee likes).

The primary ticket market is defined as the sale of tickets from event organizers to consumers (e.g., San Francisco Giants box office). The secondary ticket market is defined as the sale of tickets from consumers to other consumers (e.g., auction and classified Web sites). The tertiary ticket market is defined as the transfer of tickets from consumers to other consumers, the difference from the secondary market being that there is no financial component to the transaction (i.e., the tickets are transferred for free).

In certain implementations of invention, system of the invention does not attach a monetary cost to things made available (i.e., tertiary market). The principles of the invention apply to even items offered onto a personalized network for cost, for barter, or other consideration.

A specific implementation of this invention is for distributing unused tickets to others in a personalized network specified by a member. A ticket is any item that confers a right or license to attend an event. The principles of this invention apply to the distribution of other things (not just tickets) including personal and real property, legal rights, vehicles (e.g., car, truck, SUV), boats, buses, trains, mobile phones, services, and furniture.

Figure 4:
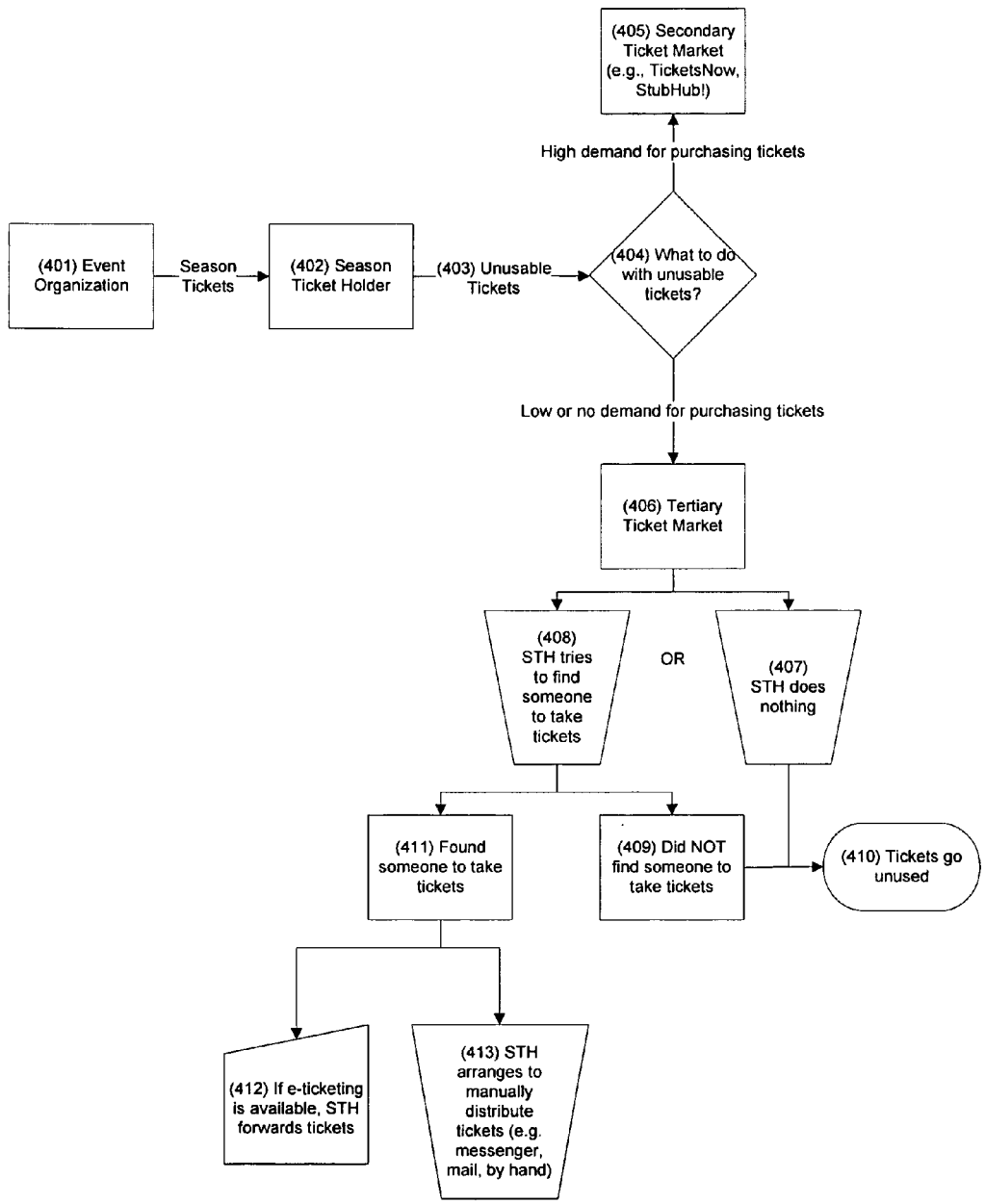
FIG. 4 shows a flow diagram of a technique for ticket owners or ticket holders to dispose of tickets to an event they cannot attend.

FIG. 4 shows a flow diagram of a technique for ticket owners or ticket holders to dispose of tickets to an event they cannot attend. An event organization (401) (e.g., for concerts, sporting events, or other) sells season tickets to a season ticket holder (402). A specific implementation of this invention is for season ticket holders or STHs; however, the principles of the invention apply to any ticket holder (e.g., ticket holder for a single event or a recurring event) or a holder or owner of any item or thing.

When a ticket holder has any unusable tickets (403), there are two possibilities (404). If there is high demand for those tickets, the ticket holder can sell the tickets through the use a secondary ticket market (405). Some secondary ticket market vendors may be auction and classified listings Web sites.

If there is low or no demand to purchase those tickets, the ticket holder may transfer the tickets in the tertiary ticket market (406). In the tertiary ticket market, if a ticket holder does nothing (407), the tickets go unused (410). Additionally in the tertiary market, even if a ticket holder tries to find someone to take tickets (408), they can fail (409) and the tickets still go unused (410). Even if a ticket holder finds someone to take the tickets (411), the ticket holder would additionally need to forward the tickets to the other party either by electronic method (412) or manually (413).

Table A gives detail for a specific flow in FIG. 4.

TABLE A

| Step | Description |
|------|-------------|
| 401 | Event organizers initiate the current ticket management process for entertainment and sporting events by planning, scheduling, and marketing events whose tickets are purchased by customers, especially season ticket holders (STH). |
| 402 | STHs are individuals or organizations that purchase tickets for a series of related events through a subscription method, but they may not attend each of the events included in their subscription for various reasons. |
| 403 | When the STH determines that he or she cannot or will not attend a specific event, he or she may seek to dispose of the tickets through the secondary market (i.e., sell the tickets). The STH may even try to profit by selling these tickets at a price higher than their purchase price. |
| 404 | The secondary market is often characterized by demand for a specific event ticket exceeding its supply. |
| 405 | If the STH cannot sell tickets into the secondary market primarily because of a lack of demand, the STH may try to give the tickets to someone else through a very manual and cumbersome process. |
| 406 | This fragmented market with few tangential competitors is the tertiary ticket market. |
| 407 | If the STH opts not to enter the tertiary ticket market for lack of time or contacts, the tickets go unused. |
| 408 | If the STH opts to find an interested party who wants the otherwise unused tickets, the STH will communicate with potential ticket members and await a positive response. Communication may occur through a variety of methods (e.g., e-mail, text message, speaking to someone in person, via telephone or posting an online ad). |
| 409 | A series of negative responses may mean the tickets still go unused when the STH cannot think of any other potential members or does not have time to continue this search and distribution process. |
| 410 | When tickets go unused, the STH has lost value on the entire price paid for the season (or series) subscription. |
| 411 | A positive response from a person whom the STH has contacted about the available tickets has the two parties to coordinating ticket distribution from the STH to the party using the tickets. |
| 412 | Some current ticketing systems allow for e-ticketing which simplifies the final step. E-ticketing allows the STH to forward the tickets to the interested party via electronically, usually via e-mail. |
| 413 | If manual ticketing is the only option, the ticket exchange will occur through various systems that require coordination (e.g., USPS, FedEx, courier, in-person meeting, and so forth) Each of these methods adds to the cost of this process and there are additional time commitments by the STH. |

Figure 5A:
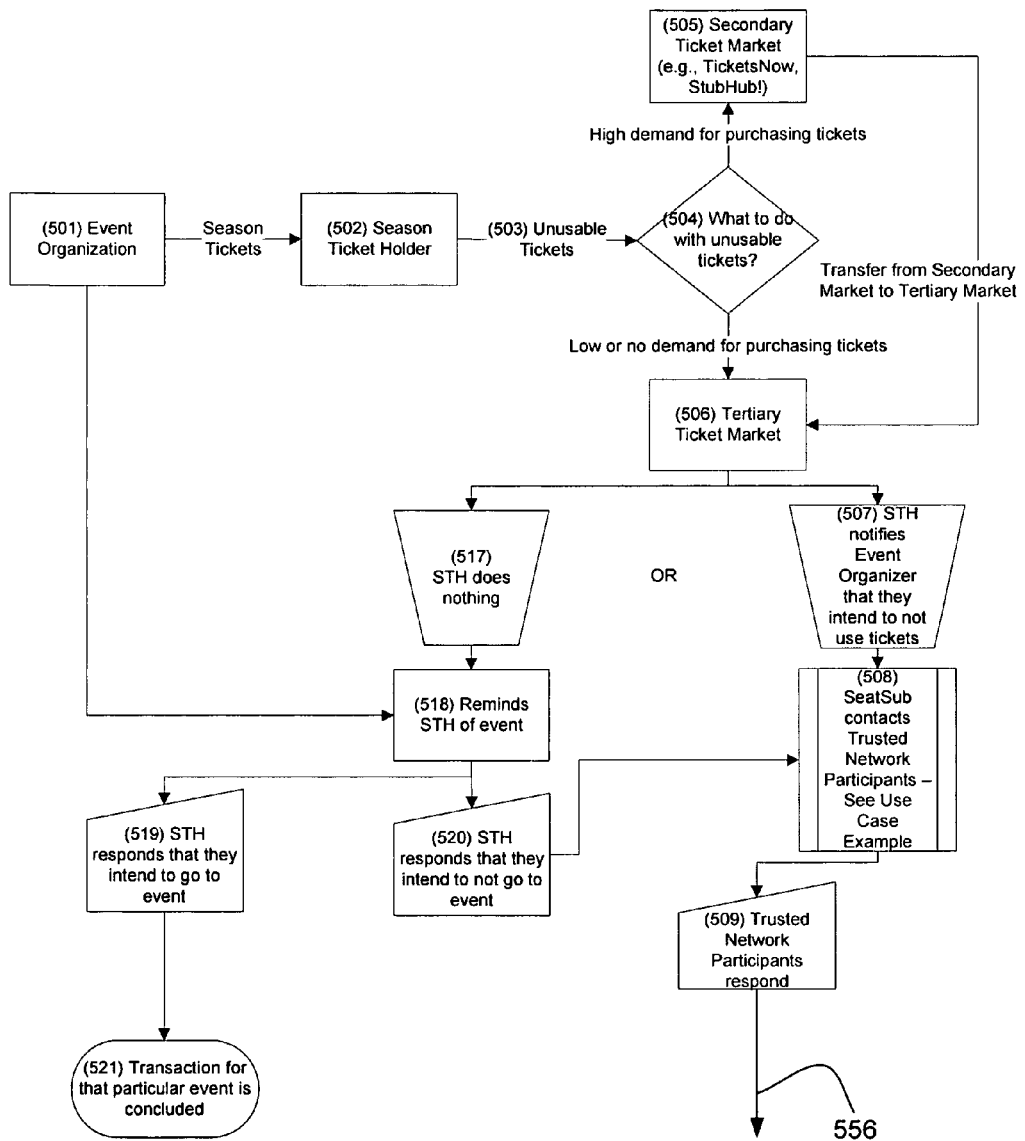
FIGS. 5A and 5B shows another flow diagram a technique for ticket owners or ticket holders to distribute tickets to an event they cannot attend.
Figure 5B:
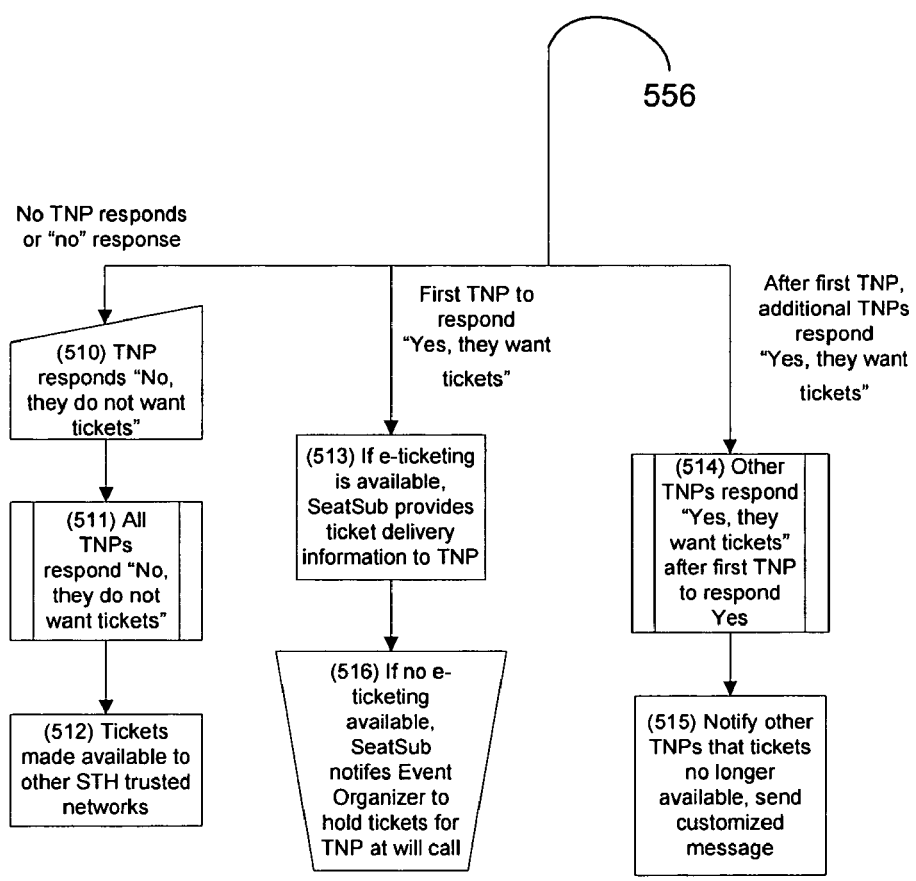

FIGS. 5A and 5B show another flow diagram of a technique for ticket owners or ticket holders to dispose of tickets they do not want to use or are unable to use. In an embodiment, the invention is a system that performs a flow as described. More specifically, the tickets are made available or distributed to those in the ticket holder's social or personal network.

Some specific implementations of flows are presented in this patent, but it should be understood that the invention is not limited to the specific flows and steps presented. A flow of the invention may have additional steps (not necessarily described in this application), different steps which replace some of the steps presented, fewer steps or a subset of the steps presented, or steps in a different order than presented, or any combination of these. Further, the steps in other implementations of the invention may not be exactly the same as the steps presented and may be modified or altered as appropriate for a particular application or based on the data.

A flow of the invention may be implemented using electronic devices including computers, mobile phones, personal digital assistants, or others. An electronic device may be linked to an electronic communications network such as the Internet, Ethernet, wide area network, local area network, computer network, intranet, cellular phone network, or other. So, a member on a mobile phone can use to system to pass their ticket to another member at a different mobile phone or computer An event organization (501) (e.g., for concerts, sporting events, or other) sells season tickets to a season ticket holder (502). A specific implementation of this invention is for season ticket holders however, the principles of this invention apply to any ticket holder (e.g., ticket holder for a single event or a recurring event).

When a ticket holder has any unusable tickets (503), there are two possibilities (504). If there is high demand for those tickets, the ticket holder can sell the tickets through the use a secondary ticket market (505). In an implementation, the system of the invention interfaces with another web site for the secondary ticket market. In another implementation, the system of the invention does not interface with a secondary ticket site, but is a standalone system. Some or all features of the secondary ticket system can be incorporated in the present system.

The member may decide to dispose of the member's ticket through the secondary ticket market (505) (not a tertiary ticket market (506)). Then, the system will assist the member in disposing the ticket through the secondary ticket market. In a specific implementation, the system supports interfacing and selling the ticket through a third party vendor to an outside member. Members would more likely be interested in this option in the case the ticket is one with high demand.

As discussed, in an implementation, the system interfaces with third party vendors to allow disposing of tickets through auctioning or on-line classifieds. However, in another implementation, the system provides functionality (i.e., not through a third party vendor) to dispose of tickets through auctioning or on-line classifieds. In a further implementation, the secondary ticket market may include a combination of capabilities provided by third party vendors and those built-in to the system. The system may also support ticket exchanges or ticket swapping between different members of the system.

Using the system of the invention, the member may decide to dispose of tickets through the tertiary ticket market (506) instead of the secondary ticket market. An economic reason for this is that perhaps there is low or no demand for a particular ticket. However, some members may decide (e.g., for personal reasons) to dispose of a ticket through their trusted network instead of disposing of the ticket using the secondary ticket market, even if there were high demand for the ticket.

In a specific implementation, this system uses social networking technology to make tickets available to potentially interested trusted network participants (TNPs or members) within a ticket holder's social network. Even if a ticket holder does nothing (517), the system will remind the ticket holder about the event (518) though a communications technique (e.g., U.S. mail, phone call, e-mail, instant message, SMS message, or other). For example, an e-mail inquiry may be sent to a ticket holder about an upcoming event a specific time (e.g., one week, two weeks, one month, or another time period) before the event date.

Members in a "trusted" network, or "trusted network participants," are the member's clients, coworkers, friends, family, and/or acquaintances with whom the member is familiar with and seeks to have benefit from the season ticket holder's shared seats. Contrast this use of a trusted network with another network where the season ticket holder does not personally select members to be in their network (e.g., Craigslist, eBay, or Amazon).

After receiving the inquiry, if the ticket holder responds that they will attend to the system of invention (519) or does not respond at all to the reminder sent by the system, then the system of the invention closes the transaction for this event instance (521). Nothing more needs to be done because the system does not need to dispose of the ticket for the member. However, at some point in the future, but before the event occurs, the member may change his or her mind, inform the system, and the system may be used to dispose of the ticket as discussed in the patent.

The system may have a minimum time limit (e.g., one hour, two hours, three hours, four hours, five hours, one day, or two days) before the event before it will handle disposing of the ticket for the member. This time limit may be set by the system administrator. For example, if there is only an hour before the event will occur, the system may send a message to the member that the system is unable to dispose of the ticket because the time is too short.

If the ticket holder responds that they will not go to the event (520), the system analyzes the reply and continues operation. Second, if a ticket holder notifies event organizer that they will not use the tickets, invention analyzes reply and continues operation. Once contacted, the system looks for a trusted network participant (509) to ask whether or not they want the tickets of the member who is unable to use them. The system may contact the trusted network participant through e-mail or another communications approach (e.g., text messaging and speech server calls). Line 556 in FIG. 5A connects to line 556 in FIG. 5B.

The flow of the present invention continues in FIG. 5B. If the trusted network participant does not want the tickets (510), the trusted network participant indicates this to the system, such as by way of e-mail, instant message, or other. Then, the system determines who is the next trusted network participant and contacts that member.

In a specific implementation, trusted network participants are classified into one of three groups—high priority, medium priority, or low priority. The message goes out in priority groups: high first, followed by medium after a specific amount of time, and then to low.

If each trusted network participant at a particular level (discussed in more detail below) replies that they do not want the tickets (511), the tickets are made available to other trusted network participants at a different level (e.g., the next level in a hierarchical level scheme). The technique of the invention proceeds by repeatedly inquiring different members, or checking with the members to determine whether they want to utilize the tickets (in an order or sequence as specified by the member), until someone is found who wants the tickets.

The first trusted network participant who accepts the tickets (e.g., informing the system through an e-mail message or text message) will receive the tickets (512). This first trusted network participant, who will receive the tickets, may be referred to as an alternate attendee for an event.

If e-ticketing is available, the system will provide the e-ticket directly to the alternate attendee (513). If e-ticketing is not available, the system notifies the event organization to hold the tickets at will call (516) for the alternate attendee. If additional trusted network participants respond to the system that they would like the ticket, after the alternate attendee has claimed the ticket, the system will notify these additional trusted network participants that tickets are no longer available (515) and can include a customized message from the event organizer (e.g., click here to purchase tickets at a special discount).

Table B gives detail for a specific flow in FIGS. 5A and 5B.

TABLE B

| Step | Description |
|---|---|
| 501 | Event organizers initiate the system of the invention ticket management process for entertainment and sporting events by planning, scheduling, and marketing events whose tickets are purchased by customers especially season ticket holders (STH). |
| 502 | STHs are individuals or organizations that purchase tickets for a series of related events through a subscription method, but they may not attend each of the events included in their subscription for various reasons. |
| 503 | When the STH determines that he or she cannot or will not attend a specific event, he or she may seek to dispose of the tickets through the secondary market (i.e., sell the tickets). The STH may even try to profit by selling these tickets at a price higher than their purchase price. |
| 504 | The secondary market is often characterized by demand for a specific event ticket exceeding its supply. |
| 505 | If the STH cannot sell tickets into the secondary market primarily because of a lack of demand, the STH may try to give the tickets to someone else through a very manual and cumbersome process. |
| 505a | If demand for tickets is lacking for whatever reason, tickets may be transferred from the Secondary Market to the Tertiary Market. Additionally, the system may partner with Secondary Market organizations to automate this transfer of markets based upon some established criteria. |
| 506 | The system, through its strategic introduction of a technological solution, will redefine a currently fragmented market with few tangential competitors: the tertiary ticket market. |
| 507 | When the STH realizes that he or she will not be able to use tickets for a specific event, he or she may opt to notify the system through any one of a Web site, text messaging, phone call, or other, or any combinations of these. |
| 508 | With the event organizer's ticketing system linked to the system's computer system, the system starts to contact the STH's trusted network participants (TNPs) whose names and contact information the STH has provided at the time of registering for the system's solution. |
| 509 | With the event organizer's ticketing system linked to the system's computer system, the system starts to contact the STH's trusted network participants (TNPs) whose names and contact information the STH has provided at the time of registering for the system's solution. |
| 510 | If the first TNP responds negatively to the free ticket opportunity, the system records the response. |
| 511 | Other TNPs respond negatively too, and the system continues to add their responses to the database for this individual STH and event. |
| 512 | If the STH has agreed to make tickets available to other parties, which may also include nonprofit organizations, the system contacts this new group of TNPs until an affirmative response is received. In a specific implementation, tickets stay within one's own network (rather than being transferred from one network to another), or will be transferred to a charity of the STH's choice (e.g., a charity that is sponsored by the event organizer). |
| 513 | The system intends to integrate e-ticketing into the distribution system whenever possible to optimize efficiency and reduce costs. |
| 514 | When the first TNP responds affirmatively, system will note this reply and prepare for all other replies. |
| 515 | The system's computer will record all positive and negative responses in each so the event organizer can create customized messages to persons who replied positively to the ticket offer. |
| 516 | If e-ticketing is not available, the system will communicate with the event organizer to hold tickets at will call for TNP or provide information on how the STH and TNP can coordinate the most efficient delivery method possible (e.g., interoffice mail, pick up at someone's desk). |
| 517 | Event for which the STH has purchased tickets is within a few days of occurring, and the STH has not indicated a scheduling conflict or other reason not to attend. |
| 518 | The system reminds the STH through e-mail, text message, phone call, or other preferred method of upcoming event (any or a combination of these). |

TABLE B-continued

| Step | Description |
| --- | --- |
| 519 | STH indicates that he or she will attend the event in response to the system reminder. |
| 520 | STH indicates that he or she will not attend the event in response to the system's reminder, and the process is redirected to step 508 to find use for the tickets. |
| 521 | When the STH does not respond or indicates intention to attend an event, the process is concluded. The system records the response and no further action is required. |

Figure 6:
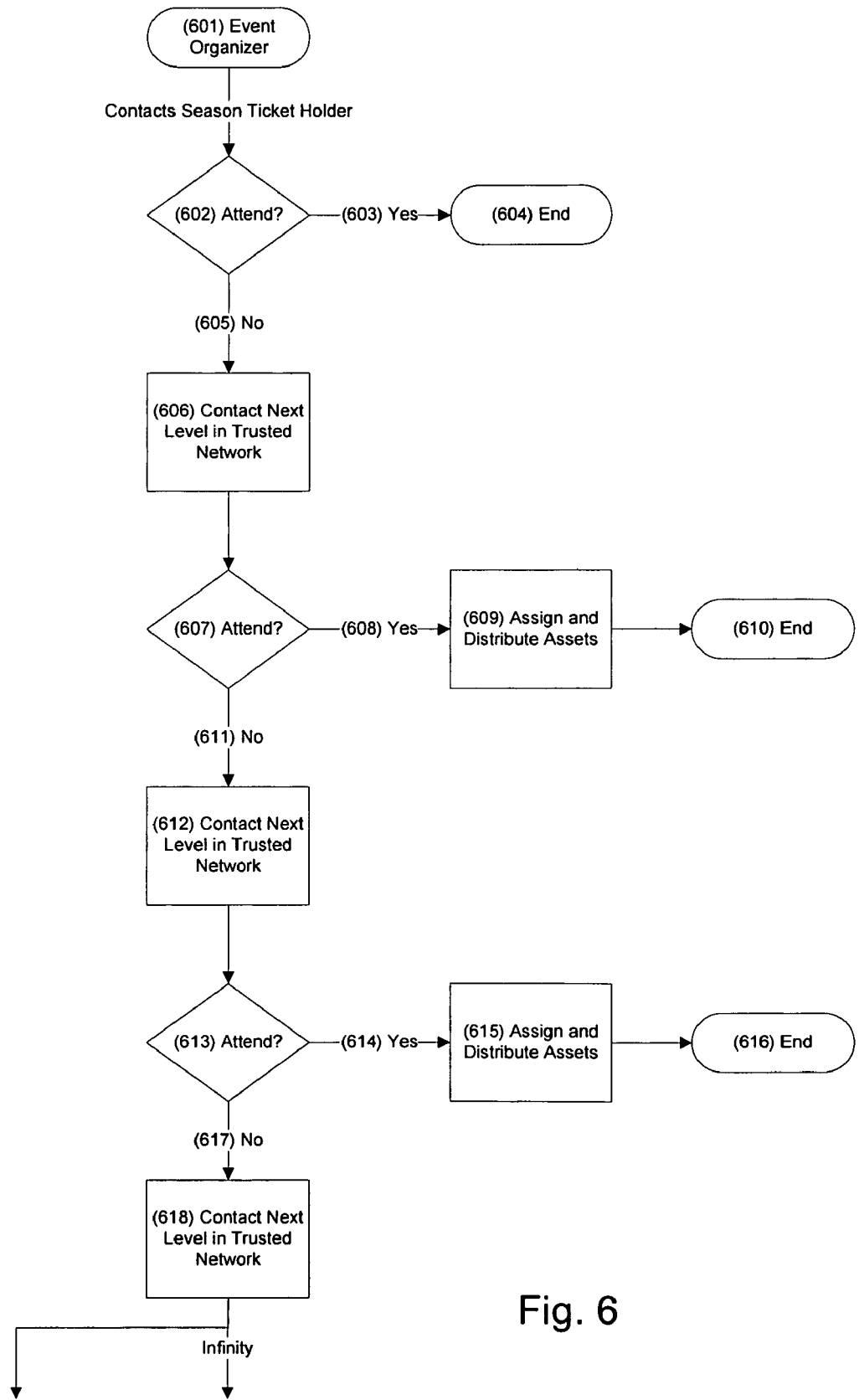
FIG. 6 shows a case example of operation of a system of the invention through levels within a degree of separation.

FIG. 6 shows a case example of operation of a system of the invention through levels within a degree of separation. The invention permits establishing different levels of trusted networks. The system allows a member to pick and choose members to place in each level. The system can make things (such as tickets) available to members within the same level and those members at different levels at different times. Using this feature of the invention, the member can further differentiate members of the member's trusted network.

The system sends, receives, and analyses messages to search for an alternative attendee for an event. In particular, the system contacts (601) a season ticket holder to check (602) whether the season ticket holder plans to attend a particular event. The system may contact the member through any number of techniques including regular mail, e-mail, instant messages, SMS messages, telephone call, electronic messaging, or other.

If the ticket holder does not respond to the system or responds to the system that the ticket holder plans to attend (603), the system does not need to perform any further action (604). The ticket holder may respond to the system by way of reply e-mail, selecting options through an interactive voice response system, instant message, SMS message, electronic messaging, or other. Any or any combination of these options may be used.

However, if the ticket holder responds to the system that they do not plan to attend (605), the system contacts (606) members of the first level of the ticket holder's specified trusted network (607). In a specific implementation, a trusted network may be an ordered list of potential alternative attendees specified by the member.

In an implementation, as discussed above, trusted network participants are grouped into three groups, high, medium, and low. In a further implementation, the system will provide more granular prioritization within the groups, such as high1, high2, high3, and so forth.

In a further implementation, within a trusted network, different levels of members exist and a member can exist on multiple levels. Levels can be set in ordered groupings so that each level exists in a hierarchical order where some levels have available tickets not yet available to other levels. This allows flexibility for a member to define groups who have ticket availability.

If every person on a given level of a ticket holder's trusted network replies to the system they do not want the tickets (611), the system makes the tickets available (612) to the next level (e.g., a lower level of the hierarchy) (613).

The system repeats making the tickets available to each level (612) until the tickets have been made available by the system to all the levels established by member. If the tickets are ever made available to someone that wants the tickets (614), the system will deliver the tickets to the alternative attendee for an event (615).

Table C gives detail for a specific flow in FIG. 6.

TABLE C

| Step | Description |
| --- | --- |
| 601 | The system sends a reminder to the STH of an upcoming event. |
| 602 | The STH is faced with a binary question: to attend or not. |
| 603 | A "yes" response means that no more of the system's services are required other than a recording of this communication. |
| 604 | The prospective transaction ends from the system's perspective. |
| 605 | For a "no" response, the system to start the notification process. |
| 606 | The system architecture is designed to prioritize TNPs in accordance with the STH's wishes. |
| 607 | Each TNP will receive an e-mail, text message, phone call, or other communication with the same binary question posed to the STH: to attend or not. |
| 608 | A "yes" response will start the ticket exchange process. |
| 609 | The first "yes" respondent will receive instructions from the system in the communication mode he or she prefers on how to obtain the event tickets. |
| 610 | Once the distribution is finalized, the transaction ends and the system records relevant data. |
| 611 | A "no" response tells the system to keep searching for interested TNPs. |
| 612 | The system responds by contacting the next TNP level. |
| 613 | Each TNP at this next level will receive an e-mail, text message, phone call or other communication with the same binary question posed to the STH: to attend or not. |
| 614 | A "yes" response will start the ticket exchange process. |
| 615 | This "yes" respondent will receive instructions from the system in the communication mode he or she prefers on how to obtain the event tickets. |
| 616 | Once the distribution is finalized, the transaction ends and the system records relevant data. |
| 617 | A "no" response tells system to keep searching for interested TNPs. |
| 618 | The system responds by contacting the next TNP level. |

Figure 7:
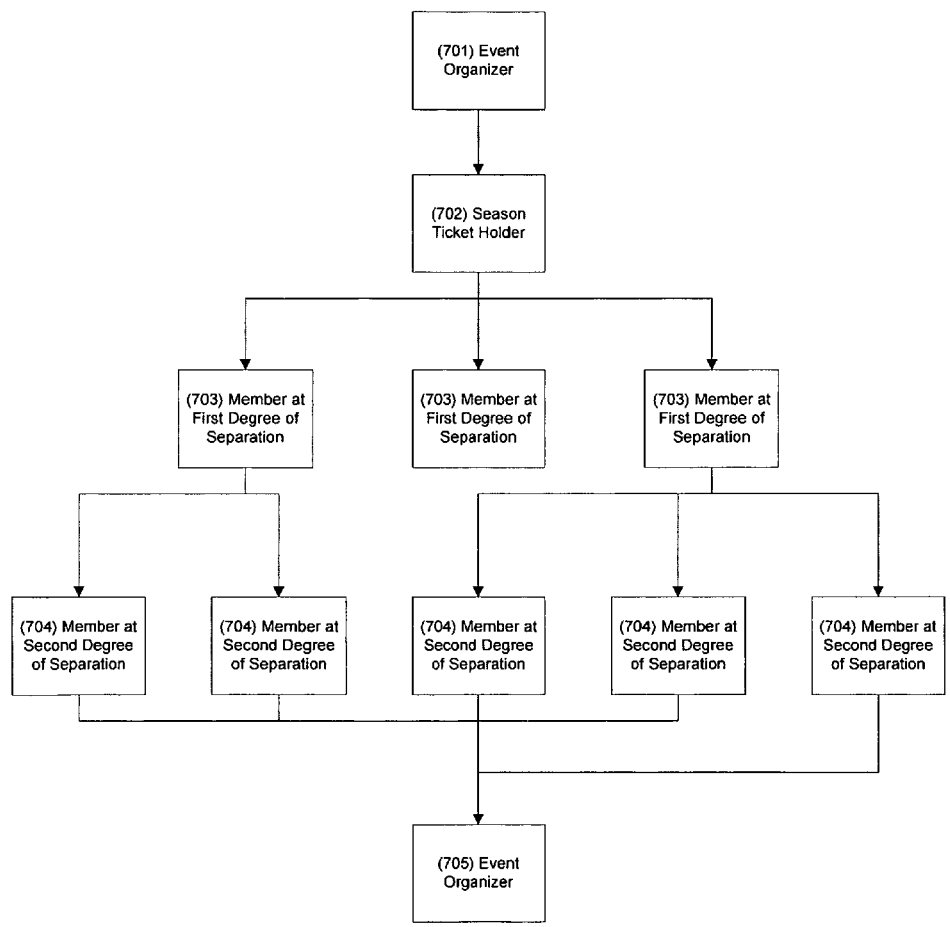
FIG. 7 shows a case example of operation of a system of the invention through degrees of separation.

FIG. 7 shows a case example of operation of a system of the invention through degrees of separation. A technique of the invention allows building of a relationship path among its members by degrees of separation from a ticket holder (such as a season ticket holder (STH)). Each box in FIG. 7 represents a single member, entity, or the event organizer. However, the principles of the invention apply to any number of members, entities, or event organizers, and there may be any number of degrees of separation.

Although various degrees of separation are discussed, a system of the invention can be implemented allowing any number of degrees of separation, one, two, three, four, five, six, seven, eight, nine, ten, or more. A system implementation has one degree of separation. The degrees of separation feature can be used as a corporate tool, where the season ticket holder is someone at the corporation (e.g., a sales manager), who enters people in his or her network (e.g., his or her direct reports or sales reps), who will then enter in more people into their network (e.g., clients).

For example, first a ticket holder (702) purchases tickets from an event organizer (701). Then a ticket holder invites someone as a possible trusted network member. If they accept the invitation, the system then stores this member as a first degree member in the ticket holder's trusted network (703). This first degree member then invites another person to join and, if they accept, this person is added into the ticket holder's trusted network as a second degree member (704). Additional members in an n-th degree are similarly added, where n is an integer.

In an implementation, the event organizer 705 is a final degree of separation. Event organizer 705 may be the same event organizer as in 701. This is the situation where none of the people or entities in a member's trusted network wants the tickets, then the tickets are returned to the event organizer to distribute as the event organizer desires. In an embodiment, the member may place restriction on how the event organizer distributes the tickets (e.g., restrict the tickets to students only, restrict the tickets to alumni only, restrict the tickets to alumni in a certain graduating class only, and any other restrictions). This maximizes the chance of ticket use because the event organizer may have included in their network, members not within the trusted network of the member.

In an implementation, the system does not cap or put a maximum limit on the number of degrees of separation from the ticket holder but a ticket holder may limit availability of their tickets by number of degree of separation. In an implementation, the system prompts the ticket holder for approval each time before tickets are made available to the next degree of separation. This system increases exposure of the tickets to parties and increases the ticket's potential of being used.

The system of invention can therefore store multiple degrees of separation from the ticket holder. Although this figure shows only two degrees of separation from the ticket holder, other implementations of the invention may recognize that a system of the invention permits any number of degrees of separation (e.g., 3, 4, 5, 6, 7, 8, 10, 15, 20, 25, or more) from the original ticket holder.

The system may be set up so that, at any point in the relationship chain or process, the member receives an electronic message that the system is continuing to the next degree of separation. Additionally, the system may wait before sending a message or other notification to the next degree of separation until member has confirmed to system to make the tickets available to this next degree of separation. The system may also specify that the tickets be returned to the event organizer for distribution. Further, the event organizer may send members requests for tickets, especially in situations where a large party wants tickets.

Figure 8:
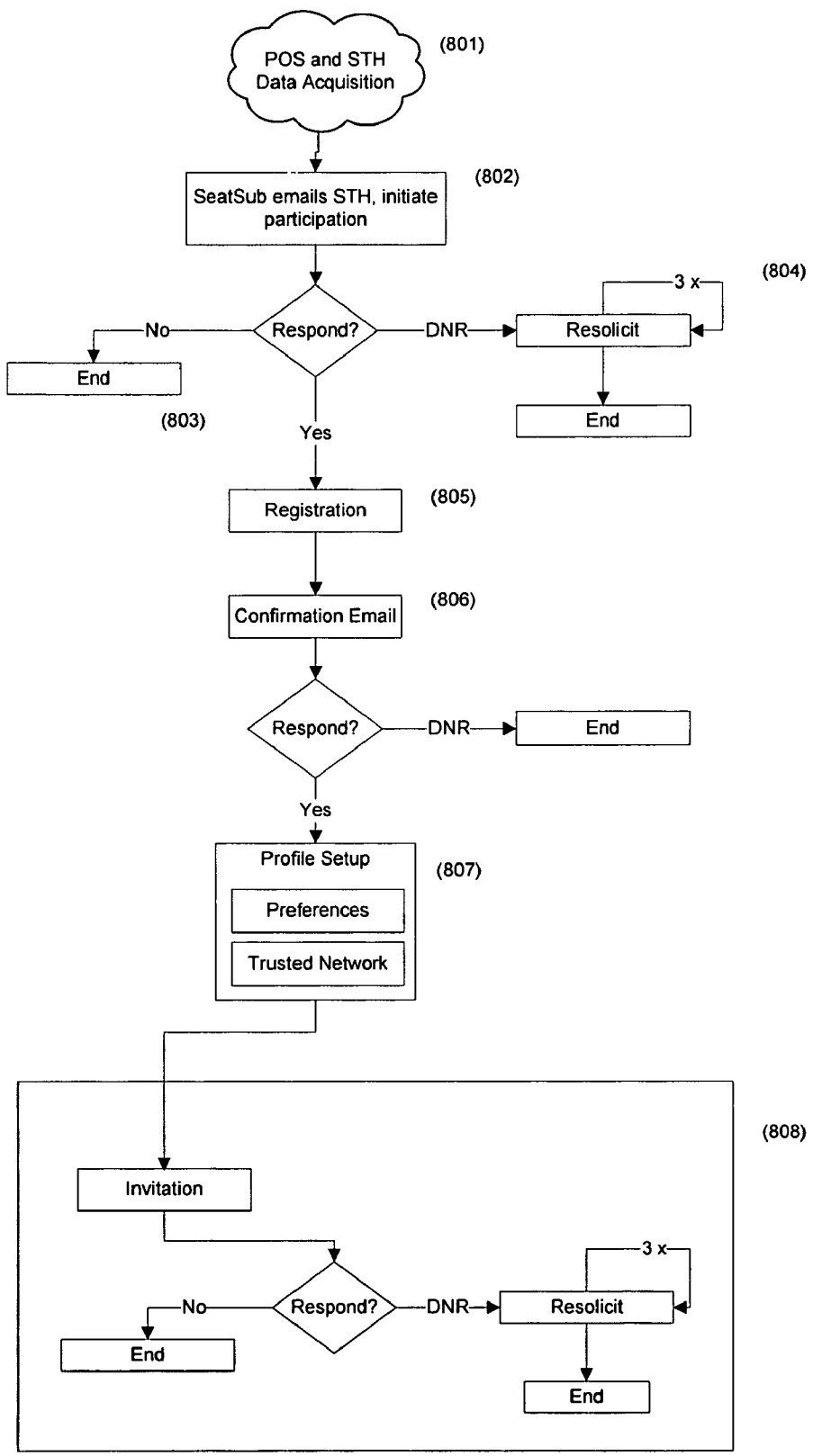
FIG. 8 shows a member registration and setup process flow of the invention.

FIG. 8 shows a specific implementation of a ticket holder registration and setup method. At the point of sale (POS), a ticket holder's data is acquired (801) and becomes a member or registered member in the system. Data may be either pushed or pulled from existing POS systems at organization. This data is processed by the system to request the ticket holder's participation into system of invention (802). In a specific implementation, e-mail communication is sent using a blended HTML and plain text format to ensure it reaches, and is readable, by target. Legacy mail clients and mobile devices still have limited support for HTML.

If ticket holder does not respond (DNR), the system solicits again (804) for a number of times (which determined by system and may be set by a system administrator). In a specific implementation, there is a resolicit flag which is set every week for three iterations (or any other number of iteration in other implementations). Each message will be different to ensure a broader range of information appeal.

If the system receives a message that the ticket holder does not wish to join, the system ends solicitation (803). In an implementation, there are reports and follow-up actions for "no" responses to participation for ticket holder, but not for trusted network "no" responses.

If system of invention receives a message that the ticket holder wants to join, the ticket holder registers with the system (805) and is sent a confirmation e-mail (806). In an implementation, the registration data includes: name (e.g., first and last), e-mail, password (e.g., entered twice to confirm), and an agreement to terms and conditions (e.g., a check box). In an implementation, confirmation e-mails are written in HTML with text underlay for broadest client compliance.

After receiving a reply to confirmation e-mail, the system proceeds to allow the new member to setup their system profile (807). In an implementation, the profile setup includes two steps: (a) member preferences and (b) their network for seat use. By specifying member preferences, a seat candidate is encouraged to enter all possible e-mail addresses (one e-mail address or multiple e-mail addresses) he or she uses to reduce his or her chances of being hit multiple times by multiple members. In an implementation, a seat candidate is required to register with the system before the candidate can receive tickets.

To register, the candidate may be required to specify a minimum amount of information such as name and e-mail address. Further information may be requested, such as home address, mailing address, type of event interests, and birth date. By forcing candidates to register, the system increases its membership and collects information about its membership. This may increase advertising revenues and ease the process of matching tickets to interested people.

The profile includes such data as the ticket holder's preferences and members of their trusted network. This data is saved by the system for a ticket holder so that the data may be reused at a later time. The ticket holder can also subsequently add or modify members by changing the level of a trusted member. As discussed above, in an implementation, a ticket holder may set up any number of independent trusted networks and levels within a trusted network.

The system proceeds to ensure that prospective members of the member's trusted network wish to join the member's trusted network by electronic or other communicative means. Replies by prospective members of the member's trusted network are then analyzed by system to confirm membership into the trusted network 808. In an implementation, the trusted network invitation is an infinite loop allowing any level of members to reach into their network. Cross-checking will be used to prevent double hits. Double hits are contacts that have been entered into the site multiple times by people at different degrees from the seat initiation process.

Because the invention saves information on seat usage, it can also provide metrics for the event organizer on the supply and demand of seating at their events (e.g., total participants, number of solicitations, number of seats distributed, ratio of outgoing messages to seats used, percentage increase in seat usage). It also enables event organizers to easily contact ticket holders before and after events.

The following description is for a specific implementation of a system of the invention called SeatSub. A system of the invention may be known by any name or identifier, and this description is provided merely as a sample implementation. It should be understood that the invention should not limited to the specific features presented. A system of the invention may have additional features (not necessarily described in this application), different features which replace some of the features or components presented, fewer features or a subset of the features presented, or features in a different order than presented, or any combination of these. Aspects (e.g., screens) of the invention may be modified or altered as appropriate for a particular application or use.

Figure 9:
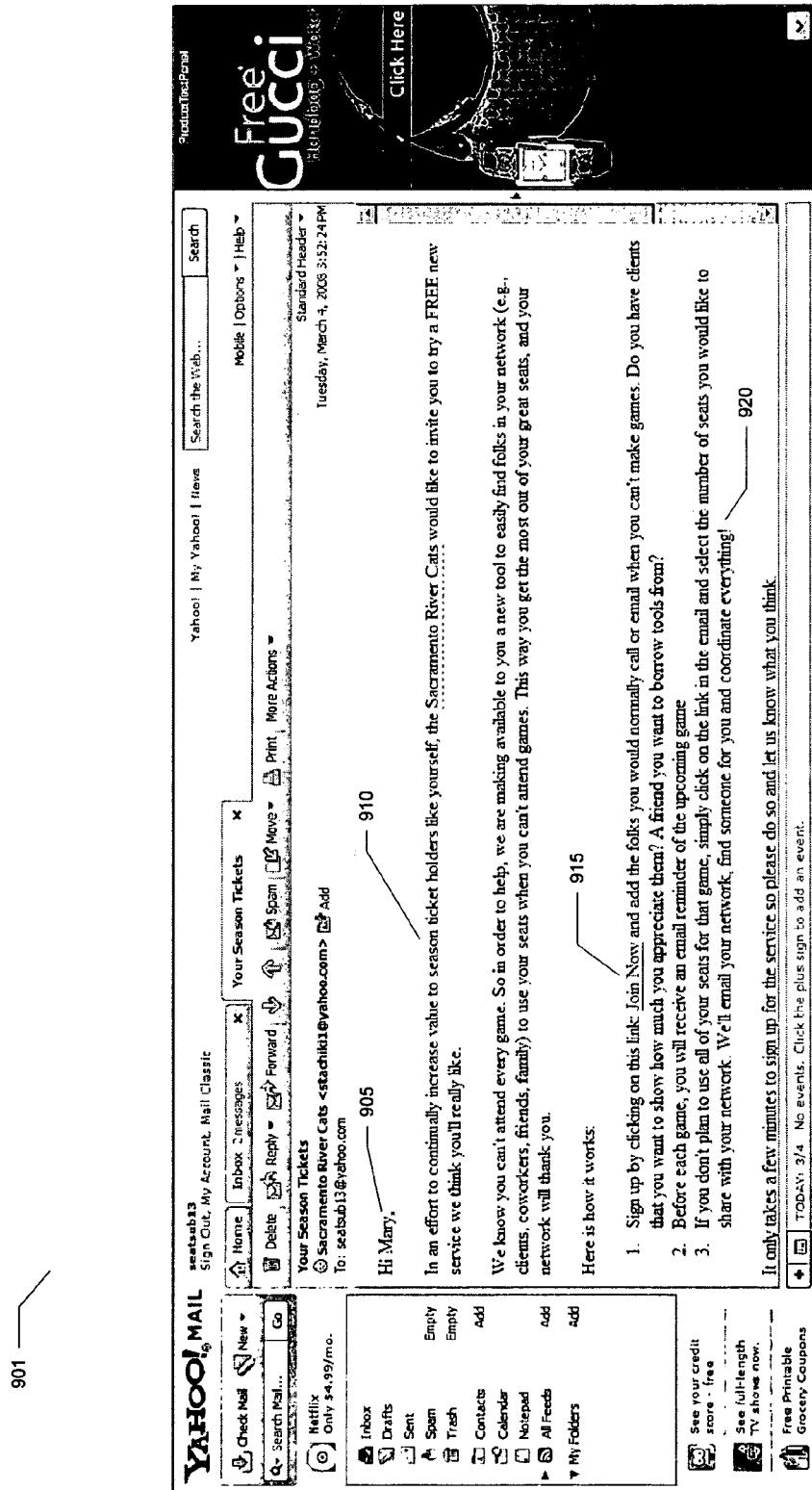
FIG. 9 shows an example of an e-mail invitation which is used to solicit season ticket holders who are interested in becoming members.

FIG. 9 shows a sample invitation e-mail sent by a system, on behalf of the organization, to the season ticket holder. This e-mail may be sent to a season ticket holder after their data has been collected and processed by the system at the point of sale as indicated in FIG. 8. Once the season ticket holder's information is processed, the system automatically uses this new information to send the season ticket holder an e-mail asking them to join the network 901.

This e-mail is periodically sent to the season ticket holder until they have indicated their interest or noninterest in becoming a member of the network. This e-mail contains a salutation 905, a welcome message identifying the purpose of the message 910, a hyperlink labeled "Join Now" where members are taken to a sign-up screen upon clicking on the link 915, and a short list of instructions on how to become a network member 920.

The e-mail server may be any service or server capable of sending and receiving e-mails (e.g., Yahoo, Gmail, Hotmail, AOL, and others). The format of the invitation e-mail may vary to accommodate special messages from the team or other partnerships related to the ticketing process.

In this implementation of the invention, the e-mail is sent through a Web mail service. However, in another implementation of the invention, network e-mails may be sent and received through other means, such as a corporate e-mail system (e.g., IBM Lotus Notes or Microsoft Exchange), through a Post Office Protocol (POP3), or Internet Message Access Protocol (IMAP4) system.

Figure 10:
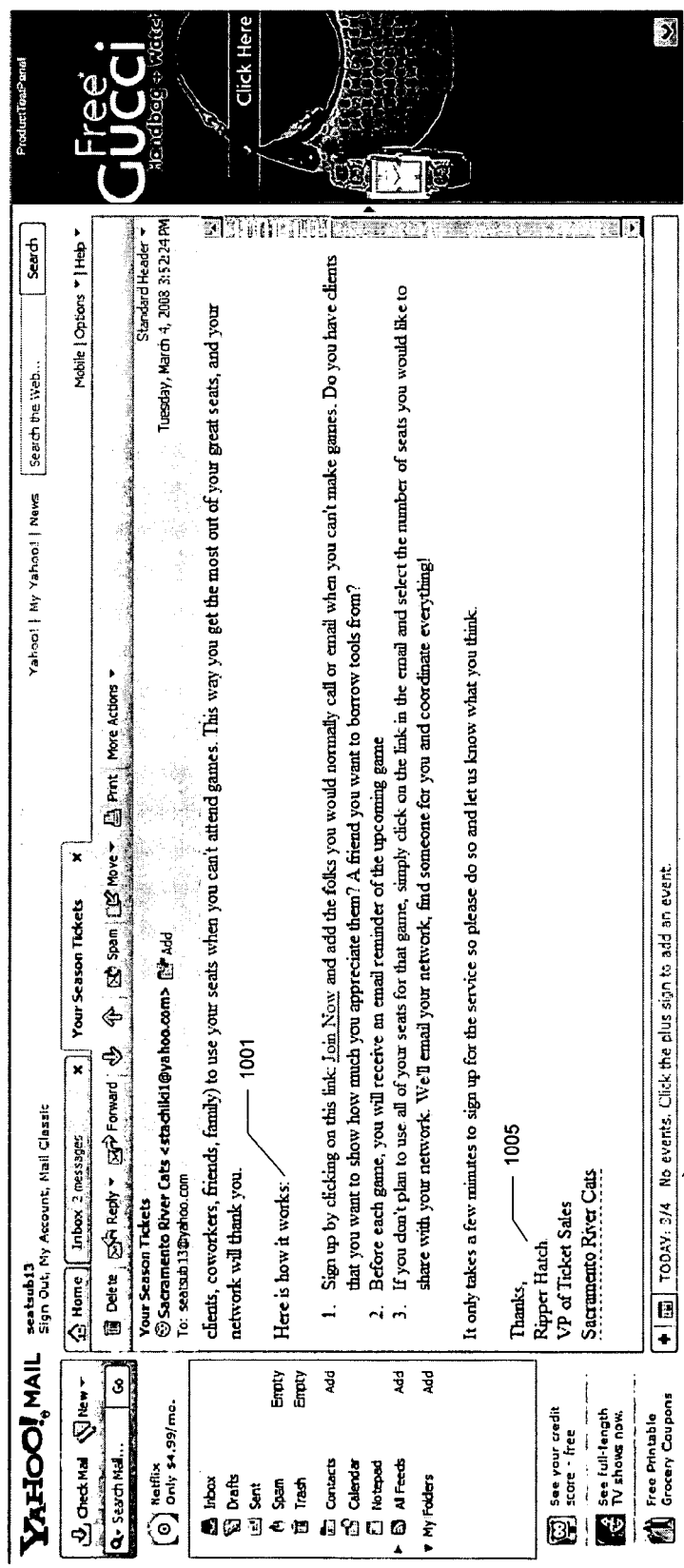
FIG. 10 shows an alternative view of the e-mail invitation used to solicit season ticket holders who are interested in becoming members.

FIG. 10 shows an example of the bottom portion of the invite e-mail after the season ticket holder utilizes the side scroll bar to scroll down the e-mail. This view of the e-mail begins where season ticket holders are given additional information on how a season ticket holder could utilize the network 1001. If the season ticket holder does not respond to an invitation e-mail, different variations of the invitation may be sent to the season ticket holder each time the person is resolicited.

For example, the first e-mail may give the season ticket holder a broad idea of the invention while the second or third e-mail may further reiterate the benefits of becoming a network member. The network may be set up so that each e-mail is different in order to capture the interest of the season ticket holder. A salutation concludes the e-mail from a representative of the season ticket holder's team 1005. Another implementation of the invention may include hyperlinks to other resources (e.g., team Web site link, SeatSub home screen link, or webmaster's e-mail address link).

Figure 11:
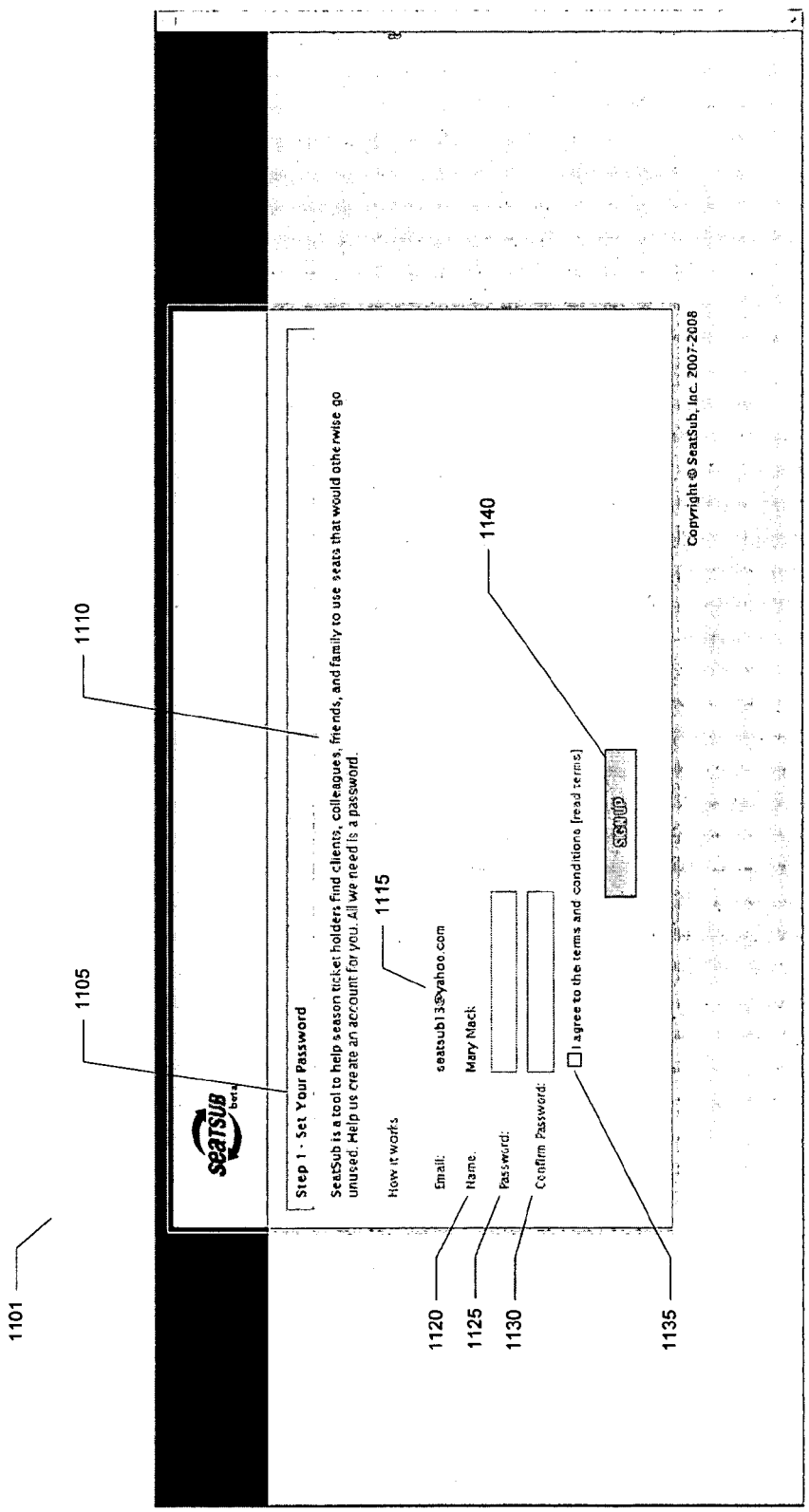
FIG. 11 shows a step in the registration process where members can create an account by entering and confirming a password.

FIG. 11 shows a password set-up screen. After the season ticket holder responds to the e-mail invitation to join the SeatSub network by clicking on the "join now" hyperlink embedded in the e-mail 915, they are taken to the network's password set up screen in the registration process 1101.

A banner running along the top of the screen indicates progression to a step one of the sign-up process 1105. The password set up screen includes a help text 1110, an e-mail field 1115, a name field 1120, a password input field 1125, and a confirm password input field 1130. Below the banner is the help text of step one, which may include instructions on how the network may be used or how using the network could benefit the season ticket holder. The e-mail field is prepopulated with the season ticket holder's e-mail address and name. The e-mail field defaults to the e-mail address specified by the inviter, which may be later changed by the new member.

The new season ticket holder member is invited to enter a password into a blank input box. The member may confirm their new password in another blank input box before moving on to the next screen. In another implementation, the invention may require a password to be of a minimum length or have certain characters for security purposes. A field or drop down menu requiring members to create a security question may also be implemented in another implementation of the invention.

Once the new member has entered in their password information, the member must "check the box" by double clicking on the check box 1135, indicating an agreement to the terms. This check box must be checked prior to moving on in the sign-up process. The member may then approve the information on the screen by clicking on a sign up button at the bottom of the screen 1140.

In an implementation of the invention, a member's name may include, for example, the member's first and last name. A name may also be user name that the new member creates, or another form of identification (e.g., company name, employee number, and others). A password may also include any variation of numbers and letters specified by the member.

Figure 12:
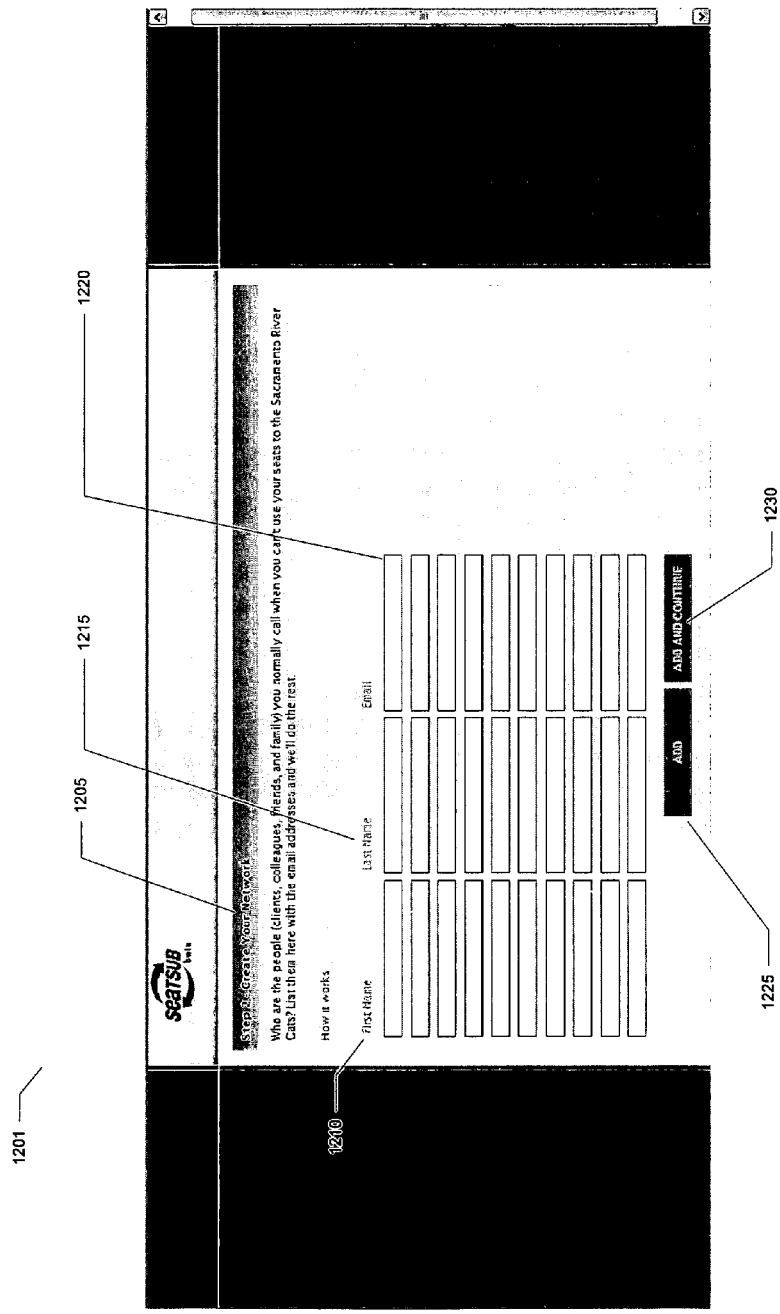
FIG. 12 shows another screen in the registration process where members may create a list of contacts to be included in their network.

FIG. 12 shows the network set up screen in the registration process. Once a season ticket holder has confirmed their password and information in step one by clicking "sign up," they are directed to step two, the network set up screen 1201. On this screen, a banner may be used to let members know that they have moved on to step two in the registration process 1205. A separate input box exists for each contact's first name 1210, last name 1215, and e-mail address 1220.

A specific implementation of this invention may ask for the member to enter information for one up to ten contacts. However, other implementations may allow for members to enter in substantially more contacts (e.g., up to 50, 60, 70, or more than a hundred contacts) by clicking on the "Add" button 1225. The member may add contacts by entering information into the input boxes and clicking the "Add" button, or may add more contacts and leave the screen by entering the information and clicking "Add and Continue 1230," which would take them to the next screen.

Figure 13:
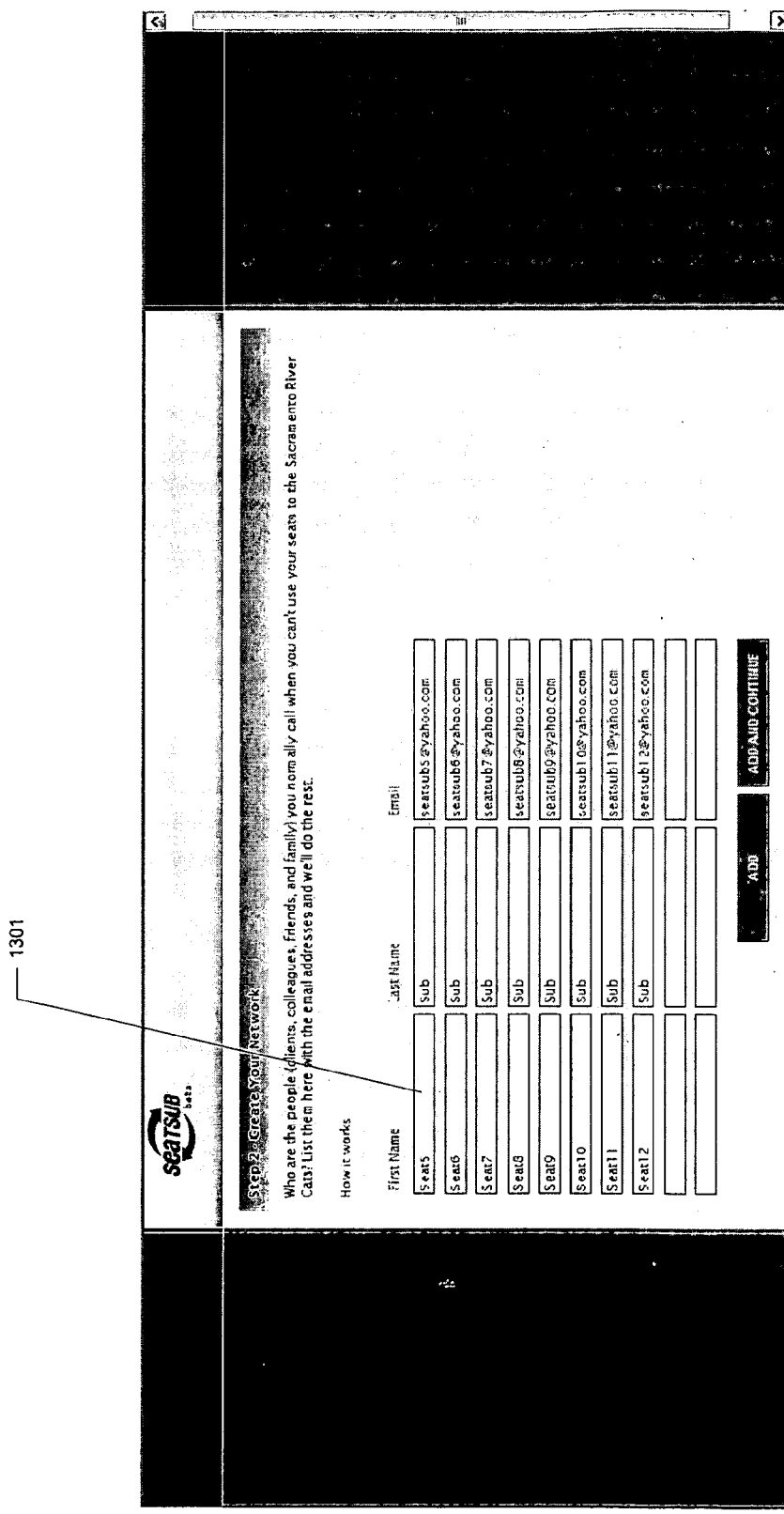
FIG. 13 shows another view of the registration process after the member has entered in new contact information.

FIG. 13 shows an example of the network set up screen after the member has filled in all their network contact information 1301. In one specific implementation of the invention, clicking the "Add" button may produce 1, 2, or 3 more contact boxes if the member has completed all the contact input boxes on the screen and wishes to enter in more contacts. In another implementation, clicking "Add" may allow members to save the contact information they have entered in order to prevent loss of the information.

In another implementation of the invention, contact information may include not only a first name, last name, and e-mail, but may also include work number, mobile number, address, home number, or a combination of this information.

Figure 14:
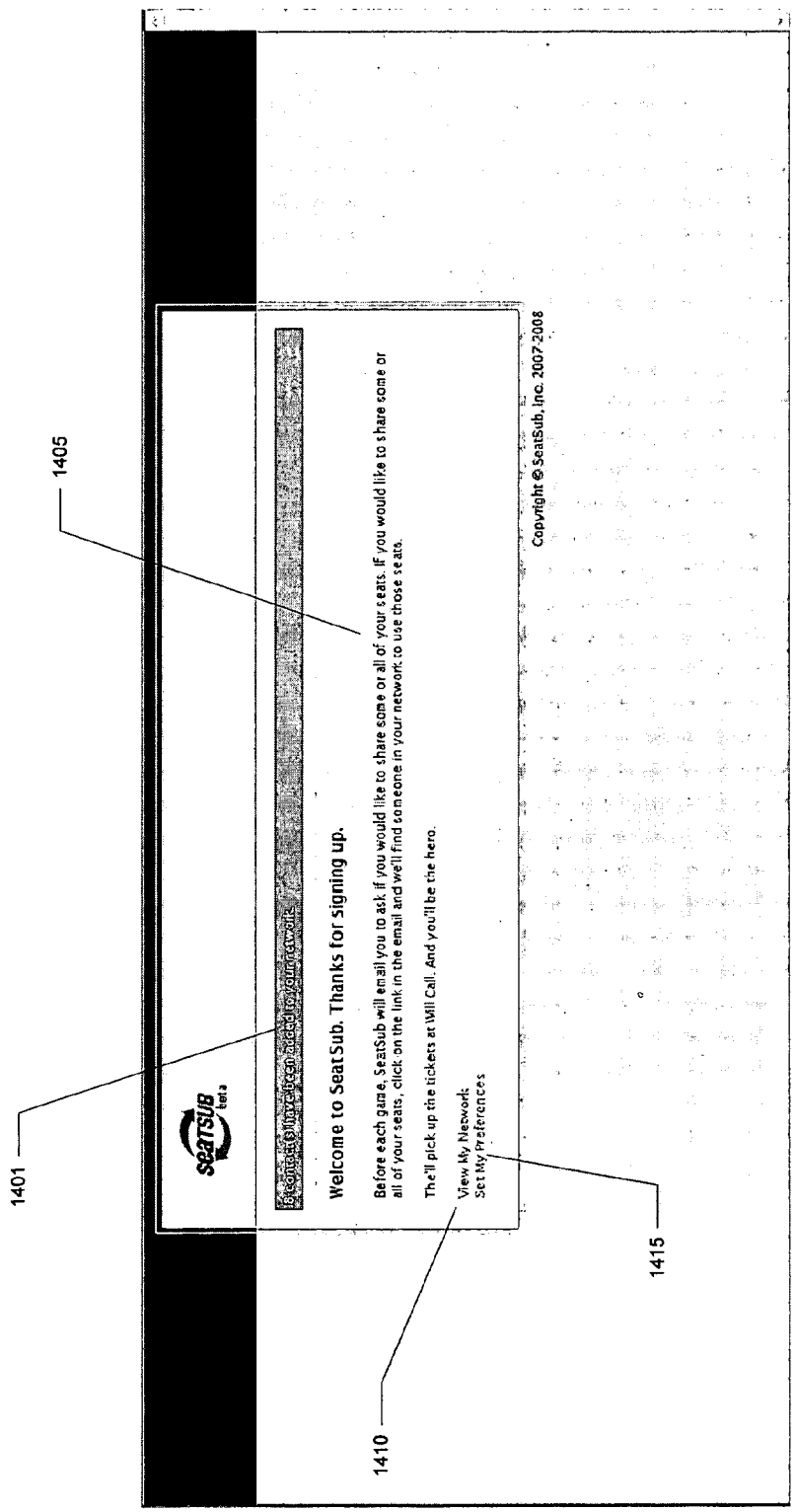
FIG. 14 is an example of a member confirmation screen after registration has been completed.

FIG. 14 shows an example of the registration confirmation screen. After the member has completed the first and second steps of the registration process, a confirmation screen welcomes them to the network and further gives the member information on ways they may use the system work for them as season ticket holders. This information can range from help text directing members to click on the link in the network's reminder e-mail to hyperlinks to the network site inserted in the confirmation screen.

In an implementation of the invention, the registration confirmation screen shows a banner across the top notifying the member of the number of contacts just added to their network 1401. The text may include a thank you to the member for signing up with the network, and then further explain the process of utilizing the system 1405. Members may select the "View My Network" 1410 link, or the "Set My Preferences" 1415 hyperlink to go back and access the respective screens.

Hyperlinks may be included in a font or font color that is unique from the text on the rest of the screen to let members know that the text is a hyperlink to another screen.

Other implementations of this invention may also have options (e.g., hyperlink to a network invitation screen) for the member to invite other potential new members once they have signed up.

Figure 15:
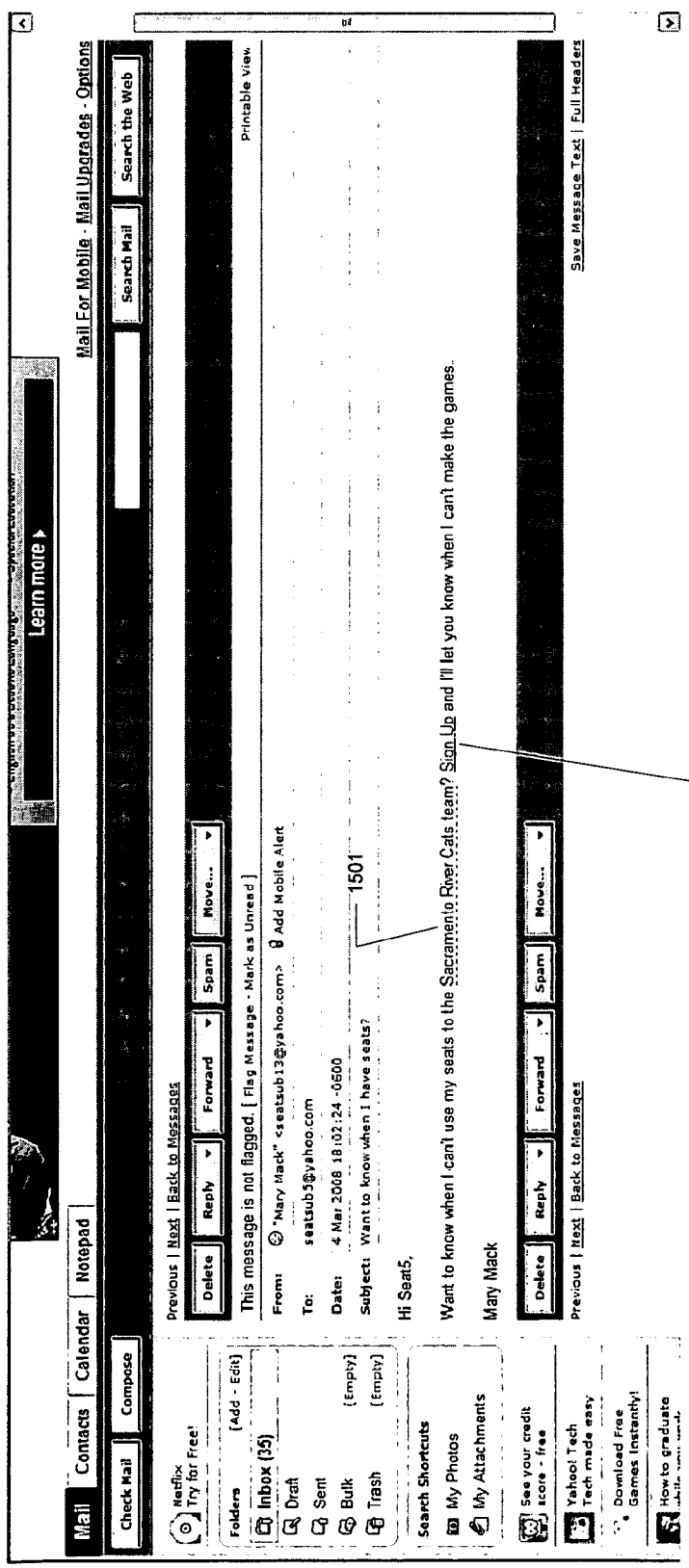
FIG. 15 shows an example of an e-mail from a season ticket holder to network members prompting them to sign up if they are interested in receiving a season ticket holder's shared seats.

FIG. 15 shows an example of an e-mail invitation to a trusted network member. Once a season ticket holder has established their profile, preferences, and trusted network as indicated in a step 807, network contacts are able to receive this e-mail once the season ticket holder chooses to share their seats. This e-mail lets network members know that a season ticket holder has shared seats to a particular game (i.e., Sacramento River Cats) 1501.

The name of the team will change according to the team that is playing. A hyperlink is inserted into the e-mail to allow members to click on the hyperlink and sign up for notifications if and when the season ticket holder's seats are shared 1505.

Another implementation of the invention may have other information included in the e-mail, such as, the season ticket holder's contact information (e.g., e-mail, phone number, address) or options for pick-up or mailing. Network members are required to register in order for the system to increase its membership and broaden the informational data available about members of the system. By doing this, the network may increase advertising revenues and provide a more precise match of tickets to interested people.

Figure 16:
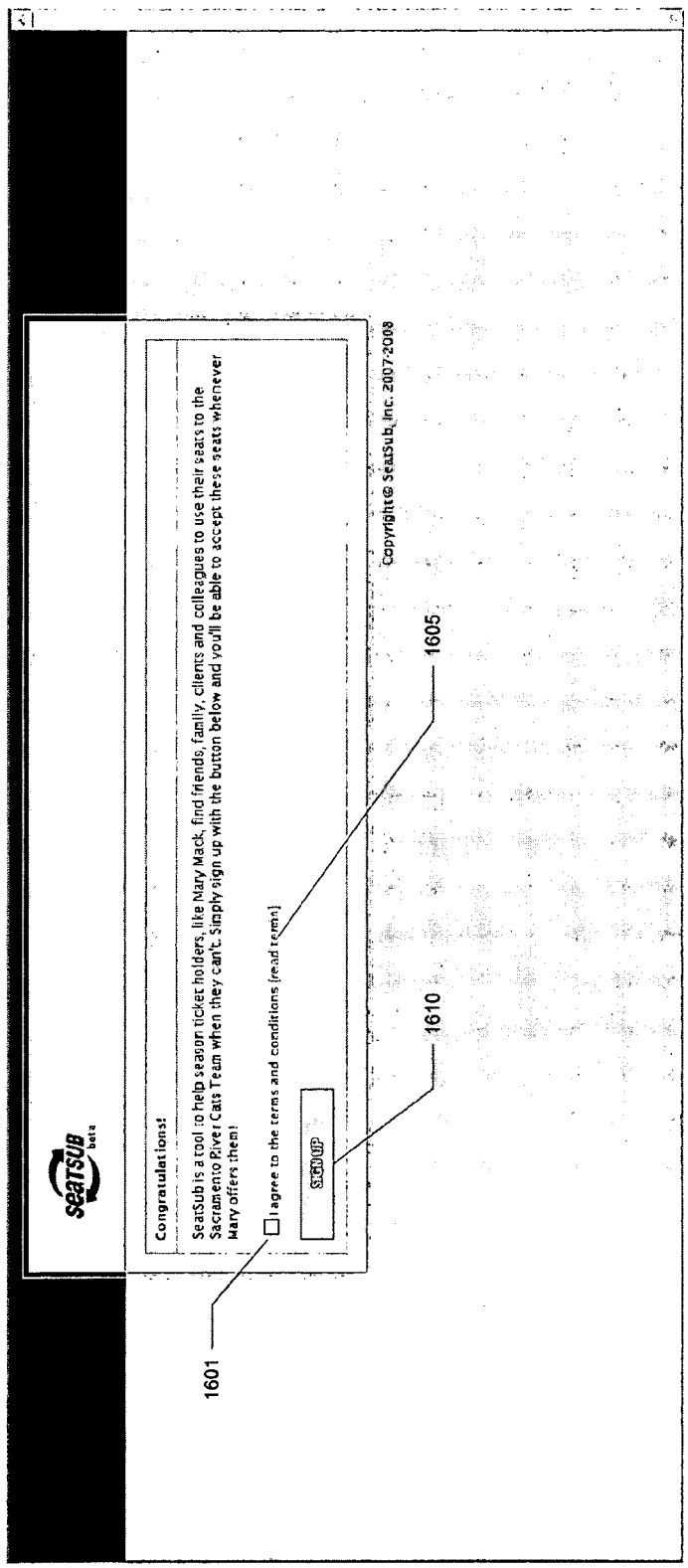
FIG. 16 shows a member confirmation screen where members confirm participation in the network and their agreement with the terms of usage.

FIG. 16 shows a network member confirmation screen asking them to confirm participation in the system. After the network member has indicated that they want to sign up to be a member in the system, network members must agree to the terms and conditions by clicking on the terms and conditions box 1601. Members may get a detailed description of the SeatSub terms and conditions by clicking on the "read terms" hyperlink 1605 next to the check box. Once the hyperlink is activated, a window containing the terms and conditions will appear on the member's screen. By acknowledging the terms and conditions and clicking on the "sign up" button 1610, the member is taken to the next screen where their membership as part of the season ticket holder's network is confirmed.

One implementation of this invention incorporates a check box for members to indicate their agreement to the terms and conditions. Other implementations may include the full text of the terms in a text box followed by an agreement button, or some variation of disclosing the terms and a member selectable object to indicate agreement.

Figure 17:
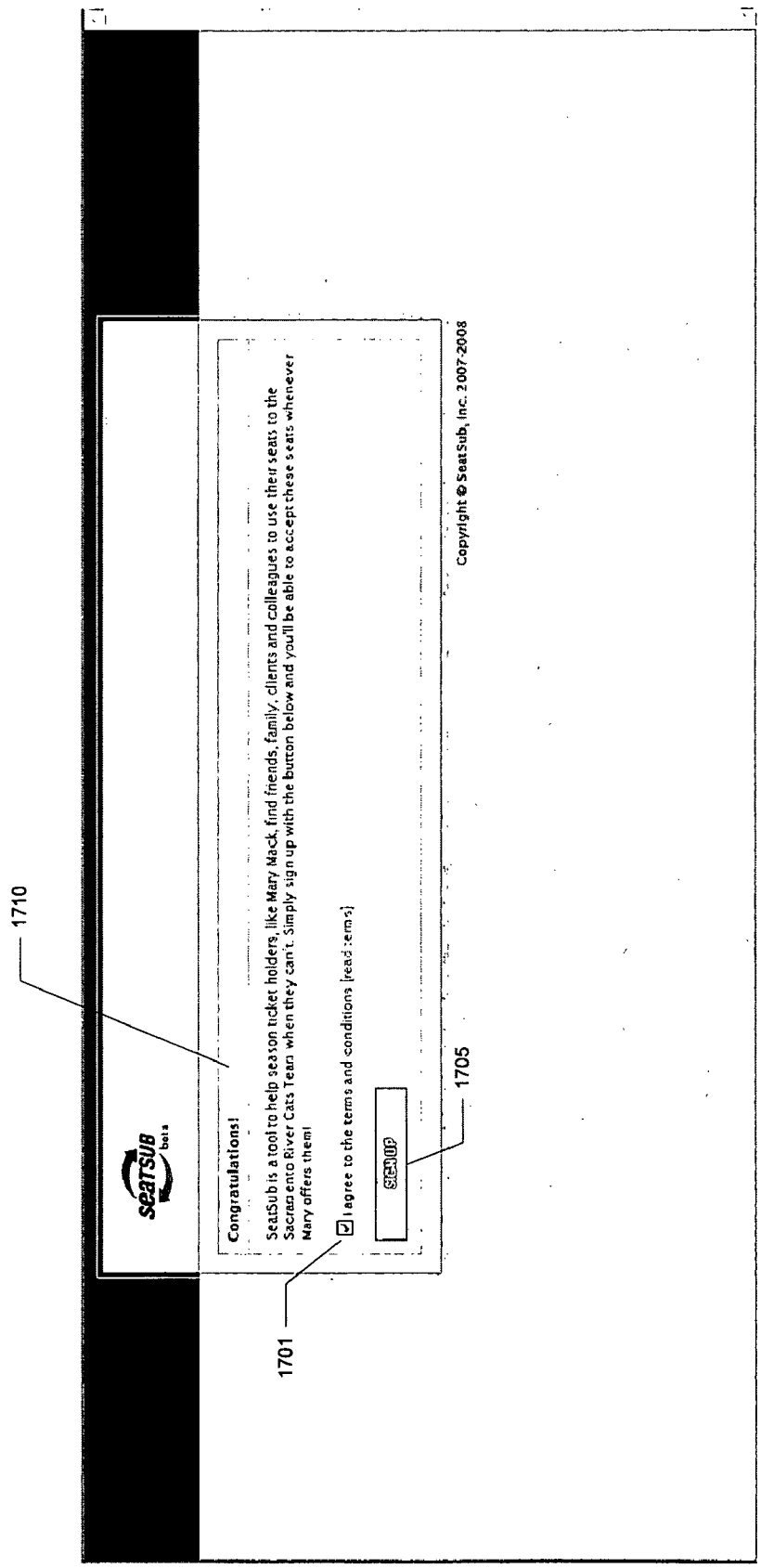
FIG. 17 shows the member's agreement to participate in the system by checking (double-clicking) the box indicating that the terms and conditions of the system will be followed by the member.

FIG. 17 shows a completed view of the screen from FIG. 16 after the member has clicked on the terms and conditions box 1701. Once the terms and conditions box is acknowledged, the member may then move on to the confirmation screen by clicking on the "sign up" button 1705. In an implementation of the invention, a banner congratulating the member for taking interest in SeatSub may be inserted on the screen in order to foster more excitement in the process 1710.

Figure 18:
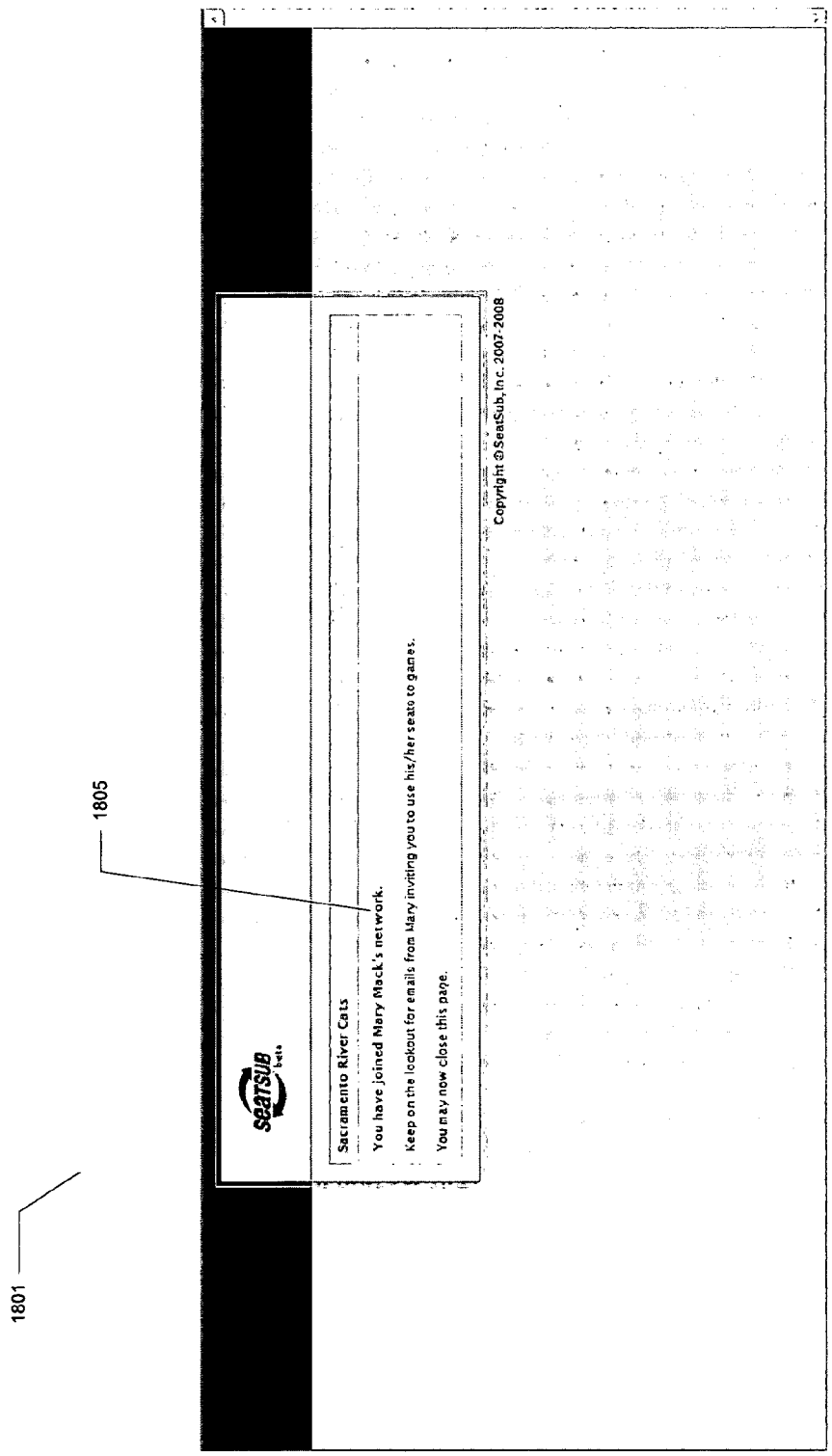
FIG. 18 shows a confirmation screen for a network member after the member has agreed to the terms of usage and completed registration to join another member's network.

FIG. 18 shows a view of a confirmation screen for new network members who have signed up to join a season ticket holder's network 1801. This screen not only confirms that the network member has successfully become a member of the network, but also establishes that the member is a part of the season ticket holder's trusted network 1805. A specific implementation of this screen notifies members that sign up is complete and instructs members to look for e-mails from the season ticket holder.

Figure 19:
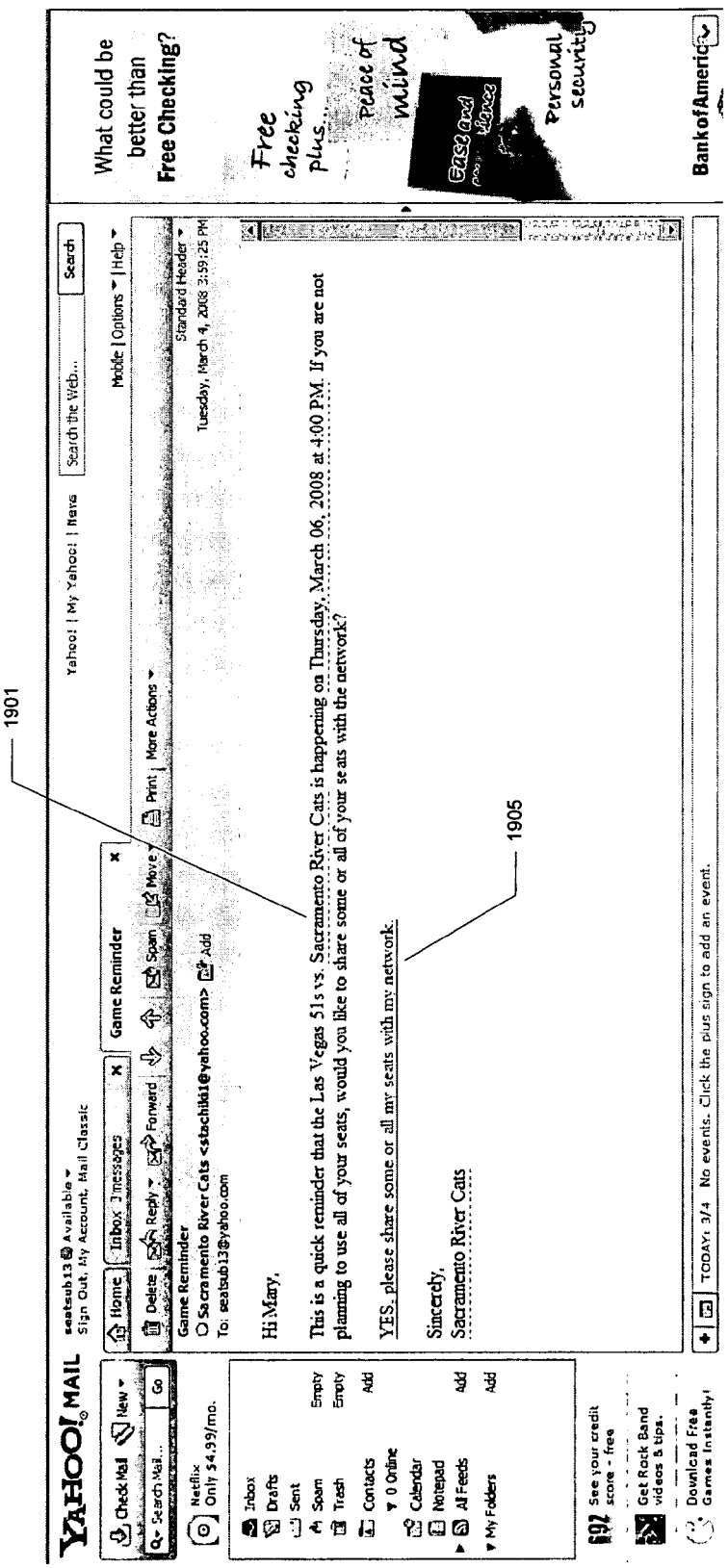
FIG. 19 shows an automatic e-mail from the system alerting members who are season ticket holders of upcoming events. The e-mail further allows the season ticket holder to share tickets with their network if they are unable to attend an event.

FIG. 19 shows an example of a game reminder e-mail sent to a season ticket holder's personal e-mail account (e.g., Yahoo, Gmail, Hotmail, and others). In an effort to keep season ticket holder members active in the SeatSub network after they have registered, an e-mail reminder is sent to the season ticket holder before each game or set of games. The reminder has the ability to group a weeks worth of games together at the STH's option so they receive a reminder only once per week as opposed to every day.

While season ticket holders are allowed to choose how far ahead in advance of the game they would like their e-mail reminders, the reminders are sent by the network as a built-in benefit of membership.

Season ticket holders have a few options once they have received the automatic e-mail from the network. They may choose to ignore the e-mail and attend the game or games, or indicate to the network that they would like to share their seats. The e-mail is automatically sent to registered season ticket holders in the network reminding them of an upcoming game or games. The team name and information about the game(s) (e.g., date and time) may also be included in the e-mail 1901. The e-mail asks the season ticket holder if they would like to share their seats. The e-mail also includes a hyperlink members can click to share their seats with contacts specified in their network 1905. Season ticket holders are directed to the network's Web site after clicking on the hyperlink.

These automatic e-mails ensure that the season ticket holder remains engaged in the system, and does not depend on the member to frequently check the site for upcoming games. The season ticket holder is more likely make use of the network if the onus of keeping track of teams, games, and tickets is taken off of them.

Figure 20:
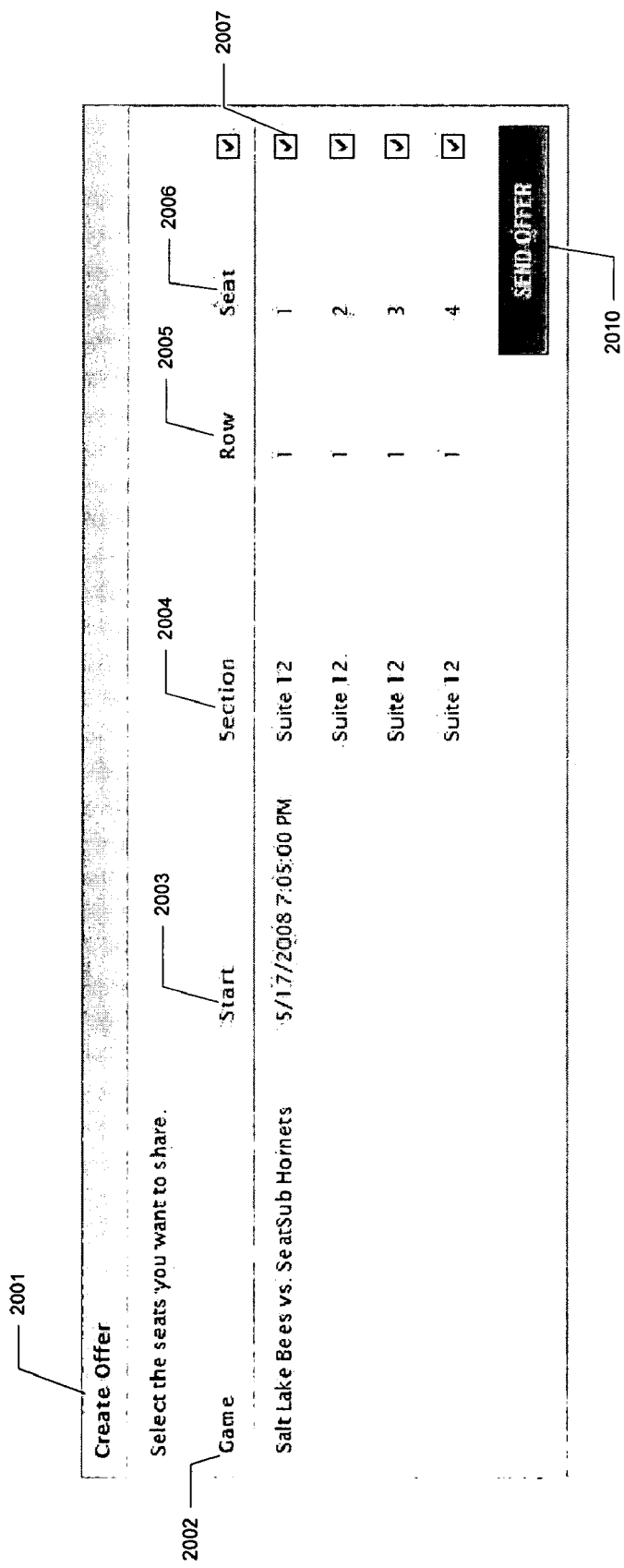
FIG. 20 shows a screen where season ticket holders are able to choose the season ticket holder seats they wish to share with their trusted network.

FIG. 20 shows a portion of the create offer screen. After members have indicated that they want to share their seats with the network by clicking on the hyperlink from the game reminder e-mail, season ticket holders are directed to this screen. A banner across the top once again indicates that the member is on the "create offer" screen 2001. In an implementation of the invention, season ticket holders should see information about their seats listed by game 2002, start date and time 2003, section 2004, row 2005, and seat 2006.

Using this information, season ticket holders must select which seats they want to share with the network for a particular game. To share seats, the season ticket holder clicks on the check box 2007 next to the seat they want to share. In one implementation of the invention, members must click on a "send offer" button 2010 under the column heading title "share" to indicate that they want to share a certain seat. As part of the screen, members may also have access to the rest of the SeatSub Web site by clicking on the My Network, Preferences, and Offers tabs along the top of the screen.

In another implementation of the invention, seats may be organized in other various ways, such as by section letters, row letters, and seat letters. Seats may be categorized by section color or group numbers. Seats may also be categorized as general admission.

Figure 21:
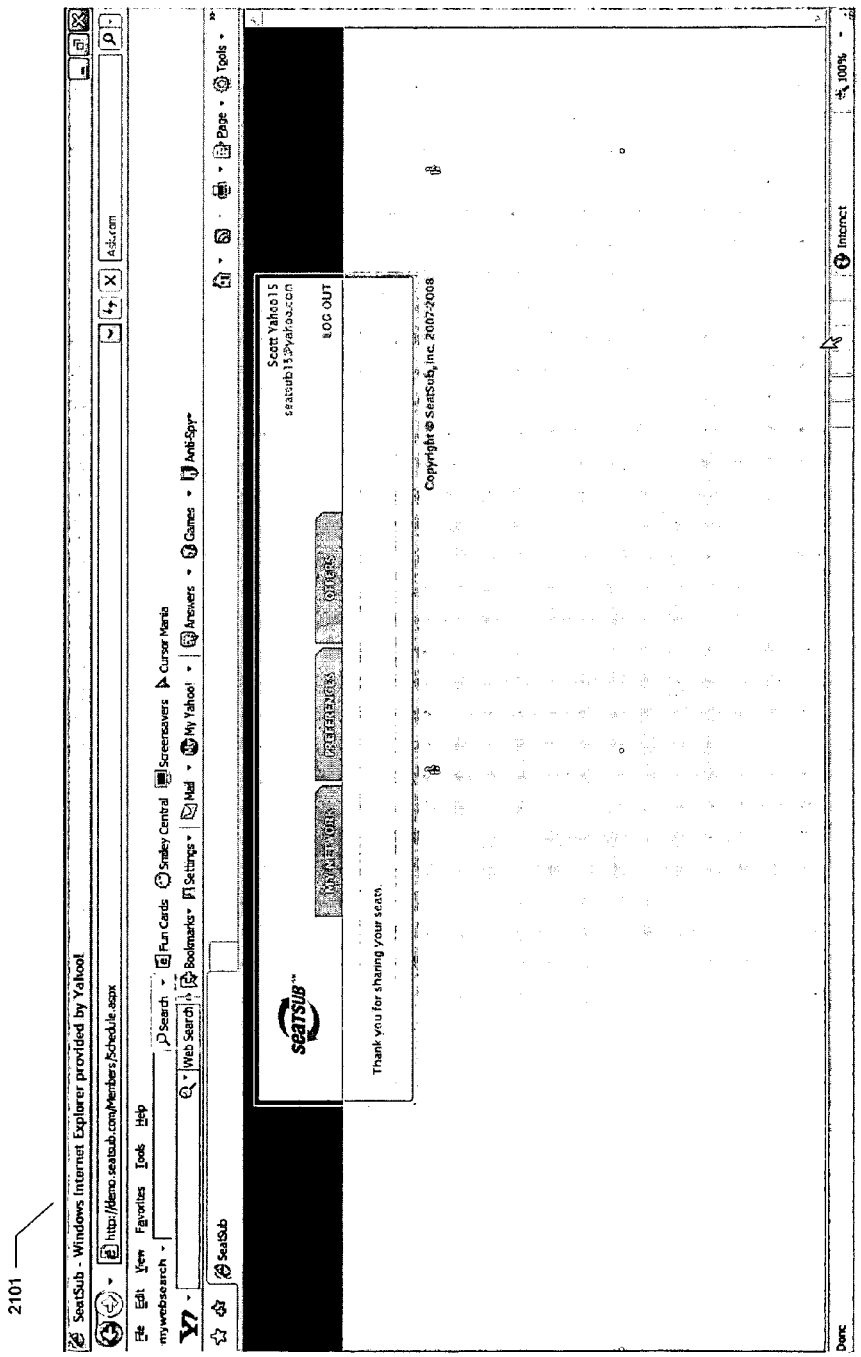
FIG. 21 is a screen shot of the confirmation screen that season ticket holders are brought to when they indicate that they would like to share seats with their network.

FIG. 21 shows a confirmation screen after the season ticket holder has shared their seats by clicking on the "send offer" button from the previous screen 2101. The screen includes the "My Network" and "Preference" tabs, which navigate the member to other screens on the site. In other implementations of this invention, tabs are not limited to "My Network" and "Preference" tabs, but may include tabs for contacts, teams, reports, facilities, or other categories which may be help members navigate through the network site.

Figure 22:
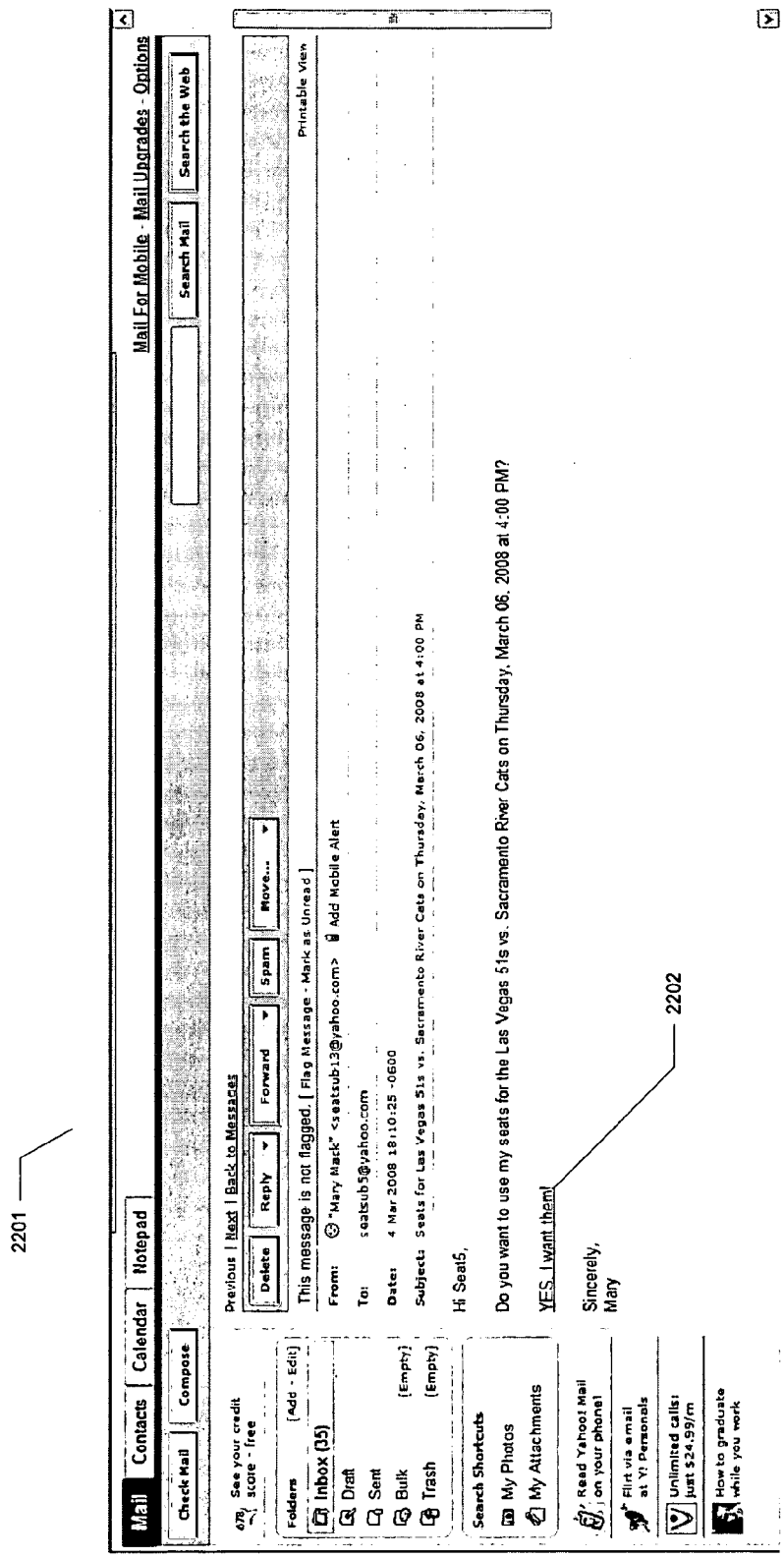
FIG. 22 is an example of an automatic e-mail that network members receive after the season ticket holder shares their seats with network members.

FIG. 22 shows a sample of the e-mail a network member would receive offering them tickets to an event. After the season ticket holder offers to share their seats, network members will receive an e-mail asking them if they want to utilize the shared seats. The e-mail is sent from the network to registered network members when a season ticket holder's seats are shared 2201. In an implementation of the invention, the e-mail details game information, team name, date, and time. Network members are given the option of clicking on a member selected hyperlink in order to accept the shared seats 2202. Another implementation of the invention gives other options for accepting the tickets, such as the season ticket holder's home phone number, mobile number, or e-mail address.

Figure 23:
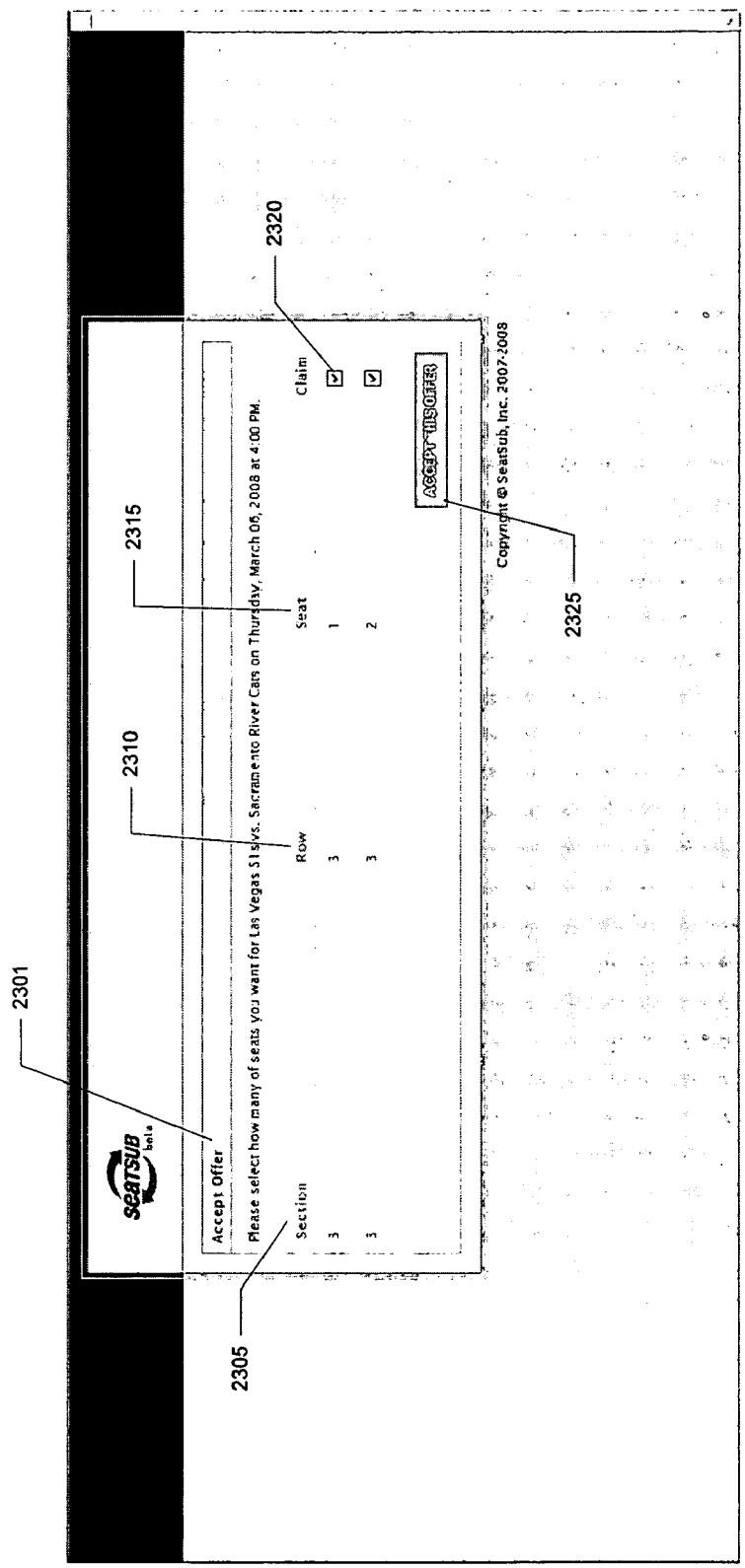
FIG. 23 shows a screen where network members must choose the shared seats they want to claim by indicating that they are accepting the season ticket holder's shared seats.

FIG. 23 is an example of a screen asking network members to confirm which and how many seats they would like to receive. Once network members have received the e-mail offering them a season ticket holder's seats, the network member must click on the hyperlink in the e-mail indicated in FIG. 22, which directs them to the network site where they may specify tickets.

Members are taken to the "accept offer" screen after they have indicated their interest for the offered tickets in the previous screen. In an implementation of the invention, a banner or some form of heading lets the member know that they have come to the accept offer screen 2301. The member is given the option of choosing seats according to the section number 2305, row number 2310, and seat number 2315, which the season ticket holder had previously selected.

In one implementation of the invention, members must click on a box under the column heading title "claim" 2320 to specify which of the season ticket holder's shared seats they would like to accept. Network members complete their reservation of the season ticket holder's tickets by clicking on the "accept this offer" button 2325. Another implementation of the invention may also display the seats according to a color or numbering screen as mentioned above in FIG. 20.

Figure 24:
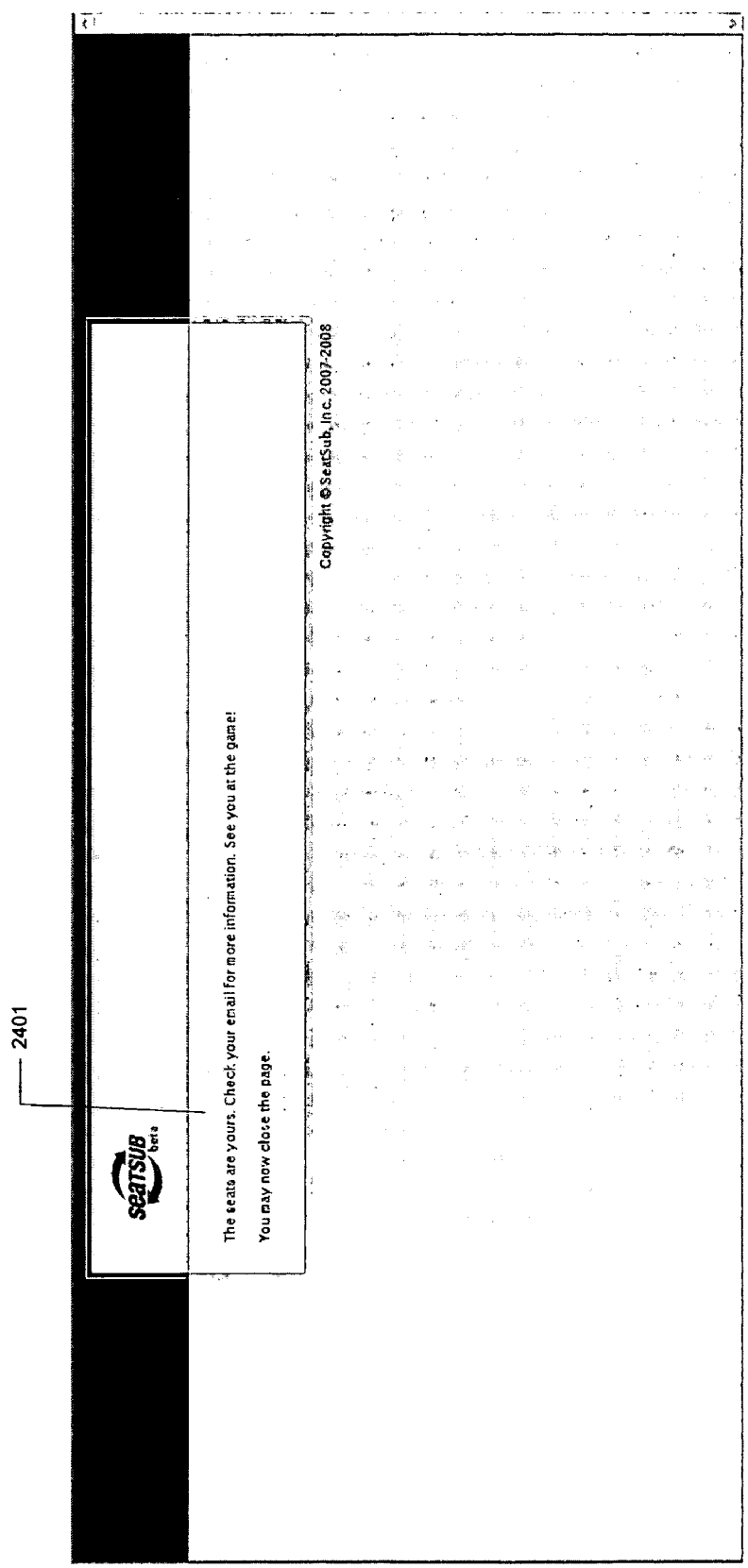
FIG. 24 is an example of a confirmation screen for network members after they have accepted the season ticket holder's shared seats.

FIG. 24 shows a confirmation screen for network members after receiving tickets to the event. The network system gives members assurances at each step of the registration, sharing, and ticket transfer process. This figure is one example of the way the system is designed to let members know exactly where in the process they are. In one implementation of the invention, the network member is being told directly that the "seats are yours" 2401. However, another implementation of the invention may also give the member instructions for receiving more information or any other messages related to their claimed seats.

Figure 25:
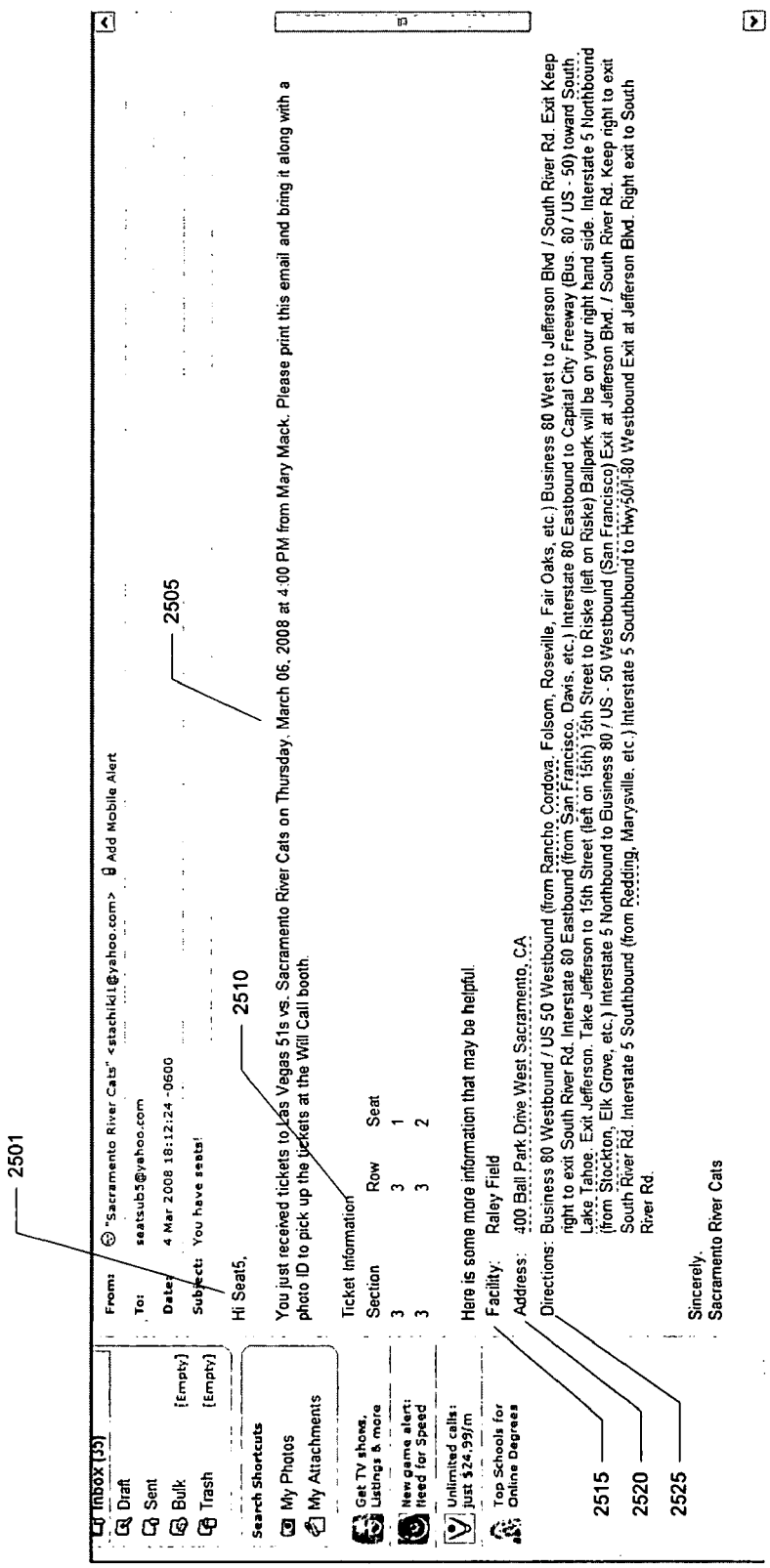
FIG. 25 is an automatic e-mail sent to network members after they have confirmed their acceptance of the season ticket holder's shared seats, which provides additional information on how to pick up tickets for the shared seats.

FIG. 25 shows a confirmation e-mail received by network members with directions on how to pick up tickets, directions, and other information for the event. As a final measure to ensure that the network member has enough information to attend the game, an e-mail is sent by the network confirming that the network member has received the tickets for a particular game.

Once again, the network member is greeted by an identifying greeting 2501. Information text specifying game information and pick up procedures may also be detailed 2505. The e-mail may also break down information about the seats 2510, as previously seen in the "accept this offer" screen indicated in FIG. 23 (e.g., section, row, or seat). One specific implementation of an e-mail to the network member may include facility name 2515, address 2520, and detailed driving instructions 2525.

Figure 26:
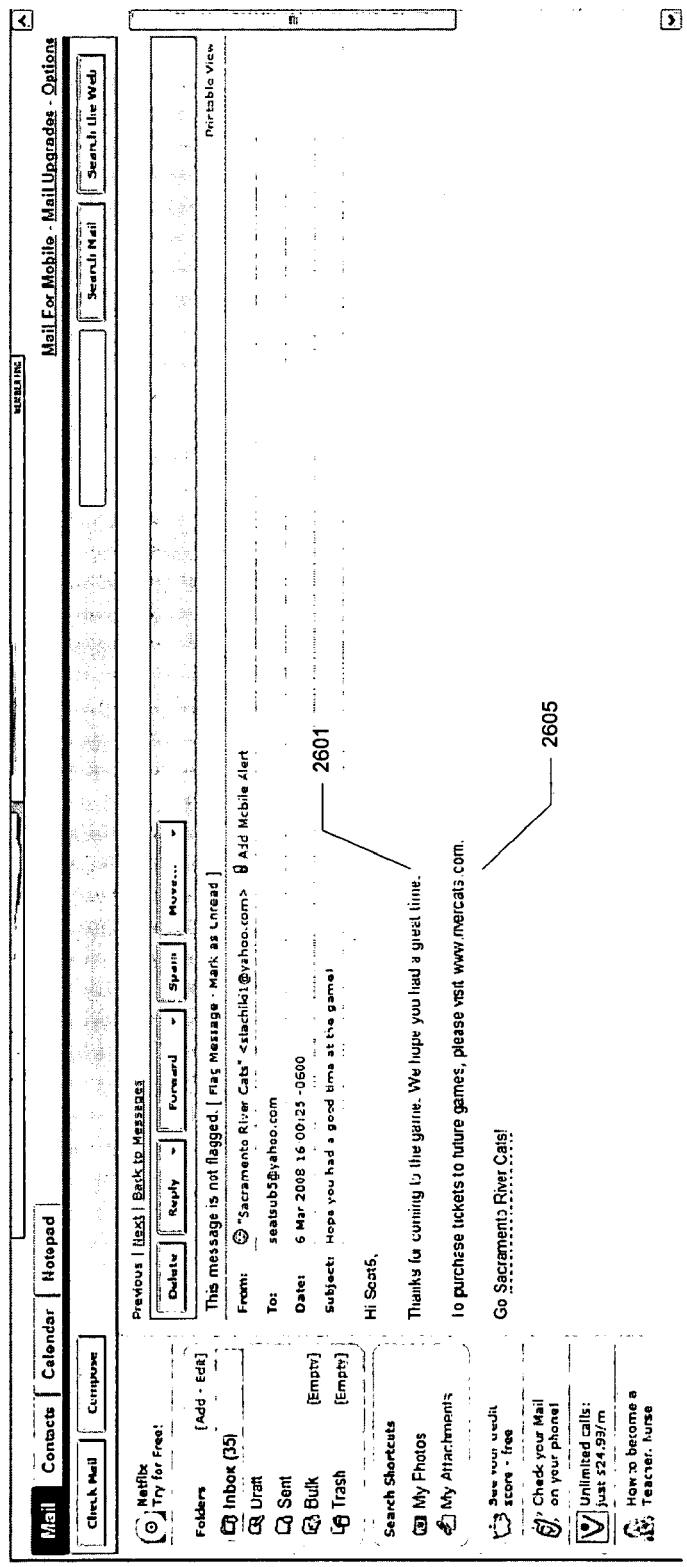
FIG. 26 is a postevent e-mail follow-up from the network, which thanks the member and offers them a reminder to check in with the site for future events.

FIG. 26 shows an example of a postgame follow-up e-mail to the network member who claimed shared tickets to the event after the game. A follow-up e-mail to network members may be utilized to gather information about the effectiveness of the seat sharing system. The e-mail may thank the network member for using the SeatSub system and include information on further seat sharing within the network 2601. A hyperlink embedded in the e-mail 2605, which allows network members to purchase tickets on the team Web site, may also be used to measure the success of the network's communications.

The e-mail may also be used to respond to potential advertising opportunities. In an implementation of the invention, advertisers (e.g., team organizations, sports merchandisers, ticket sellers) may buy space on the e-mail in a joint effort to reach e-mail recipients. Responses to the follow-up e-mail may also be used to collect information about people within the network, including the dynamics of sharing seats and game attendance. One implementation of the invention places a hyperlink in the e-mail, which directs members to the team Web site for future ticket purchases.

Figure 27:
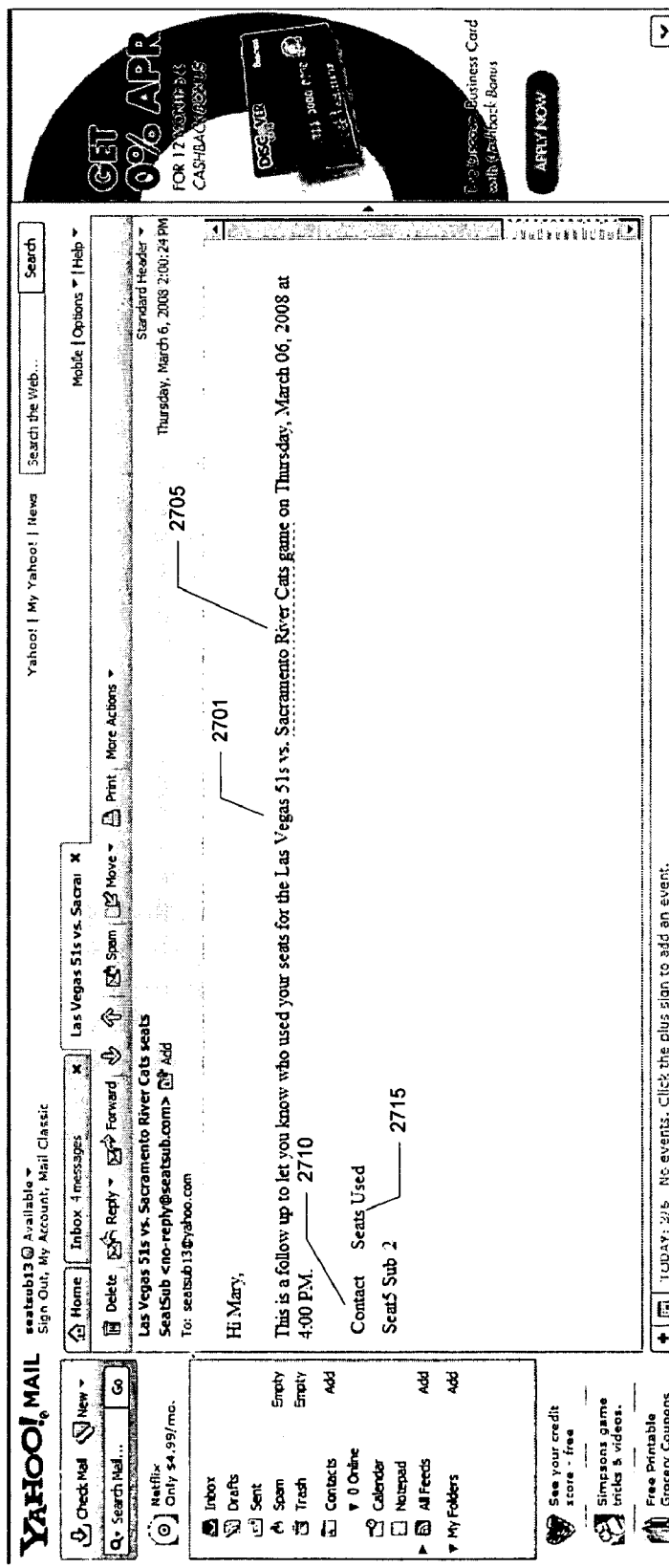
FIG. 27 is an automatic e-mail from the network letting season ticket holders know which network contact utilized the season ticket holder's shared seats.

FIG. 27 shows a sample follow-up e-mail letting season ticket holders know of the network contact who had used their shared tickets. One specific implementation of the invention gives information about the game that the season ticket holder missed (i.e., date and time of the game) as well as the identity of the network contact who utilized the shared seats 2701. The team name may also be linked to a team's home Web site or a map 2705. This information may be used by the season ticket holder as well as the network to evaluate responses from the network. The contact's name 2710 and the seat used 2715 is also listed in the e-mail.

In another implementation of the invention, the contact's name may include any identifier used by the system. More specifically, as contacts from different levels within the season ticket holder's network accept the shared seats, more data may be collected to increase advertising in certain areas of the system.

Figure 28:
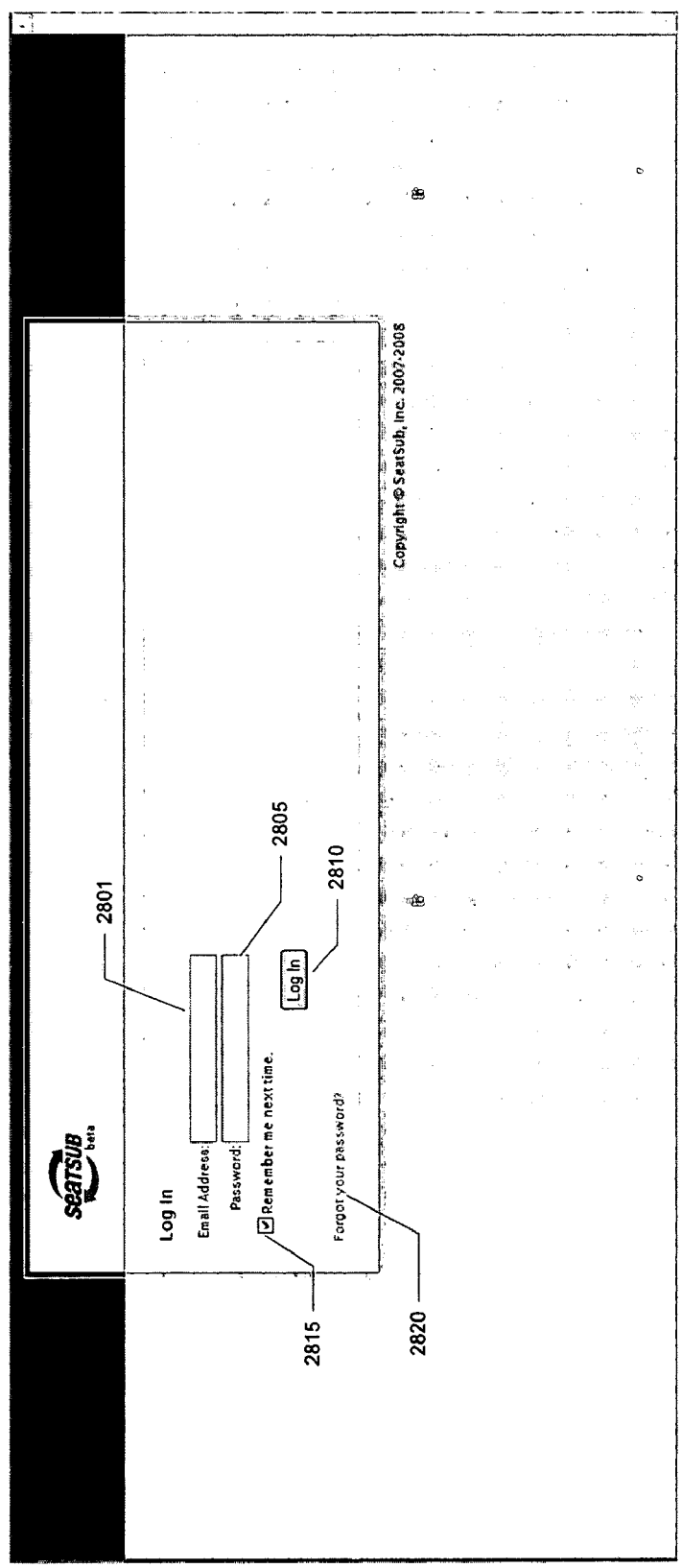
FIG. 28 shows an example of a login screen for registered network members.

FIG. 28 shows an example of the log in screen. Once network members have registered, they may log in to the SeatSub Web site by "logging in" to the network. Members must enter their e-mail address 2801 and password 2805 into the blank input boxes in order to access the Web site.

Prior to clicking on the "Log in" button 2810, members may click the "remember me next time" check box 2815. By utilizing the "remember me next time" check box, members may save time logging in to the site by not having to enter in their log in information every time they want to use the system. One implementation of this invention inserts a check box indicating the "remember me next time" feature, which members must click on in order to be automatically logged in when they visit the site in the future.

In another implementation of the invention, the log in screen may instead require a member name, or further require members to confirm their password in a password confirmation field. If members are unable to remember their passwords, a "forgot your password?" hyperlink 2820 at the bottom of the screen allows members to click on the hyperlink and have a duplicate password sent to their personal e-mail accounts.

Figure 29:
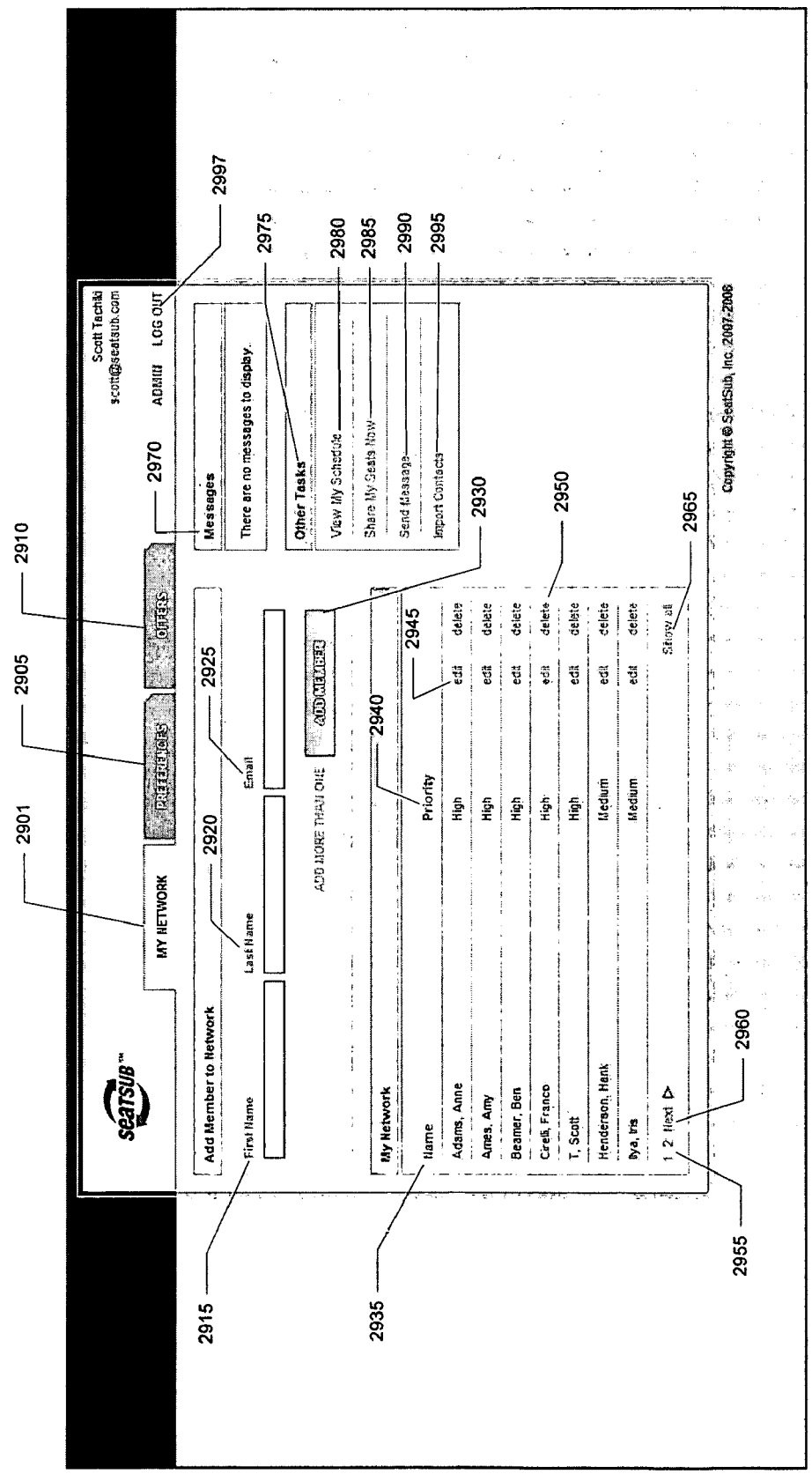
FIG. 29 displays a "my network" screen where members are able to add contacts and organize their contacts by preference.

FIG. 29 shows an example of the My Network screen. After logging in, members are automatically taken to their "My Network" screen 2901. This screen also allows members to access their "Preferences" 2905 or "Offers" 2910 screens by clicking on tabs running along the top of the screen. In one specific implementation, the My Network screen allows current members to enter in the names and e-mail addresses of people whom they would like to add as a member.

To add a new member to the network, current members enter the contact's first name 2915, last name 2920, and e-mail address 2925. Members add the new member by clicking on the "add member" button 2930. If the current member wants to add more than one new member at a time, the current member should click on the "add more than one" hyperlink next to the "add member" button. In an implementation, each time the member clicks on the hyperlink a new set of text boxes will appear for another entry.

Once all the new member information is filled in, the current member affirms the entry by clicking on the "add member" button. At that point, current members should be able to view the new member on their "My Network" list.

A member's "My Network" list shows the contact's name 2935 and their priority on the member's list 2940. Members adding contacts to their network may set their priority preference for each member in their network by clicking on the "edit" hyperlink 2945. Members may also select delete 2950 to erase a contact name within the network by clicking on the delete hyperlink. In a specific implementation of the invention, member's may scroll through contacts by clicking on the screen numbers listed at the bottom of the screen, or in the alternative, choose to show all contacts on one single screen.

In an implementation of the invention, members may go back and forth to different screens on their My Network screen by clicking on numbered hyperlinks 2955 at the bottom of the screen (e.g., 1, 2, 3, and so on). Members may go to the next screen by clicking on the "next" hyperlink 2960, or choose to see all contacts on one screen by clicking on the "show all" hyperlink 2965.

In a specific implementation of the invention, members may view messages from other network members, which would appear in a messages section 2970 on the screen. Another section labeled "other tasks" 2975 gives members the opportunity to access other features of the network (view my schedule 2980, share my seats now 2985, send message 2990, and import contacts 2995).

Members wanting to send a message from the SeatSub Web site can do so by clicking on the "send message" hyperlink on the My Network screen. The "send message" hyperlink will take the member to another screen where the member may enter a message and e-mail from the network site.

In an implementation of the invention, members may choose to import contacts from various webmail servers (e.g., Gmail, Yahoo, Hotmail) or from sources on their local hard drive (e.g., Outlook Express contacts folder or personal computer address book).

Once members are finished entering their information, they may choose to continue utilizing other screens in the network or choose to log out. A "log out" hyperlink 2997 is placed at the top of every screen so that members have the option of logging out at any time during their visit to the SeatSub Web site. When members click on the log out hyperlink, they are automatically logged out of the system.

Figure 30:
FIG. 30 shows a "preferences" screen, which allows members to modify their personal information and sharing preferences, as well as when the member should be reminded to share their season ticket holder seats.

FIG. 30 also shows a member's Preferences screen. Once the network member has set up contacts in their network and uploaded any necessary contacts, they may click on the Preferences tab at the top of the previous screen. The Preferences screen also allows members to access their "My Network" or "Offers" screens. The Preferences screen is split up into separate sections each labeled by a banner for the member's sharing information 3001, personal information 3005, or messages 3010.

In a specific implementation of the invention, members may click on a series of check boxes 3015 indicating the days of the week when they always want to share their seats. Members may also be reminded to share their seats by clicking on radio buttons 3020 which request reminders for sharing seats (on a weekly basis, two days before game time, or one day before game time). Members may also choose to share all of their seats within a certain timeframe by entering dates into a start date input box 3025 and end date input box 3030.

In other implementations, the Preferences screen may include other types of member selectable objects (such as drop down menus) versus check boxes to organize the information entered in by the member.

Members may also update their personal information in order to have the most current information on the network. The system allows members to edit their first name 3035, last name 3040, and e-mail address 3045 in input boxes. Members also have the option of changing their password by clicking on the change password hyperlink 3050. Once members click on the hyperlink, another window will appear where members could change their password. Members may save changes to their preferences by clicking on the save changes button 3055.

Figure 31:
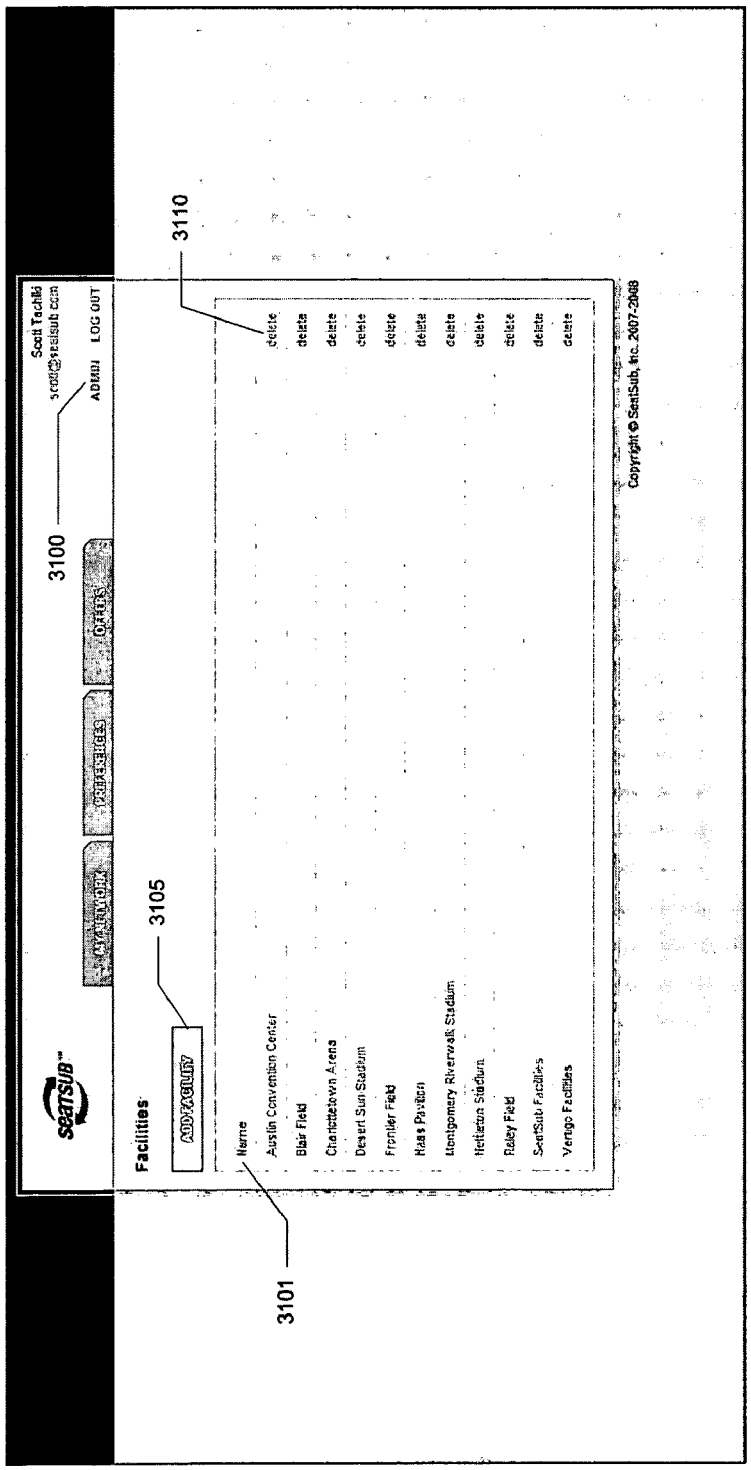
FIG. 31 shows a screen where members may view and add facilities to their list of preferences and network profile.

FIG. 31 shows an example of the facilities screen. Members arrive at the facilities screen by clicking on the "admin" link at the top of the screen 3100. In an implementation of the invention, the admin hyperlink is accessible on every screen and provides members the ability to edit many aspects of their profile (e.g., facilities, teams, games, and season ticket holder information).

In an implementation, the admin screen is only available to certain people or a restricted group of user. Generally, the general public will not have administrative access. However, people at the teams will have administrative access so they can see the reports. In an implementation, if a user is within the group of users having administrative access, the user will see or be presented the admin tab, while others who are not allowed access will not.

One of the features of the Web site is a facilities screen where members may see a listing of all the facilities in their profile as well as add more facilities to their profile. On this screen, members may see a list of all the facilities in their network as well as add and delete facilities. This screen shot lists the member's preferred facilities 3101. Members add a facility by clicking on the add facility button 3105 and delete a facility by clicking on the delete link 3110 next to the facility name. Again, members may access the My Network, Preferences, and Offers Web screens using the tabs across the top of the screen.

Figure 32:
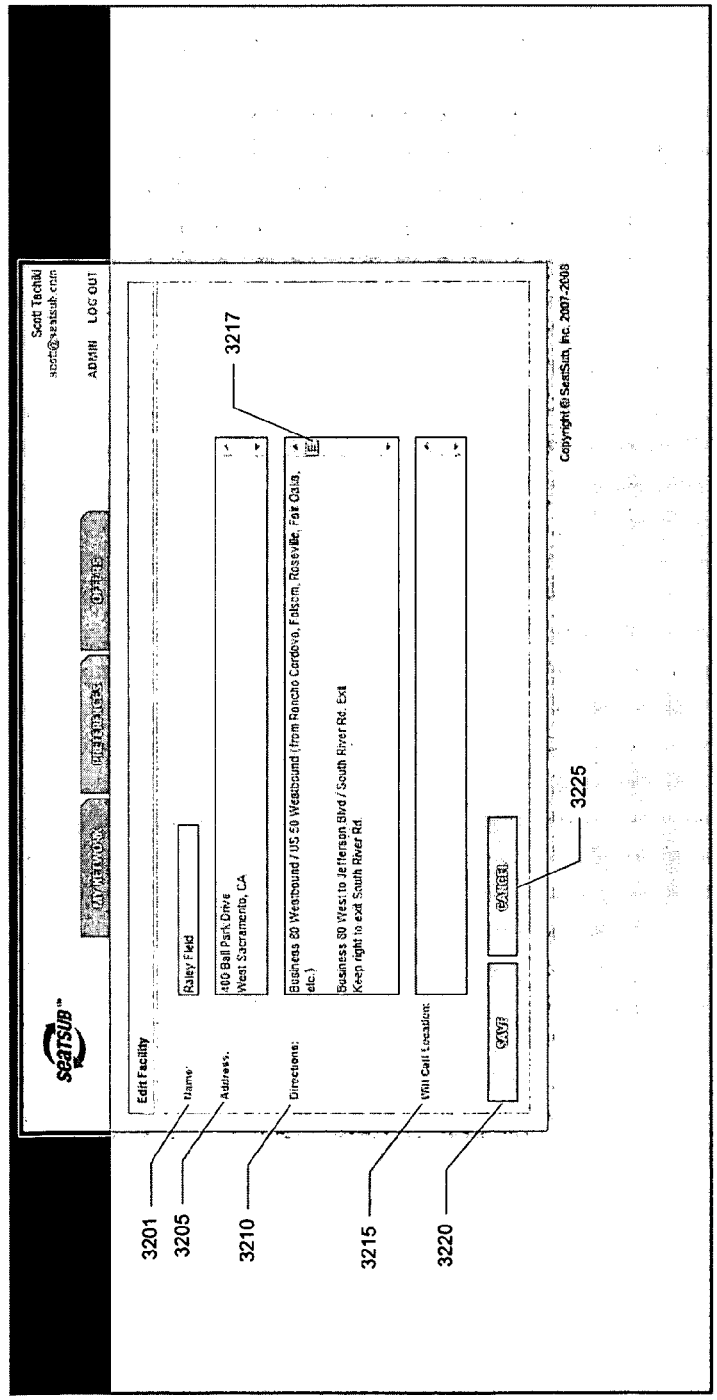
FIG. 32 shows a screen where members may edit information about a facility, such as the location of a facility or directions to a facility.

FIG. 32 shows an example of an edit facility screen where members may edit or add the name 3201, address 3205, and driving directions 3210 of a facility in blank input boxes. Members may also edit information about the facility's will call location by entering text into the input box 3215. Members may access this edit screen by clicking on the name of the facility in the previous screen, which is hyperlinked to the edit screen site for that particular facility. The address, directions, and will call location input boxes include side scrollbars 3217 which members may use to scroll through large amounts of text. The information is saved when the member clicks the save button 3220 or exits the screen by clicking the cancel button 3225.

Figure 33:
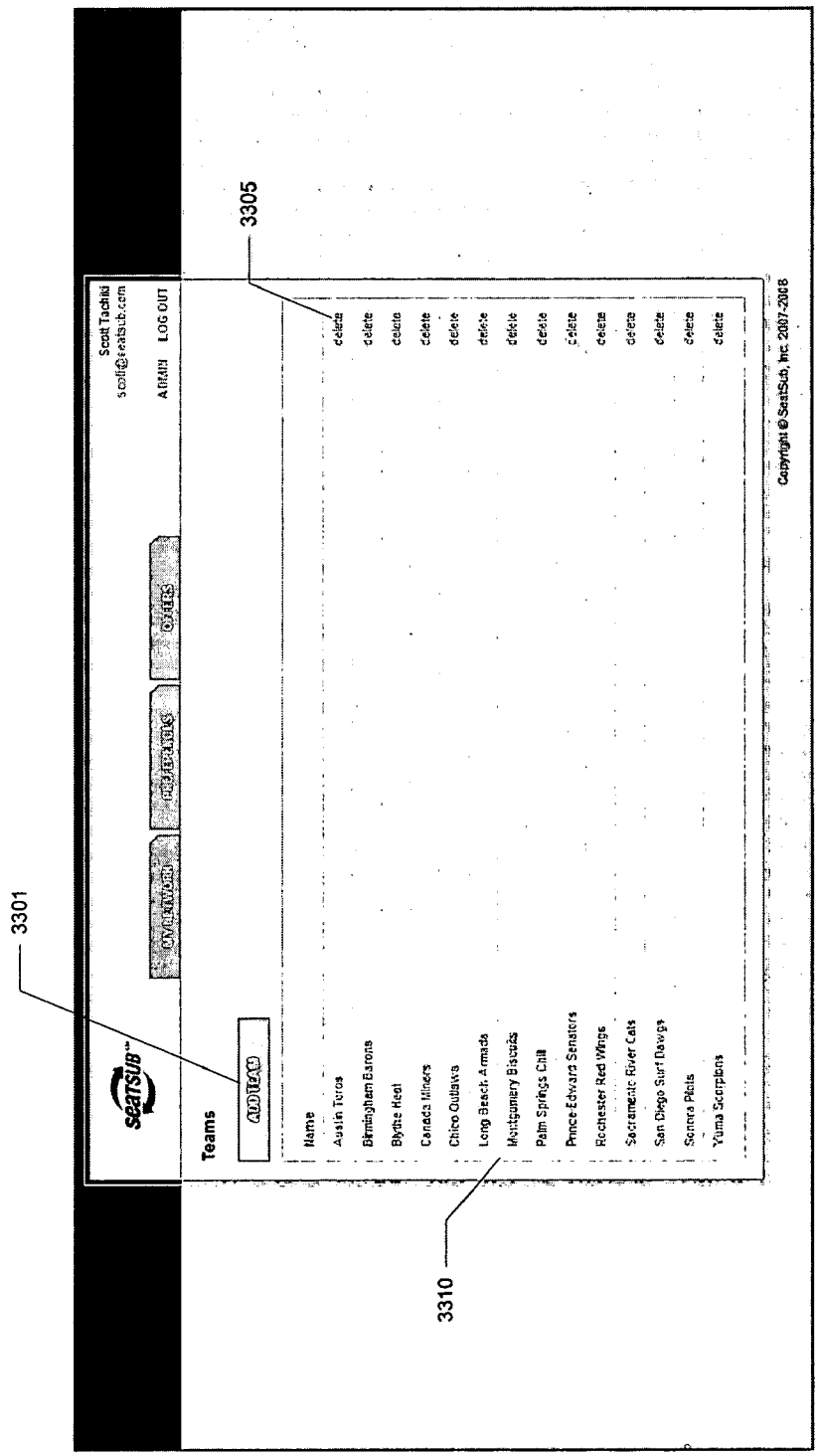
FIG. 33 shows a screen listing all the teams in a member's preferences.

FIG. 33 shows an example of a teams screen where members may see a list of all the teams in their network. On this screen, the member may choose to add more teams by clicking the add team button on the top of the screen 3301, or delete already existing teams in their network by clicking the delete hyperlink 3305. Teams are listed by name in alphabetical order 3310, and are hyperlinked to an edit screen so that members may edit information about the team.

Figure 34:
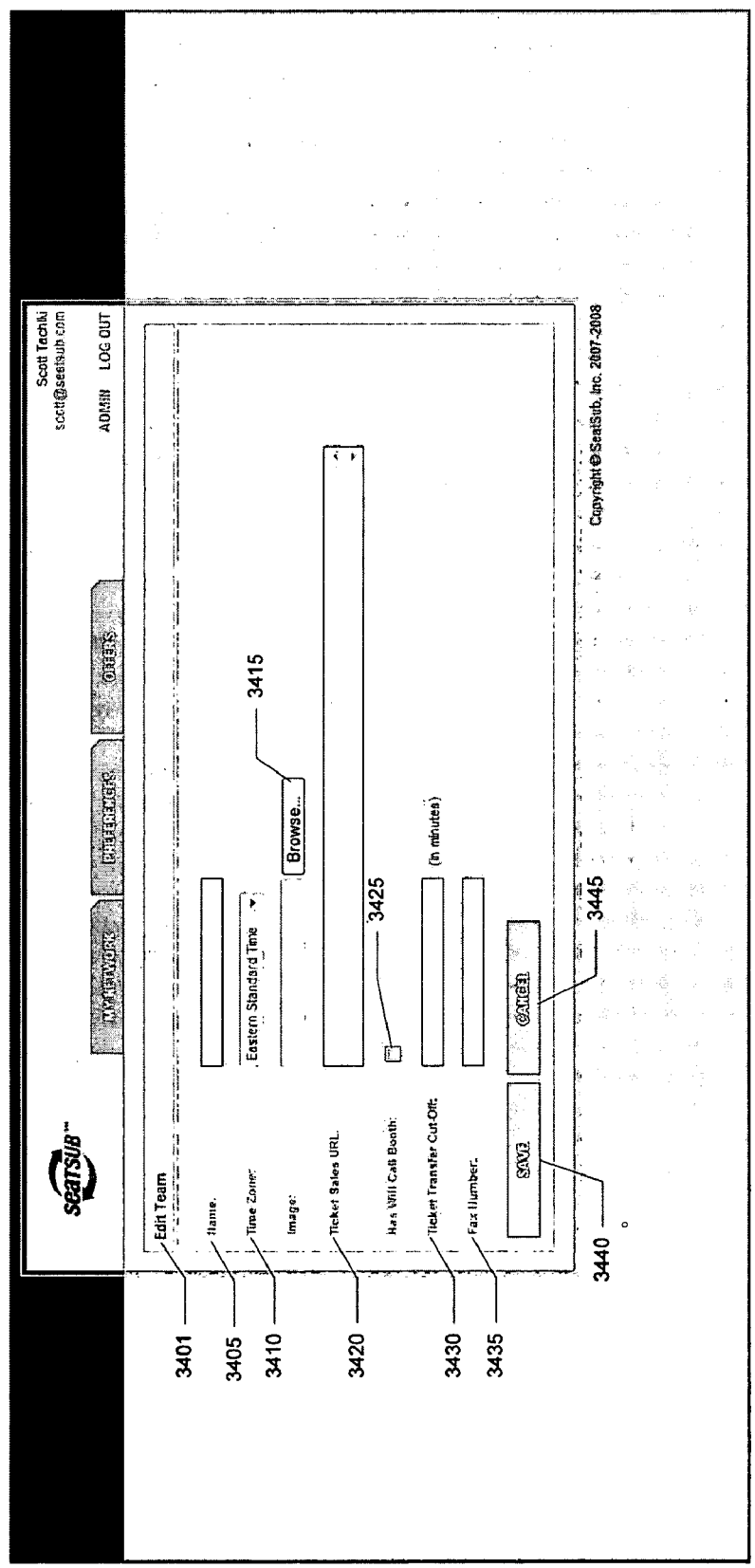
FIG. 34 shows a screen where members may add information about specific teams added to their list of team preferences.

FIG. 34 shows an example of the add teams screen. After clicking on the "Add Team" button in the previous screen, members are taken to an edit team screen where initial information about the team may be added. In this implementation of the add teams screen, members are directed to fill in blank input boxes for the name of the team 3405, the ticket sales URL 3420, the ticket transfer cut-off 3430, and the fax number 3435. Members are able to choose the time zone where the team is playing by choosing the correct time zone (e.g., Pacific time zone, Eastern time zone, and so on) in a drop down menu 3440. Members may also upload an image by clicking on the browse button 3415 and choosing from an image on the member's desktop.

If the member has a will call ticket booth for that particular team, then the member clicks on the will call ticket booth check box 3425. Once all information has been entered, members may save or cancel their entries by clicking the save button 3440 or cancel button 3445. Information for a team can be any facts or details that are relevant to fans of the team, or members interested in obtaining or selling tickets for the team.

Figure 35:
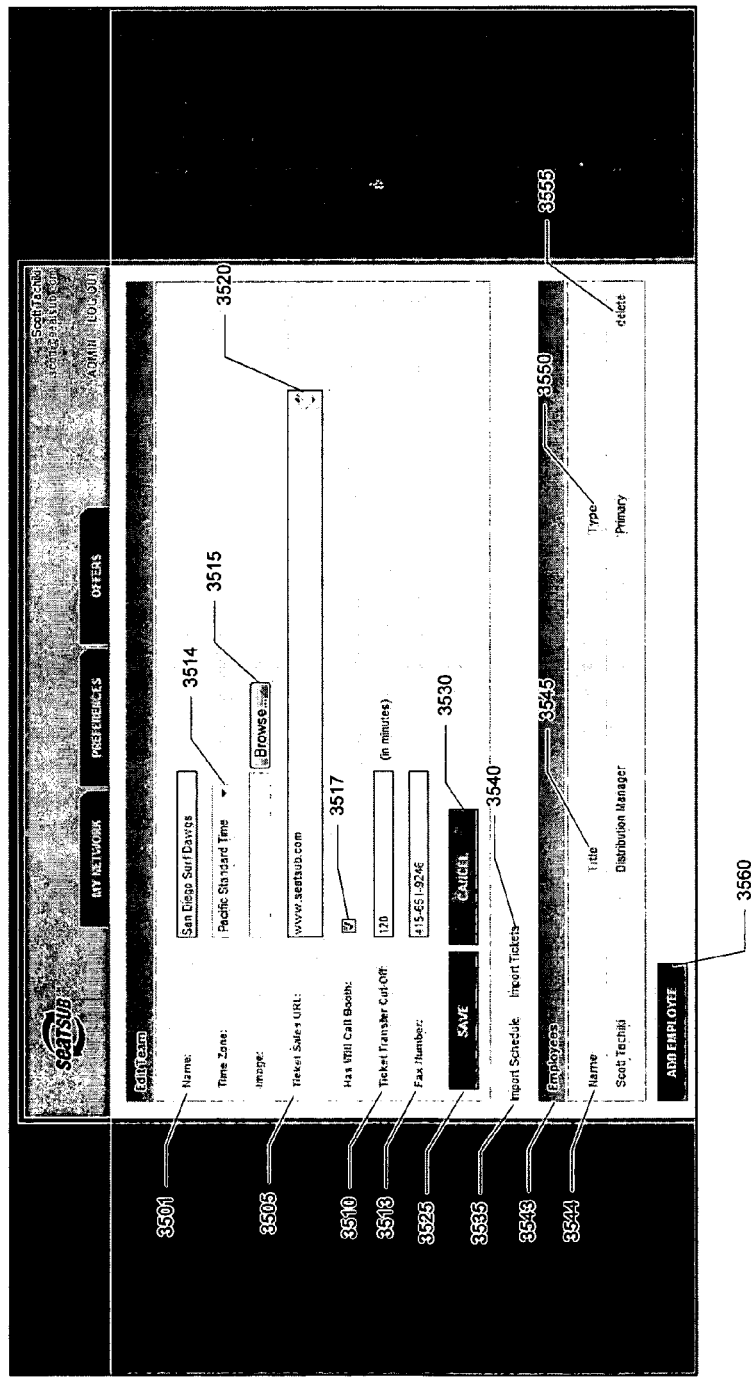
FIG. 35 shows another view of an "edit teams screen" where network members edit team information.

FIG. 35 shows an example of the edit teams screen, where members are taken to after clicking the add teams button in the previous screen. On the edit teams screen, members may enter information about a new team into blank input boxes. In an implementation of the invention, an input box exists for the team name 3501, the ticket sales URL 3505, the ticket transfer cut-off time (in minutes) 3510, and fax number 3513. Members may specify the time zone where the team plays by selecting from a scroll down menu 3514 (e.g., Pacific Standard Time).

Members may also upload a team image into the system by clicking the browse button 3515 and uploading an image stored on the computer's local hard drive. If the member has a will call booth for that team, the member may indicate this on the site by clicking on the check box 3517. Again, members may use a side scrollbar to view text in the ticket sales URL box 3520. Once the member has completed editing information for a particular team, the member may save or cancel their entries by clicking on the "save" button 3525 or "cancel" button 3530.

On the Edit Teams screen, members may choose to import schedules 3535 or import tickets 3440 by clicking on the hyperlinks on the screen. Once the hyperlink is clicked, the member may see a window allowing them to import schedules or import tickets.

A section labeled "Employees" 3543 is also a part of the edit teams screen where members may enter in the name of employees 3544 and their identifying information, such as title 3545 and type of employee 3550. Members may also choose to edit their employees lists by clicking on the delete hyperlink 3555 inserted on the same line as every employee name. Lastly, members may add an employee by clicking on the "add employee" button 3560. Once the member has clicked on the add employee button, members will be able to enter in new employee information into blank text fields.

Figure 36:
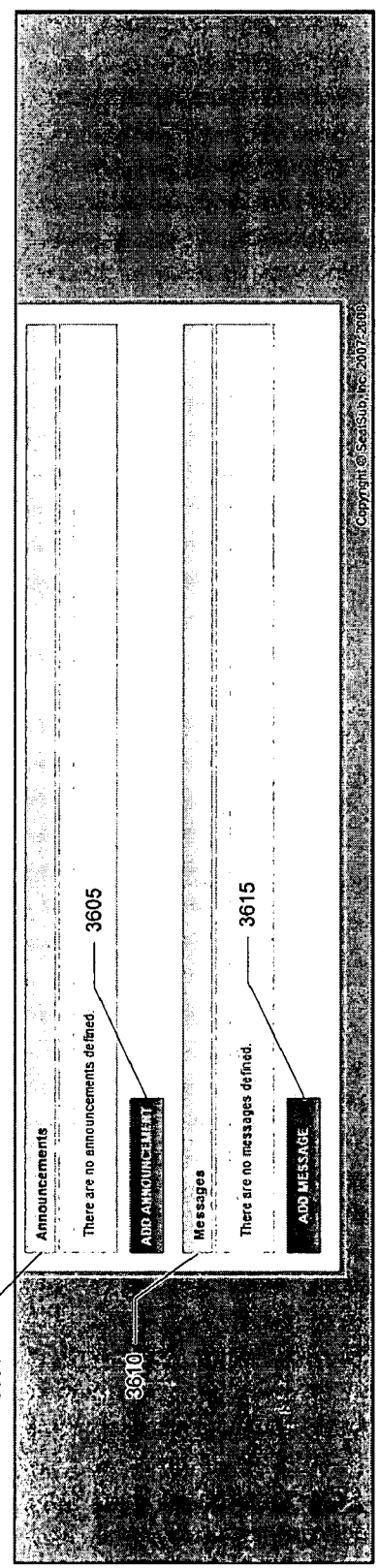
FIG. 36 shows a portion of the edit teams screen which allows network members to view and add announcements and messages.

FIG. 36 shows bottom portion view of one implementation of the edit teams screen. In this particular implementation, members may view announcements 3601 or messages 3610 related to the team. Members may also add an announcement by clicking on the "add announcement" button 3605, or add a message by clicking on the "add messages" button 3615. In another implementation of the invention, the edit teams screen may include contact information where members may enter contact name, contact title, and contact e-mail into blank input boxes.

FIG. 37 shows an example of the games screen where members may view upcoming game schedules for teams in their network. Members may add games by clicking on the "add game" button, which would then link them to another Web screen. Once the Members add a new game, they may be able to view the newly added game in the game listing below. If members are not adding a new game, but simply want to do a query within their listing for specific teams, members then choose a team name from a drop down menu 3700. Games are listed according to the name of the team and their opponents 3701, day the game takes place 3705, and the actual date and time of the game 3710.

Members may also view games for different teams by clicking on the scroll down menu 3713 and choosing a team they have added in their profile. In an implementation of the invention, members may have the option of deleting the game entry or editing the game entry. Members wanting to delete a game entry must select the delete hyperlink 3715. In another implementation of the invention, an edit hyperlink would exist next to the delete hyperlink.

Figure 38:
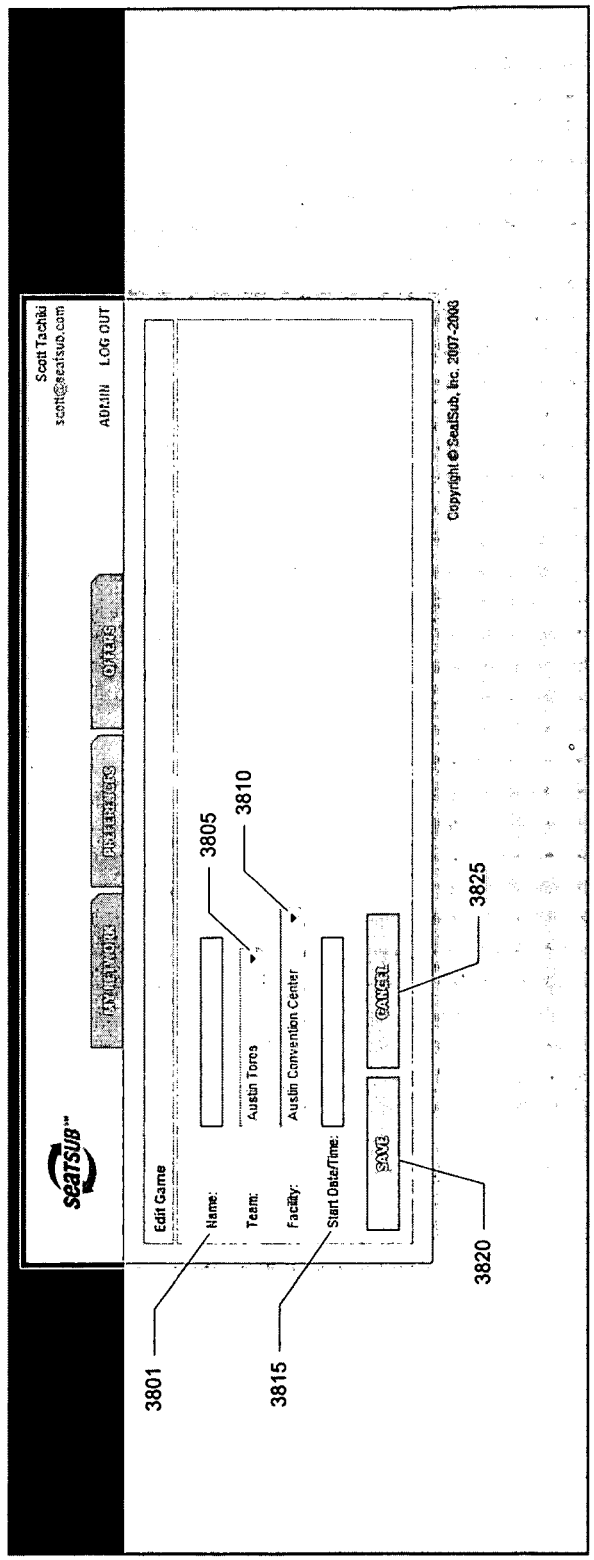
FIG. 38 shows an example of the add games screen where members may enter information about specific games.

FIG. 38 shows the edit games screen. Members are taken to this screen after they click on the add game button from the previous window (indicated in FIG. 37). In this screen, members may enter the name of a game 3801 and the start date of the game 3815. Members may also edit a specific team's game by selecting the name of the team from a drop down menu 3805. The facility where the game takes place may also be specified by selecting options from a pull down menu 3810. Once the information has been entered, members may choose to save or cancel the edit by clicking on the "Save" button 3820 or "Cancel" button 3825.

Other implementations of this invention could include more input boxes for information such as an end date or type of game, or even selections for more than one team or game.

Figure 39:
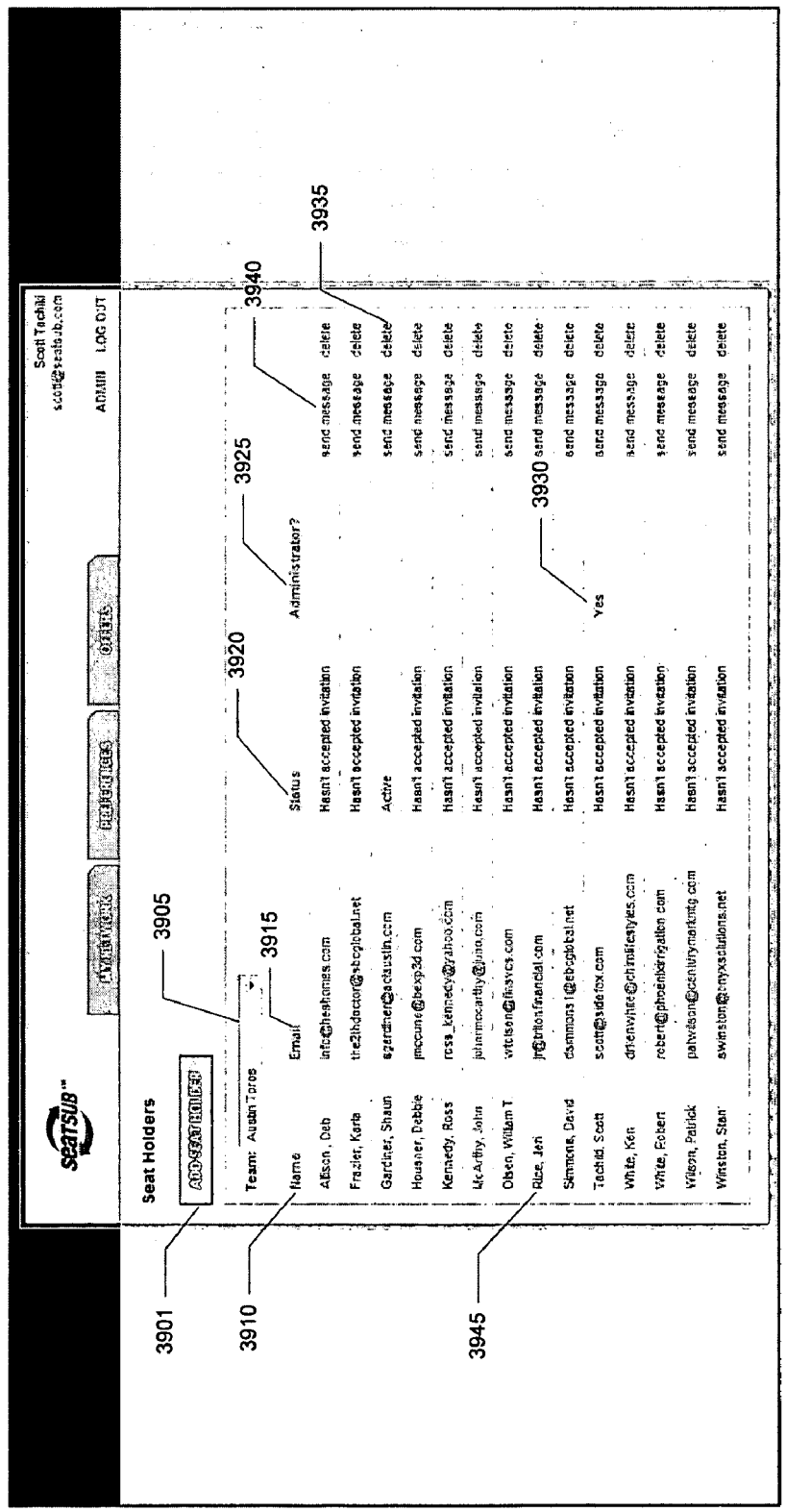
FIG. 39 is an example of a screen listing seat holders, by team, who have been extended invitations as well as the status of their invitations.

FIG. 39 is an example of the season ticket holder screen, which gives members a listing of season ticket holders within their network. In an implementation of the invention, members may immediately choose to add a season ticket holder by clicking the "Add Seat Holder" button 3901. The screen is organized first by team, which members may specify by selecting from a pull down menu 3905. The seat holder's information is categorized by columns labeled name 3910, e-mail 3915, status of their invitation 3920, and administrator status 3925. In a specific implementation of the invention, the seat holder's administrator status is simply indicated by a yes 3930 placed in that column by their name. Members may delete the seat holders name by clicking on the delete button 3935 which corresponds to the seat holders name.

Members may also choose to send the seat holder a message by clicking on the "send message" hyperlink 3940. In another implementation of the invention, an edit hyperlink may also be added for each seat holder, or the names of the seat holders 3945 may be hyperlinked to another screen, which take members to an edit seat holder screen when the member clicks on the linked name.

Figure 40:
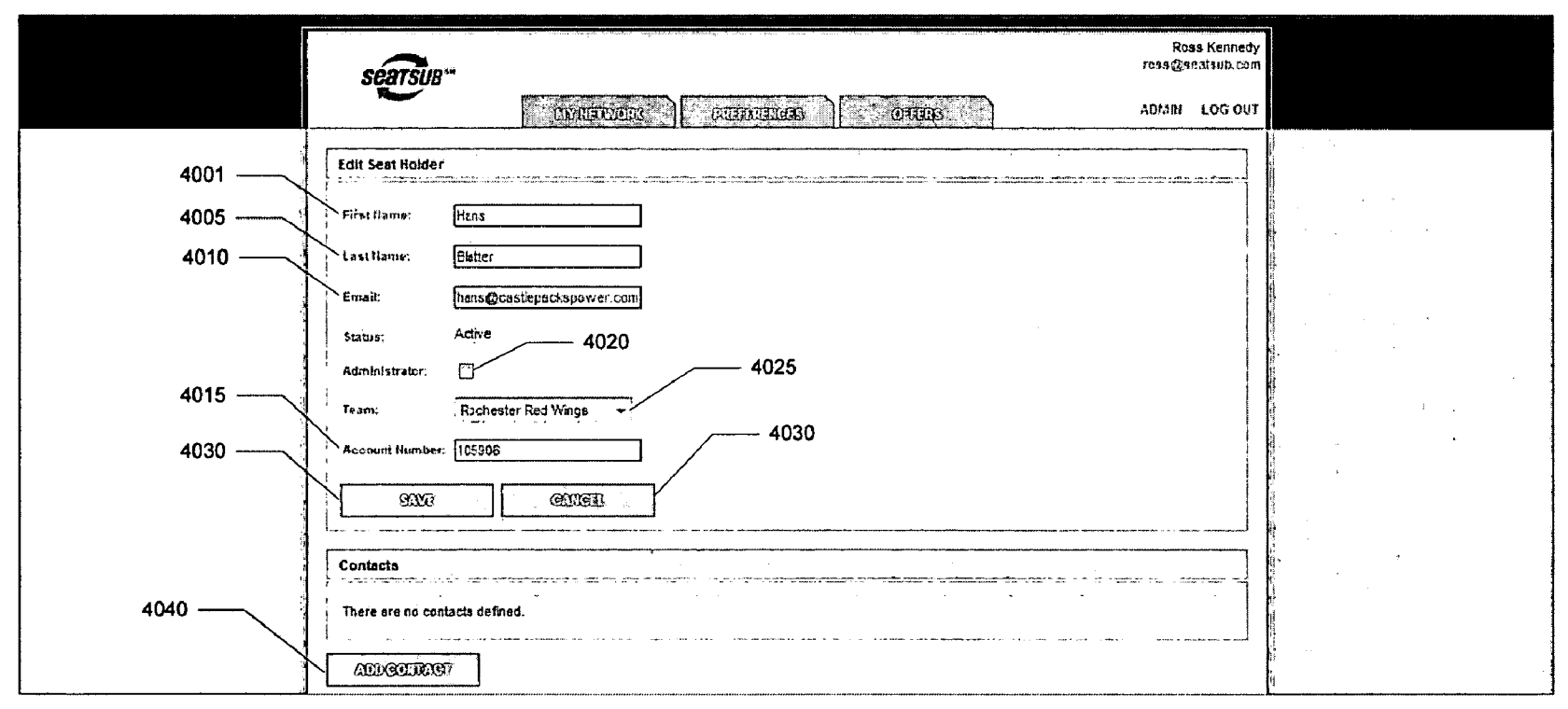

FIG. 40 shows an example of the edit seat holder screen members are taken to after they click on the hyperlinked name of a seat holder from the previous screen. Members have the ability to edit personal information about season ticket holders within their network, as well as periodically update this information as needed. In this screen, members may enter a seat holder's first name 4001, last name 4005, e-mail address 4010, and account number 4015 into input boxes. If the seat holder is an administrator, the member may also click on the check box 4020 to indicate the seat holder's status as an administrator.

Members can specify a team for the seat holder by selecting from teams in a drop down menu 4025. The information can then be saved or canceled by clicking on the save button 4030 or cancel button 4035.

In an implementation of the invention, members may add contacts related to particular season ticket holders by clicking on the "Add contact" button 4040. While members may have a listing of contacts on another frame, having contacts listed on the same screen as a season ticket holder's profile allows network members to better organize their contacts and network.

FIG. 41 shows an example of another season ticket holder screen where members can view a listing of upcoming games. In an implementation of the invention, tickets for these games are listed according to the name of the teams playing 4101, the date of the game 4105, as well as game day 4110, section 4115, row 4120, and seat 4125.

In another implementation of the invention, other information relevant to the ticketing information could be part of this screen, or the name of the game may be hyperlinked to another screen for editing. The purpose of this listing is to allow season ticket holders the ability to keep track of upcoming games in order to better plan for attendance or for the need to share their tickets.

Figure 42:
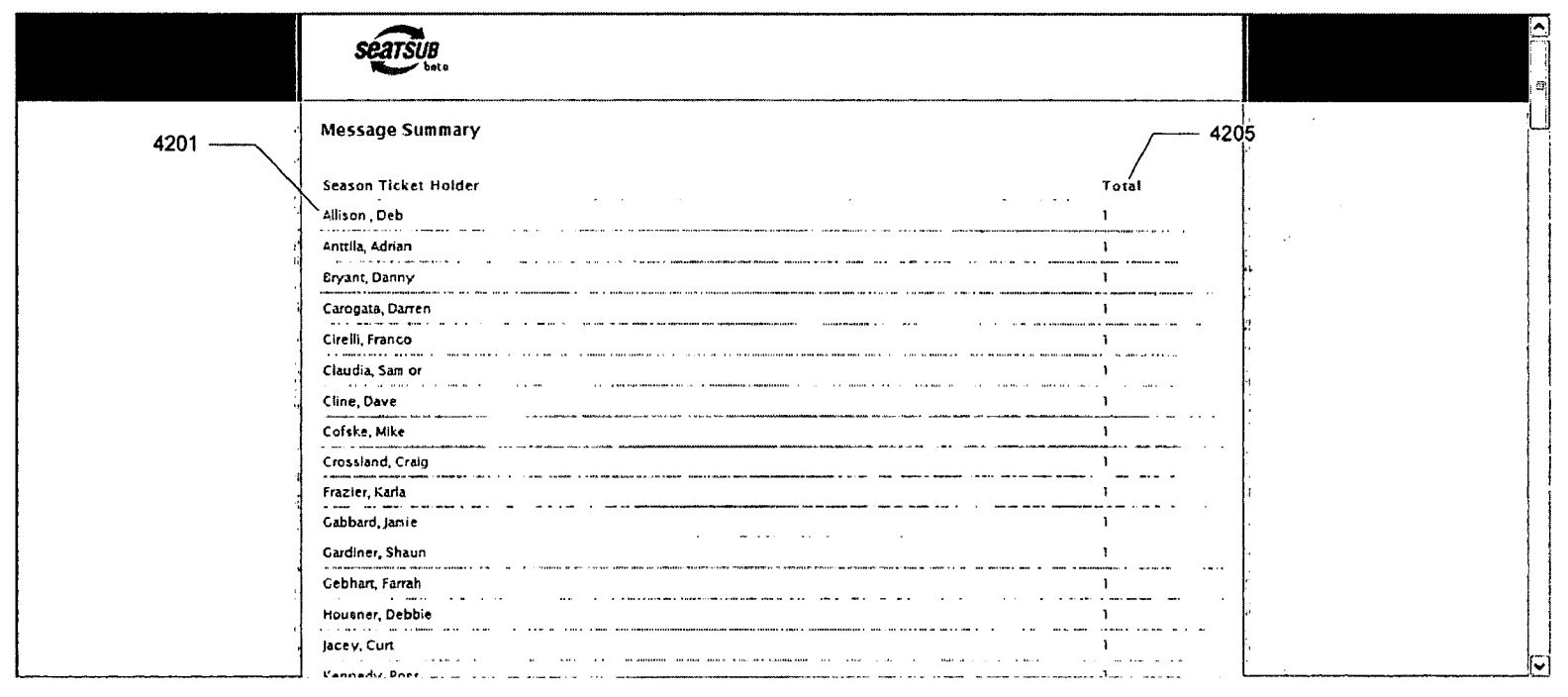

FIG. 42 shows an example of a message summary screen where members can view a listing of season ticket holders 4201 within their network who have sent them messages. In one implementation of the invention, messages from specific season ticket holders are totaled for the member to view in a column 4205. In other implementations of the invention, the message summary screen may include information about these messages from specific members, such as the dates of these messages, whether these messages were ever answered, or the urgency of the message, just to name a few options.

FIG. 43 is an example of a season ticket holder summary screen. Members may view a listing of the season ticket holders within their network in a number of ways. Season ticket holders within a network may be listed to show their name alphabetically 4301, their status 4305, the number of active network members within their network 4310, and by total number of network members 4315. Members may search through their list of season ticket holders by using the scroll bar on the side of the screen 4320. Another implementation of the invention may also have the season ticket holder's names hyperlinked for editing on another screen.

FIG. 44 shows an example of a member screen, which lists the season ticket holders by team. In an implementation of the invention, the names of teams with assigned season ticket holders are displayed as a list 4401. The number of active season ticket holders is displayed in a column next to the team name 4405. The total number of season ticket holders assigned to a team is displayed in a final column 4410. A total number may be tallied at the bottom of the screen for the total number of active season ticket holders 4415 and total number of season ticket holders 4420.

In one implementation of the invention, a column listing the teams in the member's network is followed by a column indicating the number of active season ticket holders for that team as well as a total number of season ticket holders for that team. A total number of all season ticket holders in the member's network may also exist.

FIG. 45 shows the tickets by game screen. The tickets by game screen shows tickets available by game where members may look up seat tickets within a specific time frame. In a specific implementation, a "between" start date and end date may be specified by entering dates into blank input boxes 4501.

Once the dates are entered, the member may click on the view button 4505 to see a listing of games within that time period. The games are listed by name 4510 with a start date 4515, and if seats for that game have been shared a number in the "shared" column 4520 indicates how many seats have been shared. If seats have been shared, then the number of seats accepted will also be listed under the "accepted" column 4525. In a specific implementation of the invention, the total number of seats may be listed in a separate "total" column 4530. In another implementation of the invention, an add tickets button may be added to add more tickets, or the game names may be hyperlinked to another screen for editing.

Figure 46:
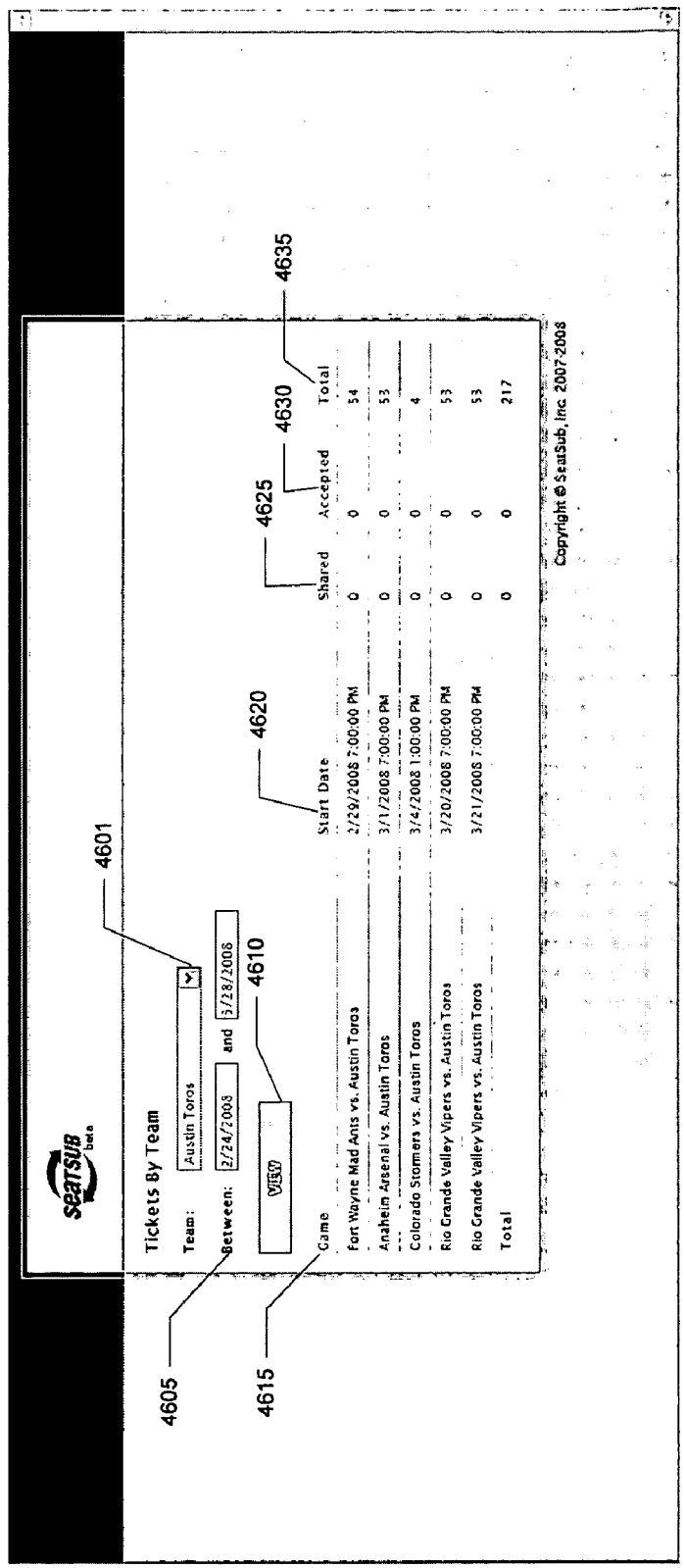
FIG. 46 shows a screen with a list of tickets shared and accepted organized by teams chosen from a pull down menu.

FIG. 46 shows an example of the tickets by team screen. If the network member does not want to search for tickets by searching through their network of season ticket holders, they may choose to look directly for tickets to a game by specifying the team and game date. Members may view tickets for a specific team by selecting a team name from a drop down menu 4601.

Once the team has been selected, members may specify a search for tickets between certain dates by entering the dates into input boxes 4605. Once a team name and dates have been selected, the member clicks on the "View" button 4610 to view a listing of tickets meeting the member's specifications. The ticket information is listed by the name of the game 4615 and the start date of the game 4620.

Members may also see whether the seat has been shared or accepted by numbers in the "Shared" column 4625 and "Accepted" column 4630. In one implementation of the invention, a "total" column 4635 also lets the member see the total number of seats in the network for a particular game. A total number of shared, accepted, and total ticket may also be available as a separate row 4640. A search of tickets in this format allows members a more direct approach to looking up tickets when they have a specific need for certain games.

Figure 47:
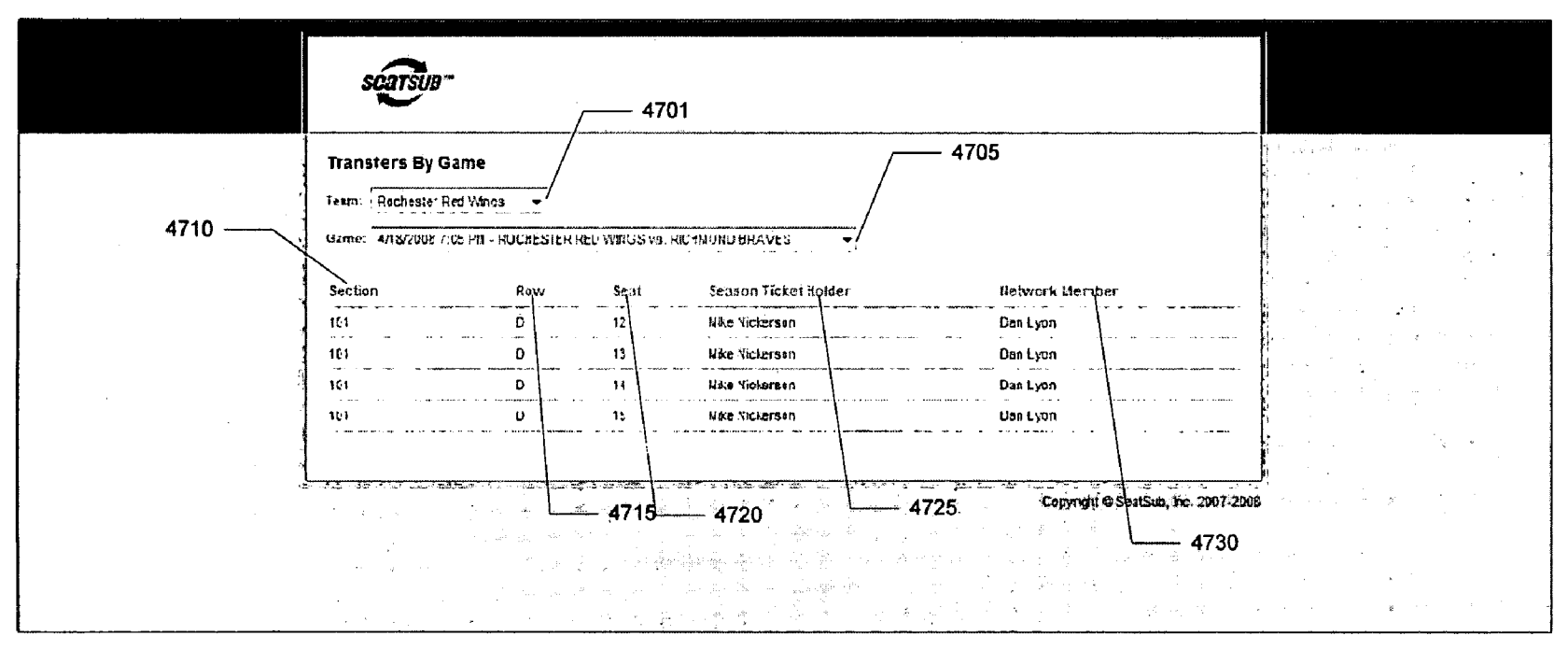

FIG. 47 shows an example of the transfers by game screen for network members to keep track of their shared tickets. Whether it is the season ticket holder or general network member who wants to keep track of seats shared, this screen allows members to look up a specific game or specific team to view seats shared and the recipient of those shared seats. Members first select the name of a team in a drop down menu 4701. Members then select the name of a game from another drop down menu 4705. In one implementation of the invention, members can click on a "view" button to view the transferred tickets.

In another implementation of the invention, the ticket transfer information is automatically processed once the limiting information has been specified. Ticket transfer information is displayed listing the section 4710, row 4715, seat 4720, season ticket holder name 4725, and network member name 4730. Allowing season ticket holders to have a record of their ticket transfers promotes the use of the trusted network and allows ticket holders to monitor members in their network who are sharing the seats.

Figure 48:
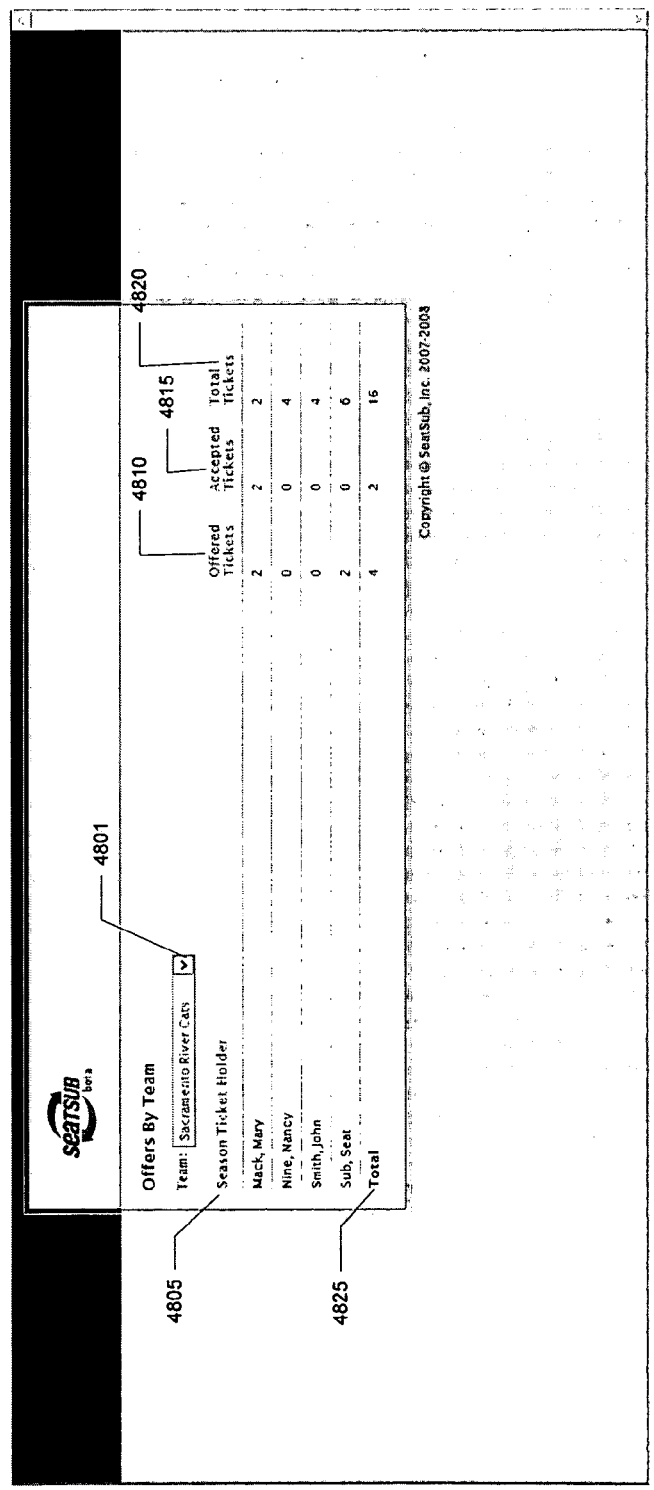
FIG. 48 shows an offers by team screen where members may search for tickets by specifying a search based on the selected team.

FIG. 48 shows an example of an offers-by-team screen. Members may view a listing of season ticket holders who have offered tickets to see a specific team play. Offers are listed by team where the member may select a team from the drop down menu 4801. Once a team has been selected, a list of season ticket holders should appear on the screen. The names of season ticket holders 4805 who have offered seats for a team's games is listed, including the total number of offered tickets for that seat holder 4810, as well as the number of accepted tickets 4815. A total number of offered and accepted tickets for a specific seat holder may be listed 4820, as well as a count of the total number of offered and accepted tickets by team 4825.

Figure 49:
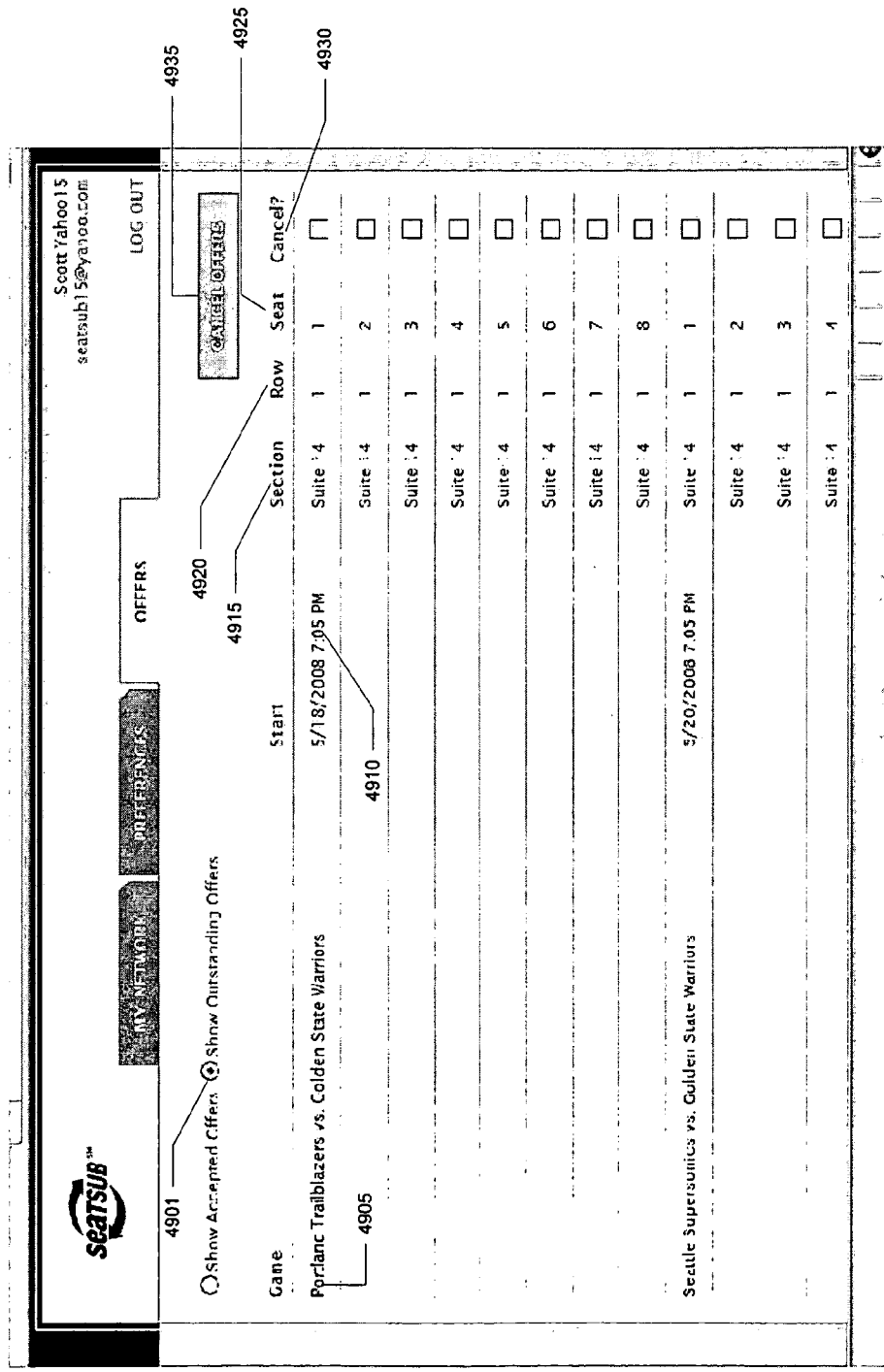
FIG. 49 shows a view of the "offers" screen where members may choose to view all outstanding offers in their profile.

FIG. 49 is an example of the "Offers" tab. In this screen, members may choose to view accepted offers or outstanding offers by clicking on the radio buttons labeled accordingly 4901. In an implementation of the invention showing the member's outstanding offers, the game 4905 is listed in one column. In the next column, the start date and time 4910 is listed. The offer is further specified by listing the section 4915, row 4920, and seat 4925. After the member has viewed all outstanding offers, the member has the option of canceling the offer by clicking on the cancel check box 4930 and clicking the "cancel offer" button 4935.

Allowing season ticket holders the option of viewing and canceling their offers provides an option for the season ticket holder to maintain control over their seats. This opportunity for control promotes sharing of seats because season ticket holders are not limited by concern for changing their minds.

Figure 50:
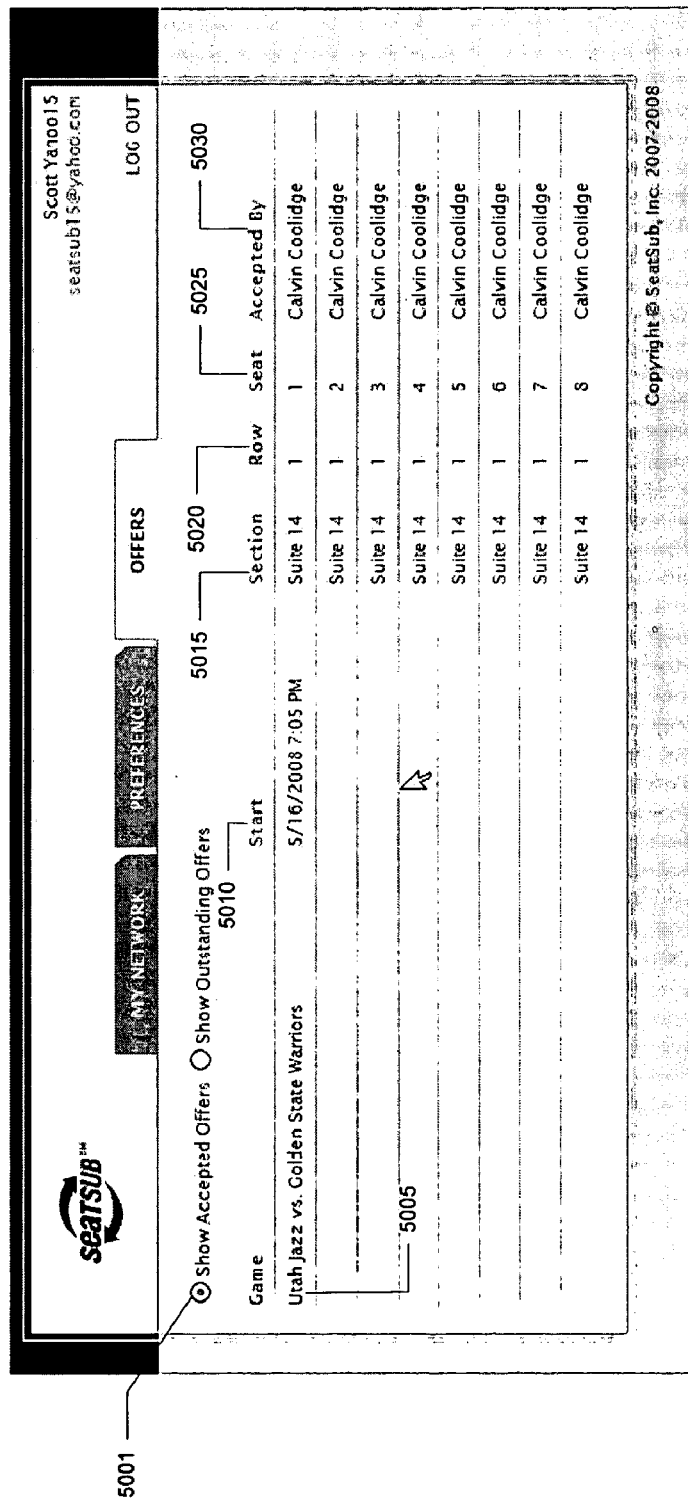
FIG. 50 is a view of the "offers" screen when members choose to view all accepted offers in their profile.

FIG. 50 is an alternate view of the "Offers" tab. The member may specify to see accepted offers by clicking on the "show accepted offers" radio button 5001. Again, the game is listed in one column 5005 and the start date and time in another column 5010. The section 5015, row 5020, and seat 5025 are listed as well as the name of the network member who accepted the seat. The network member's name can be found in a separate column labeled "accepted by" 5030.

In an implementation, the system of the invention computes the return on investment (ROI) for those who use the seats or tickets. For example, a user of the system may request a report on the return on investment and will be presented with a computer screen (e.g., Web page) that shows the return on investment. This report includes a calculation of the value/cost of the ticket investment as compared to the amount of revenue generated by those who used the tickets. A sample report is in table D.

TABLE D

| Person or Organization | # of tickets used | Cost per Ticket | Total Cost of Tickets | Revenue Generated | Positive/ (Negative) Impact |
|---|---|---|---|---|---|
| M. C. "The Big Train" | 14 | $50 | $700 | $500 | ($200) |
| R. K. "Rocketman" | 8 | $50 | $400 | $1,200 | $800 |
| F. C. "Babe" | 22 | $50 | $1,100 | $1,000 | ($100) |
| S. T. "Godzilla" | 10 | $50 | $500 | $1,500 | $1,000 |
| Total | 54 | $50 | $2,700 | $4,200 | $1,500 |

The ROI reporting feature may be integrated with third party tools such as a customer relationship management (CRM) tool or financial accounting package, or a combination of tools, to obtain the amounts. The report may be used to evaluate a sales team, helping to determine which sales people are utilizing the tickets well. The report may represent a list of clients to determine which clients should be given more or fewer tickets, depending on how much business they bring to the season ticket holder.

Working in conjunction with the return on investment report feature above, the system can also provide a facility for employees to request a certain number of tickets, specify for what purpose they want the tickets, who they plan to take to the event with those tickets, and the proposed value generated by the business purpose. The form can be web based. Table E provides some fields that may be in such a form. One of more of the fields may be included, and in any combination.

TABLE E

| Fields | Notes |
|---|---|
| Name of Requestor | This may be a drop down menu with the company directory. |
| Name of Event | This may be a drop down menu with all of the organizations to which the company owns tickets. |

TABLE E-continued

| Fields | Notes |
|---|---|
| Date of Event | A calendar button here so a user can click on a date or dates. |
| # of Tickets Requested | This may be a drop down menu with a set limit (e.g., 4 tickets) with an option to request more than the set limit with approval from the ticket administrator. |
| Business Purpose of Request | This may be a drop down menu with a list of approved purposes (e.g., sales, investors, vendors). |
| Proposed Value Generated by Ticket Usage | For entering of a dollar or money amount. |
| Additional Comments | This is a place where a user can enter in additional information as needed. |

Once sent, the system automatically checks availability of the tickets for that particular date, and requests approval from the administrator of the tickets before the employee would get the tickets.

Once the event happens, the system would send a follow-up e-mail to the person asking who actually attended the event and which organization they were with. The tool can be integrated with a CRM tool. When integrated, the system can update the information in the CRM tool with new activity indicating which people from which company went to the event.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method comprising:
    allowing a first user to become a member of a system accessible through the Internet;
    presenting a user interface screen for the first user to add network contacts into an ordered list of network contacts, wherein the network contacts in the ordered list are at a first degree of separation from the first user;
    storing the ordered list of network contacts from the first user in a memory of the system;
    receiving from the first user an item for distribution to the first users' network contacts;
    using at least one computer processor, permitting the first user to indicate a number of degrees of separation greater than one for the item to be distributed;
    using at least one computer processor, sending a first message to a first contact in the ordered list of network contacts inquiring whether the first contact is interested in the item; and
    receiving an indication that the first contact rejects the item and after receiving the indication, sending a second message to a second contact inquiring whether the second contact is interested in the item, wherein the second contact is associated with the first contact and not present on the first user's ordered list of network contacts.

2. The method of claim 1 wherein the item is a ticket to a sporting event.

3. The method of claim 1 wherein the receiving an indication that the first contact rejects the item and after receiving the indication, sending a second message to a second contact inquiring whether the second contact is interested in the item, wherein the second contact is linked with the first contact and not present on the first user's ordered list of network contacts, is a first option and is replaced by a second option comprising:
after the first contact does not respond within a first time period, sending a second message to a second contact inquiring whether the second contact is interested in the item, wherein the second contact is associated with the first contact and not present on the first user's ordered list of network contacts.

4. The method of claim 1 wherein messages comprise text and a hyperlink, whereby via the hyperlink, an inquiry can be accepted.

5. The method of claim 1 comprising:
after the second contact rejects the item, sending a third message to a third contact in the first user's ordered list of network contacts inquiring whether the third contact is interested in the item.

6. The method of claim 3 comprising:
after the first contact does not respond within a first time period, the second contact accepts the item, and the first contact attempts to accept the item after the second contact has accepted, sending a third message to the first contact indicating that the item is no longer available.

7. The method of claim 6 wherein the third message comprises a message indicating how to purchase a related item at a discount price.

8. The method of claim 1 comprising:
permitting the first user to alter an order of the ordered list of network contacts.

9. The method of claim 2 comprising:
providing a screen listing a plurality of sporting events associated with a sporting team.

10. The method of claim 1 comprising:
providing a screen listing a plurality of the first user's network contacts and for each network contact, listing a number of items offered to each network contact.

11. The method of claim 1 comprising:
providing a screen listing a plurality of the first user's network contacts and for each network contact, listing a number of items accepted by each network contact.

12. The method of claim 1 comprising:
providing an option for the first user to specify which day of the week to share the item.

13. The method of claim 1 comprising:
providing an option for the first user to specify how many days in advance of a date associated with the item to ask whether the first user wants to share the item.

14. The method of claim 1 comprising:
allowing the second user to become a member of a system, where before becoming a member, the second user was on the ordered list of network contacts of the first user but not a member of the system.

15. A method comprising:
allowing a first user to become a member of a system accessible through the Internet;
receiving an ordered list of network contacts from the first user, wherein the network contacts in the ordered list are at a first degree of separation from the first user;
allowing the first user to specify a first item to share with the first users' network contacts using the system;
using at least one computer processor, allowing the first user to specify conditions under which the first item is to be shared, wherein the specifying conditions comprises permitting the first user to indicate a number of degrees of separation greater than one for the item to be distributed;
using at least one computer processor, determining whether the first item satisfies the conditions;
when the first item satisfies the conditions, notifying a first contact in the ordered list of network contacts and allowing the first contact to accept the first item; and
receiving a first indication that the first contact declines the first item and after receiving the first indication, allowing a second contact to accept the first item, wherein the second contact is not in the first user's ordered list of network contacts.

16. The method of claim 15 wherein the conditions comprise a range of dates during which the first user wants to share the first item or second item.

17. The method of claim 15 comprising:
providing a screen listing a plurality of the first user's network contacts and for each network contact, listing a number of items accepted by each network contact and a number of items offered to each network contact.

18. The method of claim 15 wherein the second contact is at a second degree of separation.

19. A method comprising:
allowing a first user to become a member of a system accessible through the Internet;
using at least one computer processor, receiving an ordered list of network contacts from the first user, wherein the network contacts in the ordered list are at a first degree of separation from the first user;
using at least one computer processor, allowing the first user to specify a first item to share with the first users' network contacts using the system;
using at least one computer processor, allowing the first user to specify conditions under which the first item is to be shared, wherein the specifying conditions comprises permitting the first user to indicate a number of degrees of separation greater than one for the item to be distributed;
determining whether the first item satisfies the conditions;
when the first item satisfies the conditions, notifying a first contact in the ordered list of network contacts and allowing the first contact to accept the first item;
receiving an indication that the first contact rejects the first item and after receiving the indication, allowing a second contact to accept the first item, wherein the second contact is not in the first user's ordered list of network contacts, and
the first and second contacts are members of the system, the first contact is linked to the first user, the second contact is linked with the first contact, and the second contact is not linked with the first user.

20. The method of claim 16 comprising:
providing a screen listing a plurality of sporting events associated with a sporting team;
providing an option for the first user to specify which day of the week to share the item;
providing an option for the first user to specify how many days in advance of a date associated with the item to ask whether the first user wants to share the item; and
after the first contact does not respond within a first time period, providing the first indication, and providing a second indication to the first contact that the item is no longer available.

* * * * *